United States Patent

Chun et al.

(10) Patent No.: US 10,067,735 B2
(45) Date of Patent: Sep. 4, 2018

(54) EAR WEARABLE TYPE WIRELESS DEVICE AND SYSTEM SUPPORTING THE SAME

(71) Applicant: Samsung Electronics Co., Ltd., Gyeonggi-do (KR)

(72) Inventors: Ahhyun Chun, Gyeonggi-do (KR); Yong-Yi Kim, Gyeonggi-do (KR); Hyeong Geun Kim, Gyeonggi-do (KR); Jae-Hyun Jo, Gyeonggi-do (KR); Sunlyeong Hwang, Gyeonggi-do (KR); Ilsung Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/387,192

(22) Filed: Dec. 21, 2016

(65) Prior Publication Data

US 2017/0192743 A1 Jul. 6, 2017

(30) Foreign Application Priority Data

Jan. 6, 2016 (KR) ........................ 10-2016-0001748

(51) Int. Cl.
    *H04R 1/10* (2006.01)
    *G06F 3/16* (2006.01)
    *H04W 76/14* (2018.01)
    *H04L 29/08* (2006.01)
    (Continued)

(52) U.S. Cl.
    CPC .............. *G06F 3/165* (2013.01); *H04L 67/06* (2013.01); *H04M 1/725* (2013.01);
    (Continued)

(58) Field of Classification Search
    CPC ...... H04R 29/001; H04R 1/10; H04R 1/1016; H04R 2420/07; H04R 5/033;
    (Continued)

(56) References Cited

U.S. PATENT DOCUMENTS 8,325,935 B2    12/2012   Rutschman
8,542,845 B2    9/2013    Cho
(Continued)

FOREIGN PATENT DOCUMENTS

KR    20080023479    3/2008
KR    10-1128170      3/2012
KR    1020140064590   5/2014

OTHER PUBLICATIONS

International Search Report dated Feb. 20, 2017 issued in counterpart application No. PCT/KR2016/013930, 10 pages.

*Primary Examiner* — Matthew Eason
*Assistant Examiner* — Sabrina Diaz
(74) *Attorney, Agent, or Firm* — The Farrell Law Firm, P.C.

(57) ABSTRACT

An electronic device is provided and includes a housing including a portion that is detachably mountable on one of a user's ears, a wireless communication circuit, a battery, a speaker, at least one sensor included in the housing, a processor electrically connected to the wireless communication circuit, the battery, the speaker, and the at least one sensor, and a memory electrically connected to the processor so that the processor can request a connection from an external device configured to be detachably mounted on another one of the user's ears, determine a portion to be output from the audio data stored in the memory based on whether a response of the external device for the request for the connection is received or at least a portion of at least one signal is received from the external device by formation of the requested connection, and output the determined portion through the speaker.

20 Claims, 53 Drawing Sheets

(51) Int. Cl.
*H04M 1/725* (2006.01)
*H04W 4/80* (2018.01)
*H04R 29/00* (2006.01)
*H04R 5/033* (2006.01)
*H04M 1/60* (2006.01)

(52) U.S. Cl.
CPC ............ *H04R 1/1041* (2013.01); *H04W 4/80* (2018.02); *H04W 76/14* (2018.02); *H04M 1/6066* (2013.01); *H04M 1/72558* (2013.01); *H04M 2250/12* (2013.01); *H04R 1/1016* (2013.01); *H04R 1/1025* (2013.01); *H04R 5/033* (2013.01); *H04R 29/001* (2013.01); *H04R 2420/07* (2013.01)

(58) Field of Classification Search
CPC .......... H04R 2201/10; H04R 2201/103; G06F 3/165; H04W 76/023
USPC .................................................. 381/74, 370
See application file for complete search history.

(56) References Cited

U.S. PATENT DOCUMENTS

| | | |
|---|---|---|
| 2006/0262949 A1 | 11/2006 | Cho et al. |
| 2007/0263893 A1 | 11/2007 | Kim |
| 2008/0076489 A1 | 3/2008 | Rosener et al. |
| 2008/0226094 A1* | 9/2008 | Rutschman ......... H04M 1/6066 381/79 |
| 2009/0109894 A1 | 4/2009 | Ueda et al. |
| 2011/0286615 A1* | 11/2011 | Olodort ................ H04R 1/1025 381/311 |
| 2012/0058727 A1* | 3/2012 | Cook ...................... H04R 5/02 455/41.3 |
| 2012/0230510 A1* | 9/2012 | Dinescu ................ H04R 5/033 381/80 |
| 2014/0119554 A1* | 5/2014 | Chan .................... H04R 1/1091 381/74 |
| 2014/0233752 A1 | 8/2014 | Seo et al. |

* cited by examiner

EAR WEARABLE TYPE WIRELESS DEVICE AND SYSTEM SUPPORTING THE SAME

PRIORITY

This application claims the priority under 35 U.S.C. § 119(a) to Korean Patent Application Serial No. 10-2016-0001748, which was filed in the Korean Intellectual Property Office on Jan. 6, 2016, the entire content of which is incorporated herein by reference.

BACKGROUND

1. Field of the Disclosure

The present disclosure relates generally to an ear wearable type wireless device and a system supporting the same, and more particularly, to an ear wearable type wireless device that is capable of storing and independently reproducing audio data for improving usability.

2. Description of the Related Art

With the development of the electronic communication industry, user devices have become a necessity of modern society, and can be embodied in various body-wearable types in order to improve portability and user accessibility.

The user device may be, for example, an ear wearable wireless type (e.g., a wireless earphone) that can be inserted into, or be in close contact with, the user's ears. The ear wearable type wireless device can also be wirelessly connected to an external electronic device (e.g., a smart phone) for streaming audio data to the ear wearable type wireless device and for reproducing the streamed audio data.

However, since the ear wearable type wireless device does not store audio data, it is difficult for the ear wearable type wireless device to independently output sound without the streaming of audio data by the external electronic device.

SUMMARY

According to an aspect of the present disclosure, there is provided an ear wearable type wireless device that is capable of storing and independently reproducing audio data.

In accordance with an aspect of the present disclosure, there is provided an electronic device. The electronic device includes a housing including a portion configured to be detachably mounted on one of a user's ears, a wireless communication circuit included in the housing, a battery included in the housing, a speaker included in the housing and disposed to face the user's eardrum when the portion of the housing is coupled to one of the user's ears, at least one sensor included in the housing, a processor included in the housing and electrically connected to the wireless communication circuit, the battery, the speaker, and the at least one sensor, and a memory included in the housing and electrically connected to the processor, the memory being configured to store audio data. The memory stores instructions, which, upon being executed, cause the processor to request a connection from an external device configured to be detachably mounted on another one of the user's ears by using the communication circuit, determine a portion to be output from the audio data stored in the memory based on whether a response of the external device for the request for the connection is received and/or at least a portion of at least one signal received from the external device by formation of the requested connection, and output the determined portion through the speaker.

In accordance with an aspect of the present disclosure, there is provided an electronic device. The electronic device includes a housing including a portion configured to be detachably mounted on one of a user's ears, a wireless communication circuit included in the housing, a battery included in the housing, a speaker included in the housing and disposed to face the user's eardrum when the portion of the housing is coupled to one of the user's ears, at least one sensor included in the housing, a processor included in the housing and electrically connected to the wireless communication circuit, the battery, the speaker, and the at least one sensor, a storage device included in the housing and electrically connected to the processor, a volatile memory included in the housing. The storage device stores instructions which, upon being executed, cause the processor to receive audio data from a first external device by using the communication circuit, store the received audio data in the volatile memory, request a connection from a second external device configured to be detachably mounted on another one of the user's ears by using the communication circuit, determine a portion to be output from the audio data stored in the volatile memory based on whether a response of the second external device for the request for the connection is received and/or at least a portion of at least one signal received from the second external device by formation of the requested connection, and output the determined portion through the speaker.

In accordance with an aspect of the present disclosure, there is provided a method of operating an electronic device. The method includes receiving a reproduction request for audio data stored in a memory of the electronic device, acquiring status information of an external device connected to the electronic device, determining a portion to be output in the audio data based on at least a portion of the acquired status information, and outputting the determined portion through a speaker of the electronic device.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION

Figure 1:
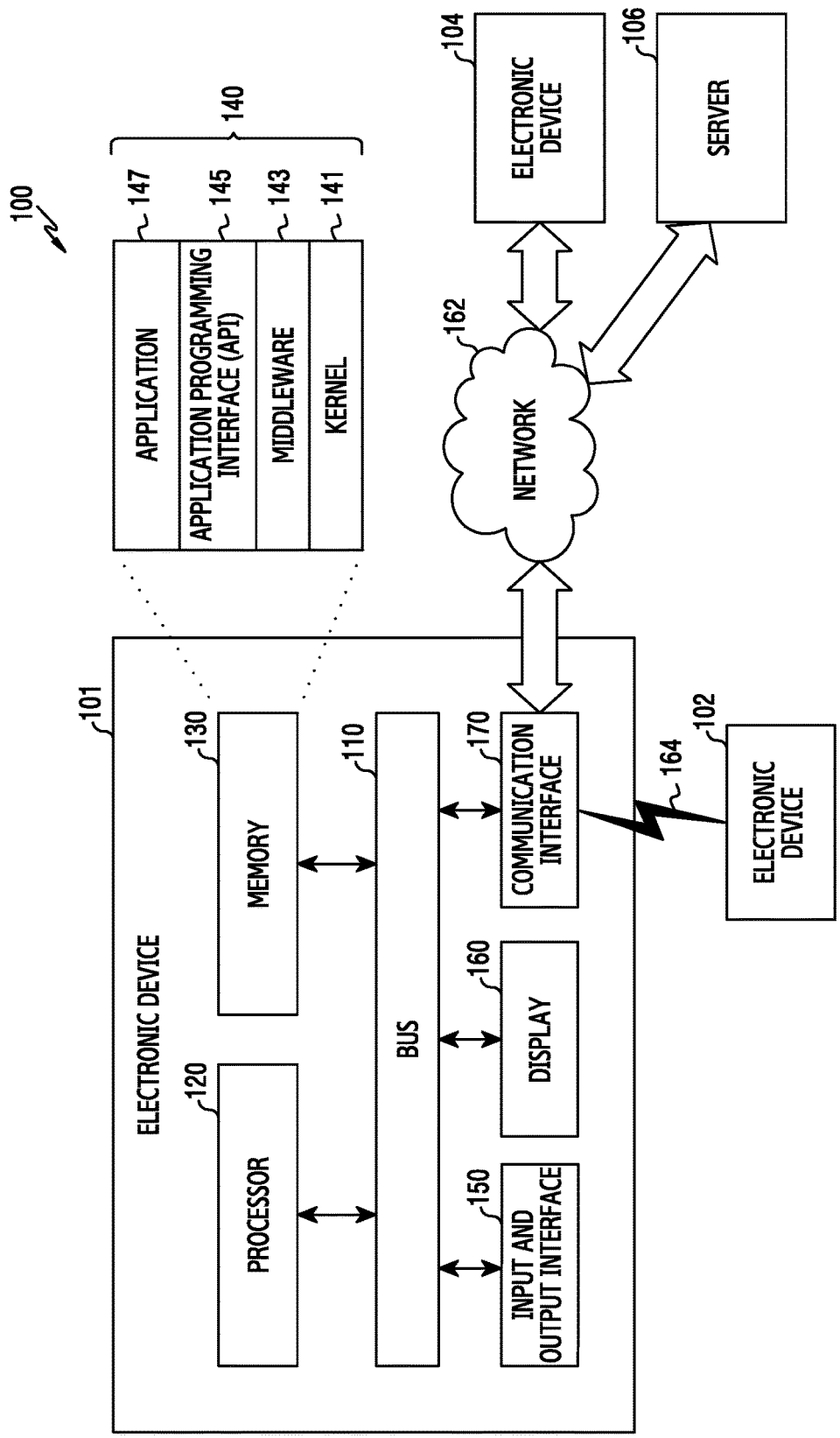
FIG. 1 is a diagram of a network environment that includes an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

An electronic device according the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, glasses, a contact lens, or a head-mounted device (HMD)), a fabric or clothing integrated type (e.g., electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of a network environment that includes an electronic device, according to an embodiment of the present disclosure.

An electronic device 101 that operates within a network environment 100 is illustrated in FIG. 1. The electronic device 101 includes a bus 110, a processor 120, a memory 130, an input/output interface 150, a display 160, and a communication interface 170. The electronic device 101 may omit at least one of the above-mentioned components or may additionally include other components.

The bus 110 may include, for example, a circuit that interconnects the above-mentioned components 110 to 170 and transmits communication (e.g., a control message or data) among the components.

The processor 120 may include one or more of a central processing units (CPUs), an application processor (AP), and a communication processor (CP). The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. The memory 130 may store software and/or a program 140. The program 140 may include, for example, a kernel 141, a middleware 143, an application programming interface (API) 145, and/or an application program (or an "application") 147. At least one of the kernel 141, the middleware 143, and the API 145 may be referred to as an operating system (OS).

The kernel 141 may control or manage, for example, system resources (e.g., the bus 110, the processor 120, or the memory 130) that are used for executing operations or functions implemented in the other programs (e.g., the middleware 143, the API 145, or the applications 147). In addition, the kernel 141 may provide an interface that allows the middleware 143, the API 145, or the applications 147 to access individual components of the electronic device 101 so as to control or manage the system resources.

The middleware 143 may play an intermediary role such that, for example, the API 145 or the applications 147 may communicate with the kernel 141 so as to exchange data.

In addition, the middleware 143 may process one or more task requests, which are received from the applications 147, according to priority. For example, the middleware 143 may assign the priority to be capable of using a system resource of the electronic device 101 (e.g., the bus 110, the processor 120, or the memory 130) to at least one of the applications 147. For example, the middleware 143 may perform scheduling, load balancing, or the like for the one or more task requests by processing the one or more requests according to the assigned priority.

The API 145 is, for example, an interface that allows the applications 147 to control functions provided from the kernel 141 or the middleware 143, and may include, for example, one or more interfaces or functions (e.g., commands) for a file control, a window control, an image processing, a character control, or the like.

The input/output interface 150 may serve as an interface to transmit commands or data entered from, for example, a user or any other external device, to the other component(s) of the electronic device 101. Also, the input/output interface 150 may output commands or data, which are received from the other component(s) of the electronic device 101, to the user or the other external device.

The display 160 may include, for example, a liquid crystal display (LCD), a light emitting Diode (LED) display, an organic light emitting diode (OLED) display, or a microelectromechanical systems (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 101 and an external device (e.g., a first external electronic device 102, a second external device 104, or a server 106). For example, the communication interface 170 may be connected with a network 162 through wired or wireless communication so as to communicate with the second external electronic device 104 or the server 106.

The wireless communication may use at least one of, for example, long-term evolution (LTE), LTE advance (LTE-A), code division multiple access (CDMA), wideband CDMA (WCDMA), universal mobile telecommunication system (UMTS), wireless broadband (WiBro), or global system for mobile communication (GSM), as a cellular communication protocol. In addition, the wireless communication may include, for example, short range communication 164. The short range communication 164 may include at least one of, for example, wireless fidelity (WiFi), bluetooth, near field communication (NFC), and global navigation satellite system (GNSS). GNSS may include, for example, at least one of global positioning system (GPS), Glonass, Beidou, and Galileo, the European global satellite-based navigation system, according to, for example, a use area or band width. Herein, "GPS" may be interchangeably used with "GNSS" below. The wired communication may use at least one of, for example, universal serial bus (USB), high definition multimedia interface (HDMI), recommended standard 232 (RS-232), and plain old telephone service (POTS). The network 162 may include a telecommunication network, for example, at least one of a computer network (e.g., local area network (LAN) or wide area network (WAN)), the internet, and a telephone network.

Each of the first and second external electronic devices 102 and 104 may be a type of device that is the same as or different from the electronic device 101. The server 106 may include a group of one or more servers.

All or some of the operations to be executed by the electronic device 101 may be executed by another electronic device or a plurality of other electronic devices (e.g., the electronic devices 102 and 104 or the server 106). In the case where the electronic device 101 performs a certain function or service automatically or by a request, the electronic device 101 may request some functions or services that are associated therewith from the electronic devices 102 and 104 or the server 106, instead of or in addition to executing the functions or service by itself. The electronic devices 102 and 104 or the server 106 may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
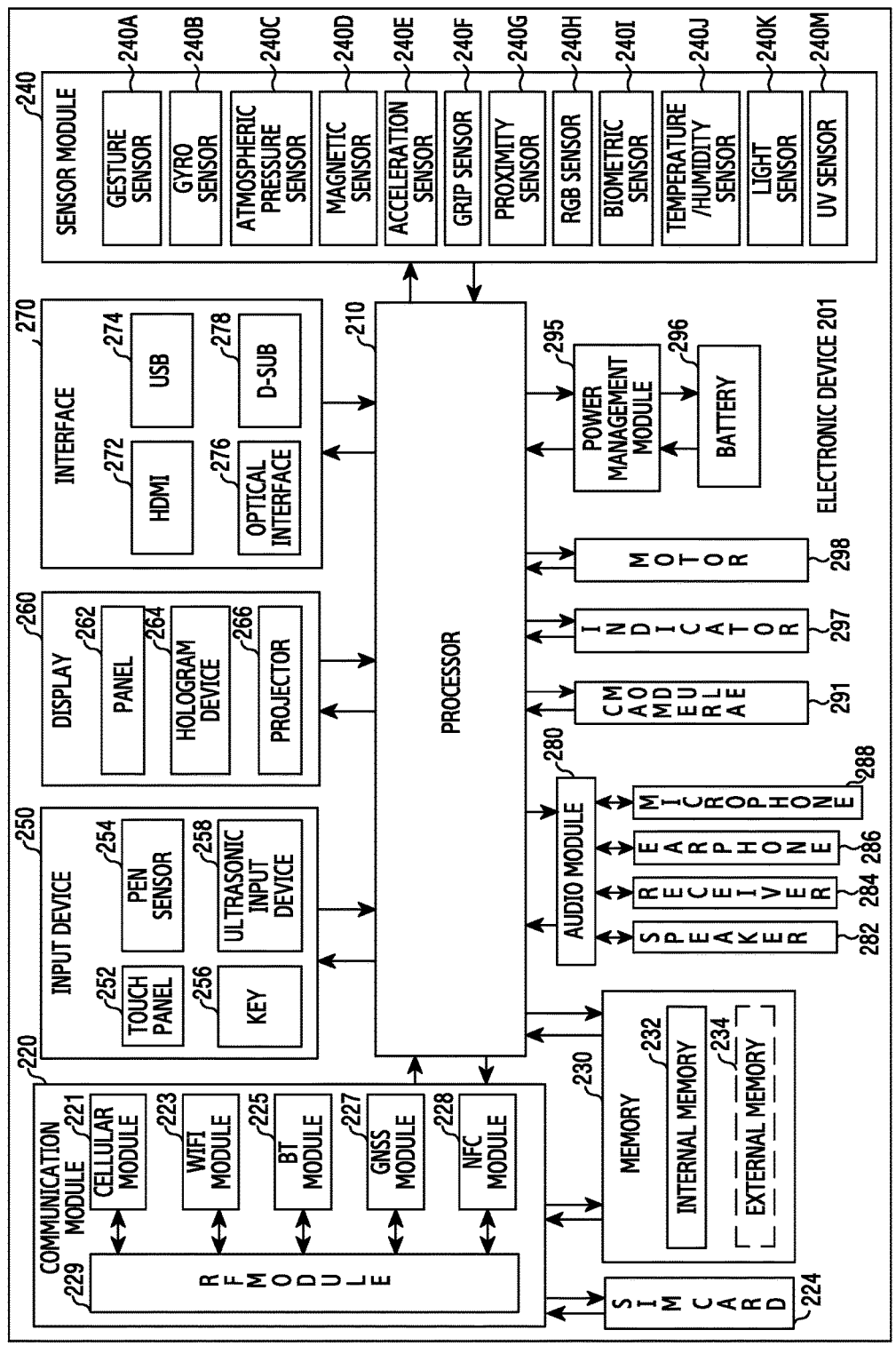
FIG. 2 is a diagram of an electronic device, according to an embodiment of the present disclosure.

FIG. 2 is a diagram of an electronic device, according to an embodiment of the present disclosure.

The electronic device 201 may include, for example, all or some of the components of the electronic device 101 illustrated in FIG. 1. The electronic device 201 may include at least one processor (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an AP so as to control a plurality of hardware or software components connected thereto, and may also perform various data processing and arithmetic operations. The processor 210 may be implemented by, for example, a System-on-Chip (SoC). The processor 210 may further include a graphic processing unit (GPU) and/or an image signal processor. The processor 210 may include at least some components (e.g., a cellular module 221) among the components illustrated in FIG. 2. The processor 210 may load a command or data received from at least one of the other components (e.g., a non-volatile memory) in a volatile memory to process the command and data, and may store various data in a non-volatile memory.

The communication module 220 may have a configuration that is the same as or similar to the communication interface 170 of FIG. 1. The communication module 220 may include, for example, the cellular module 221, a WiFi module 223, a Bluetooth module 225, a GNSS module 227 (e.g., GPS module, Glonass module, Beidou module, or Galileo module), an NFC module 228, and a Radio Frequency (RF) module 229.

The cellular module 221 may provide, for example, a voice call, a video call, a message service, or an internet service through a communication network. The cellular module 221 may perform discrimination and authentication of the electronic device 201 within the communication network by using the SIM card 224. The cellular module 221 may perform at least some functions among the multimedia control functions that may be provided by the processor 210. The cellular module 221 may include a CP.

Each of the WiFi module 223, the Bluetooth module 225, the GNSS module 227, and the NFC module 228 may include, for example, a processor to process data transmitted/received through a corresponding module. At least some (e.g., two or more) of the cellular module 221, the WiFi module 223, the Bluetooth module 225, the GNSS module 227, and the NFC module 228 may be incorporated in a single integrated chip (IC) or an IC package.

The RF module 229 may transmit/receive a communication signal (e.g., an RF signal). The RF module 229 may include, for example, a transceiver, a power amp module (PAM), a frequency filter, a low noise amplifier (LNA), or an antenna. At least one of the cellular module 221, the WiFi module 223, the Bluetooth module 225, the GNSS module 227, and the NFC module 228 may transmit/receive an RF signal through one or more separate RF modules.

The SIM card 224 may include an embedded SIM, and may also include intrinsic identification information (e.g., integrated circuit card identifier (ICCID)) or subscriber information (e.g., international mobile subscriber identity (IMSI)).

The memory 230 may include, for example, an internal memory 232 or an external memory 234. The internal memory 232 may include at least one of, for example, a volatile memory (e.g., dynamic random access memory (DRAM), static RAM (SRAM), or synchronous DRAM (SDRAM)), a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, flash memory (e.g., NAND flash memory, or NOR flash memory), hard drive, or solid state drive (SSD)).

The external memory 234 may further include a flash drive (e.g., compact flash (CF), Secure Digital (SD), micro secure digital (Micro-SD), mini secure digital (Mini-SD), extreme digital (xD), multi-media card (MMC), or memory stick). The external memory 234 may be functionally and/or physically connected to the electronic device 201 through various interfaces.

For example, the sensor module 240 may measure a physical quantity or may sense an operating status of the electronic device 201, and may then convert the measured or sensed information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illuminance sensor 240K, and an ultra-violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors incorporated therein. The electronic device 201 may further include a processor configured to control the sensor module 240 as a part of the processor 210 or separately from the processor 210 so as to control the sensor module 240 while the processor 210 is in the sleep state.

The input device 250 may include, for example, a touch panel 252, a (digital) pen sensor 254, a key 256, or an ultrasonic input device 258. As the touch panel 252, at least one of, for example, a capacitive type touch panel, a resistive type touch panel, an infrared type touch panel, and an ultrasonic type panel may be used. Also, the touch panel 252 may further include a control circuit. The touch panel 252 may further include a tactile layer so as to provide a tactile reaction to the user.

The (digital) pen sensor 254 may be, for example, a portion of the touch panel or may include a separate recognition sheet. The key 256 may include, for example, a physical button, an optical key, or a keypad. The ultrasonic input device 258 may sense, through a microphone 288, ultrasonic waves generated by an input tool so as to confirm data corresponding to the sensed ultrasonic waves.

The display 260 may include a panel 262, a hologram device 264, or a projector 266. The panel 262 may include a configuration that is the same as or similar to that of the display 160 of FIG. 1. The panel 262 may be flexible, transparent, or wearable. The panel 262 may be a single module with the touch panel 252. The hologram device 264 may show a stereoscopic image in the air using interference of light. The projector 266 may project light onto a screen so as to display an image. The screen may be located, for example, inside or outside the electronic device 201. The display 260 may further include a control circuit to control the panel 262, the hologram device 264, or the projector 266.

The interface 270 may include, for example, an HDMI 272, a USB 274, an optical interface 276, or a d-subminiature (D-sub) 278. For example, the interface 270 may be included in the communication interface 170 illustrated in FIG. 1. Additionally or alternatively, the interface 270 may include, for example, a mobile high-definition link (MHL) interface, an SD card/MMC interface, or an infrared data association (IrDA) standard interface.

The audio module 280 may bi-directionally convert, for example, sound and electric signals. At least some of the components of the audio module 280 may be included in, for example, the input/output interface 150 illustrated in FIG. 1. The audio module 280 may process sound information input or output through, for example, a speaker 282, a receiver 284, an earphone 286, or the microphone 288.

The camera module 291 may be a device that is capable of photographing, for example, a still image and a video image. The camera module 291 may include at least one image sensor (e.g., a front sensor or a rear sensor), a lens, an image signal processor (ISP), or a flash (e.g., an LED or a xenon lamp).

The power management module 295 may manage, for example, the electric power of the electronic device 201. The power management module 295 may include a Power Management IC (PMIC), a charger IC (IC), or a battery gauge. The PMIC may be configured in a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include, for example, a rechargeable battery and/or a solar battery.

The indicator 297 may indicate a specific status (e.g., a booting status, a message status, or a charged status) of the electronic device 201 or of a part thereof (e.g., the processor 210). The motor 298 may convert an electric signal into a mechanical vibration, and may generate, for example, a vibration or a haptic effect. Although not illustrated, the electronic device 201 may include a processor (e.g., a GPU) to support a mobile TV. The processor to support a mobile TV may process media data according to the standards of, for example, Digital Multimedia Broadcasting (DMB), Digital Video Broadcasting (DVB), or MediaFLO™.

Each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
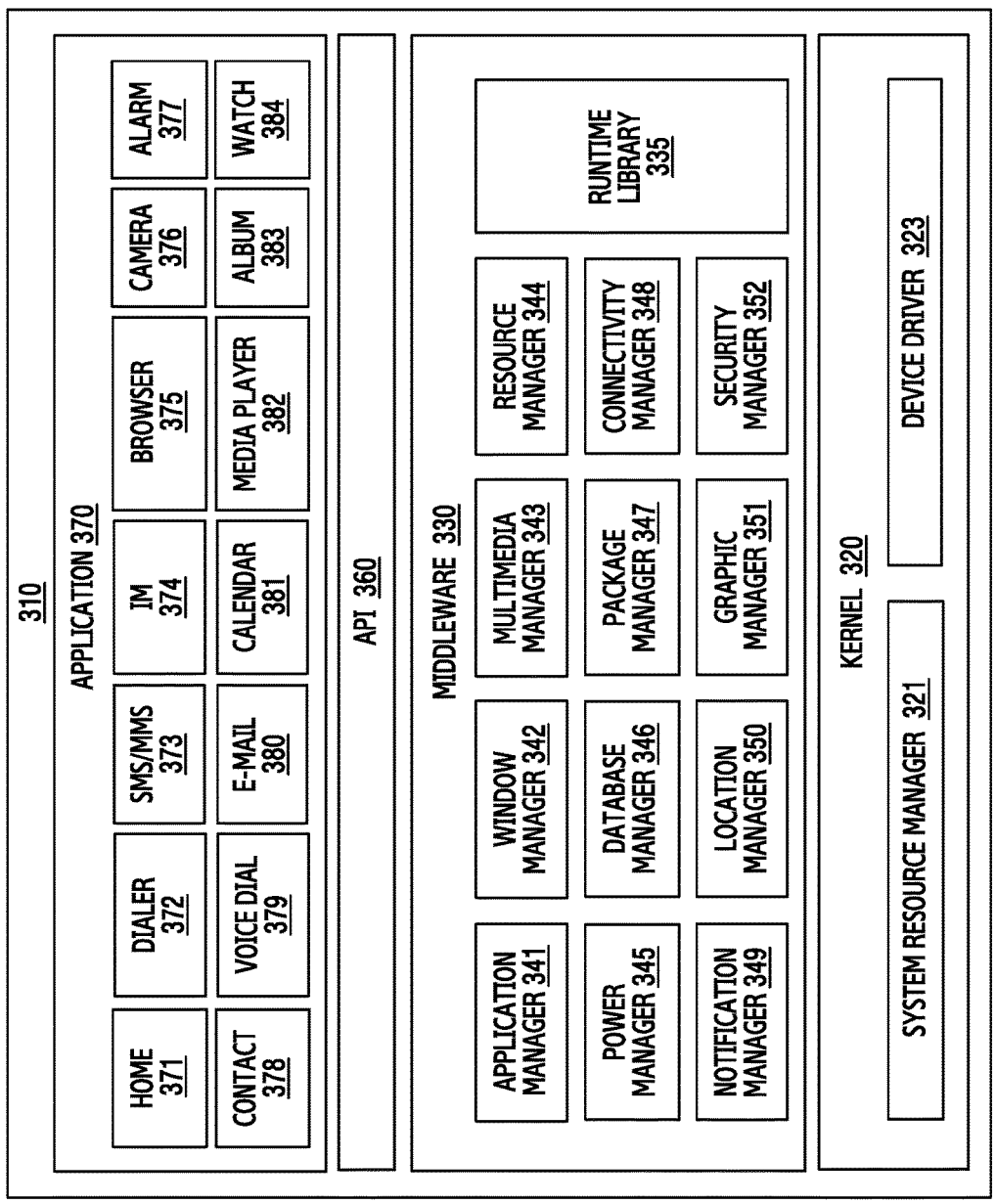
FIG. 3 is a diagram of a program module, according to an embodiment of the present disclosure.

FIG. 3 is a diagram of a program module, according to an embodiment of the present disclosure.

A program module 310 may include an OS that controls resources associated with the electronic device 101 and/or various applications (e.g., the application program 147) that are driven on the OS. The OS may be, for example, Android™, iOS™, Windows™, Symbian™, Tizen™, or Bada™.

The program module 310 may include a kernel 320, a middleware 330, an API 360, and/or an application 370. At least a part of the program module 310 may be preloaded on the electronic device, or may be downloaded from the electronic device 102 or 104, or the server 106.

The kernel 320 may include, for example, a system resource manager 321 and/or a device driver 323. The system resource manager 321 may perform, for example, a control, allocation, or recovery of a system resource. The system resource manager 321 may include, for example, a process management unit, a memory management unit, or a file system management unit. The device driver 323 may include, for example, a display driver, a camera driver, a Bluetooth driver, a common memory driver, a USB driver, a keypad driver, a WiFi driver, an audio driver, or an inter-process communication (IPC) driver.

The middleware 330 may provide, for example, a function that is commonly required by the applications 370, or may provide various functions to the applications 370 through the API 360 such that the applications 370 can efficiently use the limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that is used by a compiler in order to add a new function through a program language while the applications 370 are executed. The runtime library 335 may perform, for example, input/output management, memory management, or a function for an arithmetic function.

The application manager 341 may manage, for example, a life cycle of at least one application among the applications 370. The window manager 342 may manage a GUI resource that is used in a screen. The multimedia manager 343 may grasp a format required for reproducing various media files, and may perform encoding or decoding of the media files by using a codec that is suitable for the corresponding format. The resource manager 344 may manage a resource, such as a source code, a memory, or a storage space, of at least one application among the applications 370.

The power manager 345 is operated together with, for example, a basic input/output system (BIOS) so as to manage a battery or a power source, and may provide, for example, power information that is required for operating the electronic device. The database manager 346 may generate, retrieve, or change a database to be used by at least one application among the applications 370. The package manager 347 may manage the installation or update of an application that is distributed in the form of a package file.

The connectivity manager 348 may manage, for example, a wireless connection of WiFi, Bluetooth, or the like. The notification manager 349 may display or notify events, such as an arrival message, appointment, and proximity notification in a manner that does not disturb the user. The location manager 350 may manage position information of the electronic device. The graphic manager 351 may manage a graphic effect to be provided to the user or a user interface associated therewith. The security manager 352 may provide all security functions required for, for example, system security, or user authentication. In the case where electronic device 101 includes a phone function, the middleware 330 may include a telephony manager to manage a voice or video call function of the electronic device.

The middleware 330 may include a middleware module that forms a combination of various functions of the above-described components. The middleware 330 may provide a module that is specialized for each kind of operation system in order to provide differentiated functions. In addition, the middleware 330 may dynamically delete some of the existing components or add new components.

The API 360 is, for example, a collection of API programming functions, and may be provided in different configurations according to operation systems. For example, Android™ or iOS™ may provide one API set for each platform and Tizen™ may provide two or more API sets for each platform.

The applications 370 may include, for example, one or more applications that can execute, for example, the functions of home 371, dialer 372, SMS/MMS 373, instant message (IM) 374, browser 375, camera 376, alarm 377, contact 378, voice dial 379, e-mail 380, calendar 381, media player 382, album 383, watch 384, health care (e.g., measurement of a quantity of motion, or blood sugar), or provision of environmental information (e.g., provision of atmospheric pressure, humidity, or temperature information).

The applications 370 may include an application that supports information exchange between the electronic device 101 and the electronic devices 102 and 104) (hereinafter, an "information exchange application"). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the electronic devices 102 and 104. In addition, the notification relay application may receive notification information from, for example, an external electronic device, and may provide the notification information to the user.

The device management application may manage (e.g., install, delete, or update) at least one function of the electronic device 102 or 104 that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

The applications 370 may include an application designated according to an attribute of the electronic device 102 or 104 (e.g., a healthcare application of a mobile medical device). The applications 370 may include an application received from the server 106 or the electronic devices 102 or 104. The applications 370 may include a preloaded application or a third party application that is capable of being downloaded from the server. The names of the components of the program module 310 may vary depending on the kind of operation system.

At least a portion of the program module 310 may be implemented by software, firmware, hardware, or a combination of two or more thereof. At least a portion of the program module 310 may be implemented (e.g., executed) by, for example, the processor 210. At least a portion of the program module 310 may include, for example, a module, a program, a routine, a set of instructions, or a process for performing one or more functions.

At least some of devices (e.g., modules or functions thereof) or methods (e.g., operations) may be implemented by an instruction stored in a non-transitory computer-readable storage medium in the form of a programming module. When the instruction is executed by the processor 120, the one or more processors may execute the function that corresponds to the instruction. The non-transitory computer-readable recoding media may be, for example, the memory 130.

The non-transitory computer readable recoding medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Modules or programming modules may include at least one of the above-described elements, exclude some of the elements, or further include other additional elements. The operations performed by the modules, the programming module, or other elements may be executed in a sequential, parallel, repetitive, or heuristic manner. Further, some operations may be executed according to another order or may be omitted, or other operations may be added. The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The devices described herein may include all information and communication devices, multimedia devices, wearable devices, and application devices thereof that use one or more of various processors, such as an AP, a CP, a GPU, a CPU, and the like.

Hereinafter, the methods and devices described herein will be described with reference to the accompanying drawings. However, since the embodiments described herein are not restricted or limited by the following description, it should be noted that applications or changes can be made to the embodiments that will be described below. Hereinafter, the present disclosure will be described based on an approach of hardware. However, the present disclosure include a technology that uses both hardware and software and thus, the present disclosure may not exclude the perspective of software.

Figure 4:
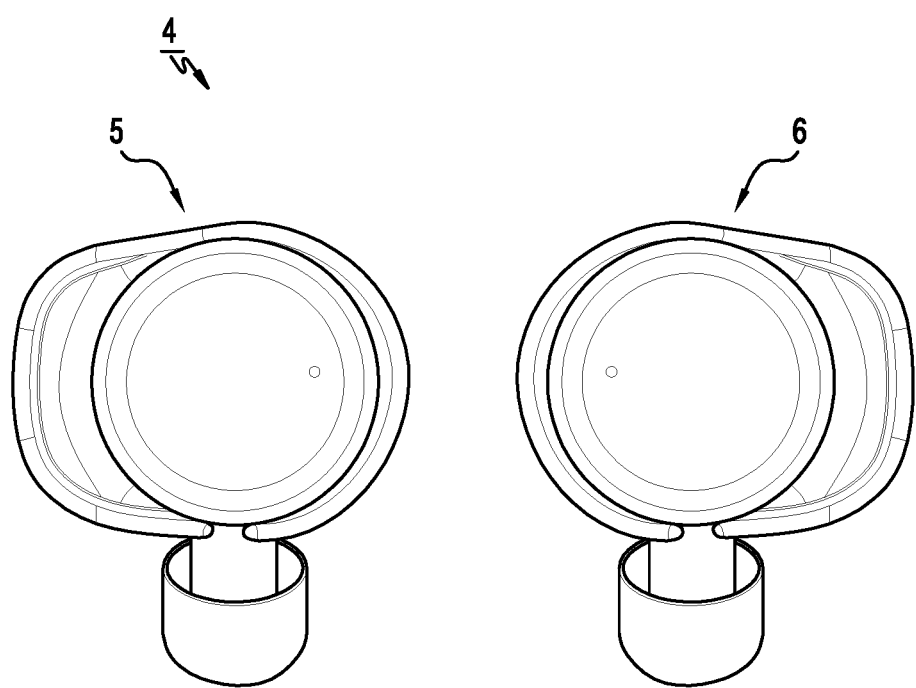
FIGS. 4 and 5 are diagrams of an ear wearable wireless device set, according to an embodiment of the present disclosure.
Figure 5:
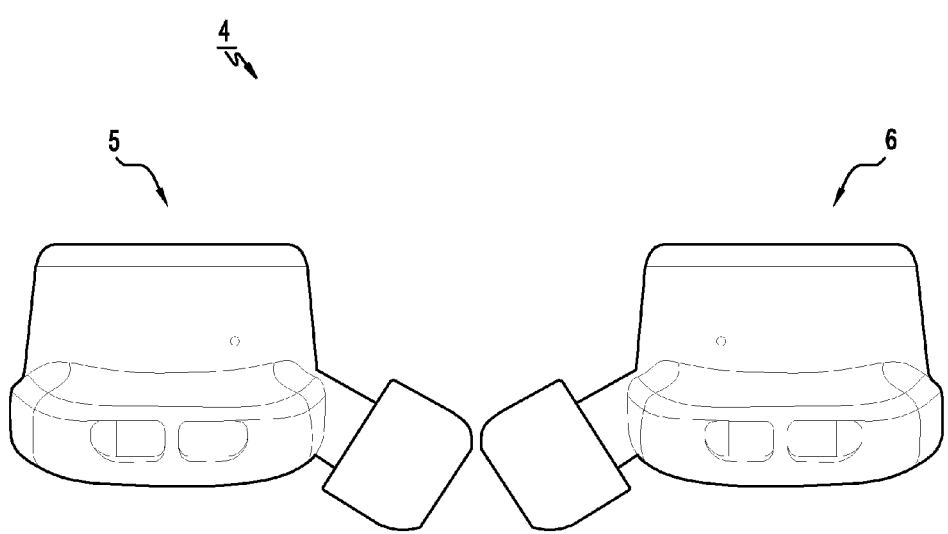
Figure 6:
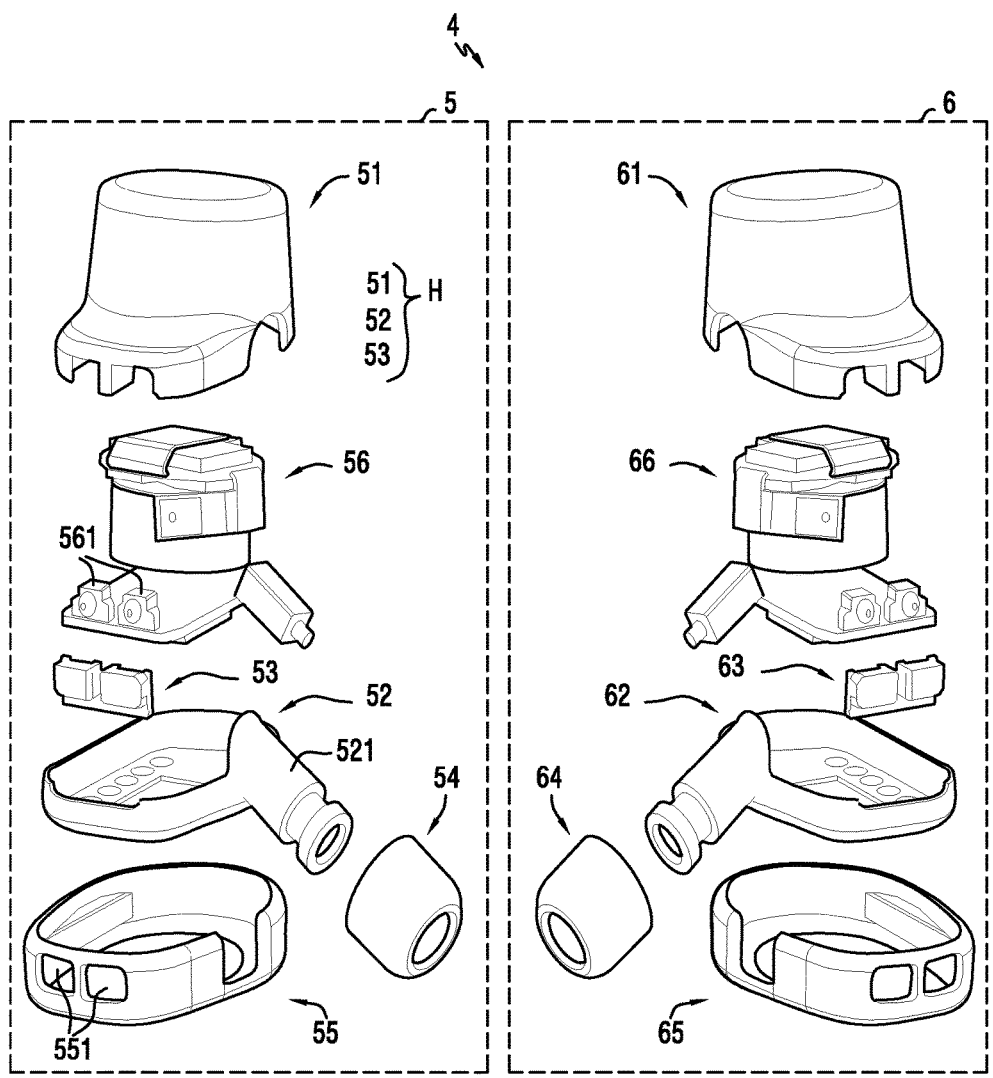
FIG. 6 is diagram of the ear wearable wireless device set, according to an embodiment of the present disclosure.

FIGS. 4 and 5 are diagrams of an ear wearable wireless device set 4, according to an embodiment of the present disclosure. FIG. 6 is diagram of the ear wearable wireless device set 4, according to an embodiment of the present disclosure.

Referring to FIGS. 4 to 6, the ear wearable wireless device set 4 may include a first electronic device (or a first ear piece) 5 and a second electronic device (or a second ear piece) 6, which are wearable on opposite ears of a user. The first electronic device 5 and/or the second electronic device 6 may include all or some of the components of the electronic device 101, the first external electronic device 102, or the second external electronic device 104 of FIG. 1.

The first electronic device 5 includes a housing H, a tip 54, a cover 55, and a printed circuit board assembly (PCBA) 56.

The housing H includes a first housing 51 and a second housing 52. The first housing 51 and the second housing 52 form the exterior of the first electronic device 5. The first housing 51 and the second housing 52 may be coupled to each other to form an internal mounting space. The PCBA 56 may be disposed in the internal mounting space.

The housing H also includes a window 53. When the first housing 51 and the second housing 52 are coupled to each other, a through-hole may be formed. The through-hole may interconnect the internal mounting space and the outside. The window 53 may be coupled to the housing H and set within the through-hole formed by the first housing 51 and the second housing 52.

The second housing 52 may include an extension 521 which extends outside the housing H. The extension 521 may include a passage that interconnects the internal mounting space and the outside. The extension 521 may be used for insertion into a user's ear canal. Sound generated from a speaker may be emitted through the passage of the extension 521.

The tip 54 may be coupled to an end of the extension 521 of the second housing 52. The tip 54 may have a substantially cylindrical shape. The end of the extension 521 of the second housing 52 may be fitted to a hollow portion of the tip 54. The tip 54 may elastic and may assist a close contact with the user's ear canal.

The housing H may include a through-hole for supporting a microphone. Sound may be introduced into the microphone through the through-hole.

The cover 55 may be coupled to the housing Hand may have a substantially annular shape. The cover 55 may include a through-hole 551, and the window 53 may be exposed through the through-hole 551.

The PCBA 56 may include a PCB and a plurality of electronic components electrically connected to the PCB.

The PCBA 56 may include a communication circuit that supports various types of communication.

The communication circuit may transmit/receive a radio frequency signal through at least one antenna radiator. For example, the communication circuit may include a short range communication circuit, and may support short range communication with an external device (e.g., WiFi, Bluetooth, NFC, or GNSS) by using at least one antenna radiator.

The communication circuit may support wired communication (e.g., a USB).

The PCBA 56 may include one or more antenna radiators that support various types of communication.

One or more antenna radiators may be various types of metallic members that are provided in the first electronic device 5. For example, the one or more antenna radiators may be disposed within the housing H of the first electronic device 5, or may form a portion of one face of the housing H. For example, the one or more antenna radiators may take a form of a metal plate, a coil type metal pattern and an annular metal member.

The housing H may include one or more antenna radiators while forming the exterior of the first electronic device 5. In the case where the housing H is formed of a metal, the one or more antenna radiators may include a partial metal region or an entire metal region of the housing H. Alternatively, at least one antenna radiator and at least a portion of the housing H may be exposed.

The one or more antenna radiators may be mounted on the PCB on which the communication circuit is mounted, and The one or more antenna radiators may support short range communication, may support cellular communication, and may support wireless charging. For example, the one or more antenna radiators may be used for transmitting wireless power to an external device, or for wirelessly receiving power from the external device.

The PCBA 56 may include a memory that stores a software-related program (a set of commands) that can be executed by a control circuit.

The memory may store received data (e.g., audio data) through various types of communication. Alternatively, the memory (e.g., a buffer) may store streamed audio data.

The PCBA 56 may include various types of output devices. For example, the PCBA 56 may include a speaker that converts an electric signal into a sound signal. The speaker may receive an audio signal acquired by reproducing audio data so as to generate sound.

The PCBA 56 may include a display that is exposed through a portion of the housing H.

The PCBA 56 may include a light emitting unit 561 (e.g., a Light Emitting Diode (LED) to support various notifications. The light generated from the light emitting unit 561 may be emitted through the window 53. For example, when charging is being performed, the light emitting unit 561 may emit a red color, and when charging is finished, the light emitting unit 561 may emit a green color. Alternatively, in the state where the first electronic device 5 and the second electronic device 6 are connected to each other in communication, the light emitting unit 561 may be controlled to emit a specific color. Alternatively, in the state where the first electronic device 5 and an external electronic device (e.g., a smart phone or a web server) are connected to each other in communication, the light emitting unit 561 may be controlled to emit a specific color. Alternatively, depending on the reproducing state of the audio data (e.g., during reproduction or temporary suspension of reproduction), the light emitting unit 561 may be controlled to emit a specific color. Alternatively, depending on a user input generated through the input device, the light emitting unit 561 may be controlled to generate a specific color. In addition to the foregoing, the light emitting unit 561 may be controlled depending on various events.

The PCBA 56 may include an input circuit that supports a user input. For example, the PCBA 56 may include a microphone that converts a sound signal into an electric signal. Alternatively, the PCBA 56 may include various forms of input push buttons. Alternatively, the PCBA 56 may include a touch panel or a touch pad of a touch type or a hovering type).

The PCBA 56 may include a sensor circuit configured to measure a physical amount or to sense the operating state of the first electronic device 5. For example, the sensor circuit may include, for example, an acceleration sensor, a gyro sensor, a geomagnetic field sensor, a magnetic sensor, a proximity sensor, a gesture sensor, a grip sensor, or a biometric sensor, or one of the other aforementioned sensors associated with FIG. 2.

The sensor circuit may output information or a signal related to whether the user comes close to the first electronic device 5. The sensor circuit may output information or a signal related to whether the first electronic device 5 is worn on the user's body.

The sensor circuit may output information or a signal related to the position of the first electronic device 5. For example, the sensor circuit may output information or a signal related to whether the first electronic device 5 is coupled to a specific electronic device. For example, the sensor circuit may detect information related to the distance between the first electronic device 5 and the second electronic device 6.

The PCBA 56 may include a battery that supplies power for driving the first electronic device 5.

The PCBA 56 may include a charging circuit, which may charge a battery, for example, by receiving power from an outside source.

The PCBA 56 may include an external interface for an electric connection with an external electronic device. For example, the PCBA 56 may include one or more contacts. The one or more contacts may be disposed on one face of the housing H. When the first electronic device 5 and an external electronic device are coupled to each other, the one or more contacts of the first electronic device 5 may be electrically connected to the contacts of the external electronic device.

The PCBA 56 may include a control circuit (e.g., one of the aforementioned processors) configured to control various signal flows, and to control, for example, information collection and output. The control circuit may execute various software programs (command sets) stored in the memory so as to perform various functions for the first electronic device 5. The control circuit may support various types of communication together with the communication circuit.

The control circuit may perform a function according to a user input generated from the input device. Alternatively, the control circuit may perform a function according to an input received from an outside source.

The control circuit may output audio data stored in a memory (e.g., a non-volatile memory or a volatile memory) through a speaker.

The control circuit may provide support for the first electronic device 5 to receive audio data from an external electronic device (e.g., a server, a smart phone, a PC, a PDA, or an access point) by using a communication circuit. The control circuit may cause the audio data, which is received from the external electronic device, to be stored in the memory. The control circuit may support the first electronic device 5 such that the audio data stored in the memory is output through the speaker.

The control circuit may be configured to connect the first electronic device 5 the second electronic device 6 and to receive audio data from the second electronic device 6 by using various types of communication. The control circuit may cause the audio data, which is received from the second electronic device 6, to be stored in the memory. The control circuit may be configured to output the audio data stored in the memory through the speaker of the first electronic device 5.

The second electronic device 6 may have a structure that is symmetric to that of the first electronic device 5. The second electronic device 6 may include a first housing 61, a second housing 62, a window 63, a tip 64, a cover 65, and a PCBA 66. Because the first housing 61, the second housing 62, the window 63, the tip 64, the cover 65, and the PCBA 66 of the second electronic device 6 may be similar to, or the same as, the first housing 51, the second housing 52, the window 53, the tip 54, the cover 55, and the PCBA 56 of the first electronic device 5, descriptions thereof will be omitted.

Figure 7:
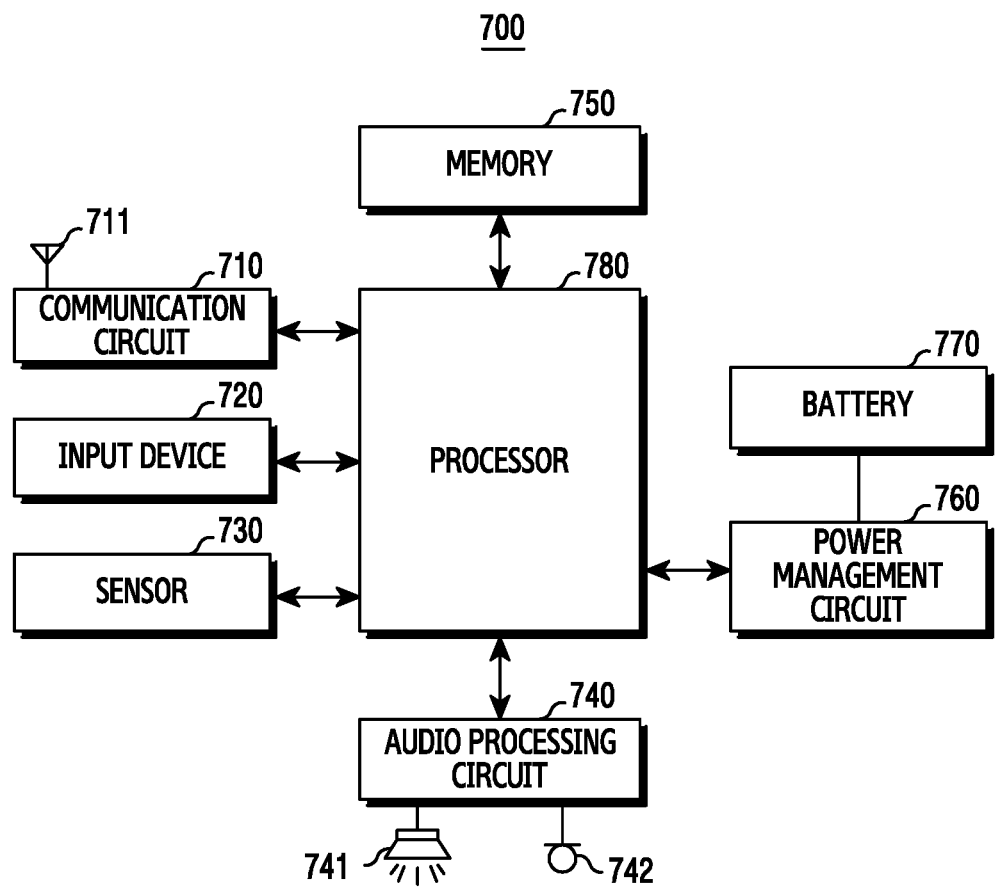
FIG. 7 is a diagram of an electronic device, according to an embodiment of the present disclosure.

FIG. 7 is a diagram of an electronic device 700, according to an embodiment of the present disclosure. The electronic device 700 may include all or some of the components of the electronic device 101 or the second electronic device 104 of FIG. 1. Alternatively, the electronic device 700 may include all or some of the components of the first electronic device 5 or the second electronic device 6 of FIGS. 4 to 6.

Referring to FIG. 7, the electronic device 700 includes an antenna radiator 711, a communication circuit 710, an input device 720, a sensor 730, an audio processing circuit 740, a memory 750, a power management circuit 760, a battery 770, or a processor 780.

The antenna radiator 711 may support various types of communication. The antenna radiator 711 may support short range communication. The short range communication may include at least one of, for example, WiFi, Bluetooth, NFC, and GNSS.

The antenna radiator 711 may support cellular communication. The cellular communication may use at least one of, for example, LTE, LTE-A, CDMA, WCDMA, UMTS, WiBro, and GSM.

The antenna radiator 711 may include a radiator configured to support wireless charging (e.g., a wireless charging coil). For example, the antenna radiator 711 may be used for transmitting wireless power to an external device, or may be used for wirelessly receiving power from the external device.

The antenna radiator 711 may be various types of metallic members that are provided in the electronic device 700. For example, the antenna radiator 711 may disposed inside the housing that forms the exterior of the electronic device 700, or may form a portion of one face of the housing.

The housing may include the antenna radiator 711 while forming the exterior of the electronic device 700. In the case where the housing is formed of a metal, the antenna radiator 711 may include a partial metal region or the entire metal region of the housing. Alternatively, the antenna radiator 711 and at least a portion of the housing may be exposed.

The antenna radiator 711 may be mounted on the PCB on which the communication circuit 710 is mounted.

The antenna radiator 711 may be configured in at least one type that may be selected from a mono-pole antenna, a dipole antenna, an inverted-f antenna (IFA), a planar inverted-f antenna (PIFA), a loop antenna and a slot antenna.

The communication circuit 710 may support wireless communication with an external device (e.g., a smart phone).

The communication circuit 710 may support various types of communication by using the antenna radiator 711. The communication circuit 710 may include all of the RF components between the antenna radiator 711 and the processor 780. For example, in the reception of a wireless signal, the communication circuit 710 may receive the wireless signal from the antenna radiator 711, may convert the received wireless signal into a baseband signal, and may transmit the converted baseband signal to the processor 780. The processor 780 may process the received baseband signal to control a human/mechanical interface of the electronic device 700, which corresponds to the received baseband signal. Alternatively, in the transmission of a wireless signal, the processor 780 may generate a baseband signal to output the base band signal to the communication circuit 710. The communication circuit 710 may receive the baseband signal from the processor 780, may convert the received baseband signal into a wireless signal, and may transmit the wireless signal the air through the antenna radiator 711.

The communication circuit 710 may support at least one communication system among single input multiple output (SIMO), multiple input single output (MISO), diversity, and multiple input multiple output (MIMO) by using the antenna radiator 711.

The communication circuit 710 may support wired or wireless communication with an external device. The communication circuit 710 may include an external interface. For example, the communication circuit 710 may include one or more contacts. The electronic device 700 may be mounted on a mounting part of another electronic device, and the one or more contacts of the electronic device 700 may be electrically connected to one or more contacts provided in the mounting part of the other electronic device.

The communication circuit 710 may support the reception of audio data from an external electronic device (e.g., a server, a smart phone, a PC, a PDA, or an access point). Alternatively, the communication circuit 710 may support the transmission of audio data to the external device.

The input device 720 may be configured to generate various input signals t for operating the electronic device 700. The input device 720 may include a touch pad, a touch panel, a button, or the like. The touch pad may recognize a touch input in at least one of, for example, a capacitive type, a pressure-sensitive type, an infrared type, and an ultrasonic type. When a capacitive-type touch pad is provided, it may be possible to recognize a physical contact or proximity. The touch pad may further include a tactile layer. The touch panel including the tactile layer may provide a tactile response to the user. The button may include, for example, a physical button, an optical key, or a keypad.

The input device 720 may generate a user input related to an ON or OFF state of the electronic device 700.

The input device 720 may generate a user input related to a communication (e.g., short range communication) connection with the electronic device 700 and an external device.

The input device 720 may generate a user input associated with audio data. For example, the user input may be associated with reproduction start, reproduction pause, reproduction stop, or reproduction speed control of audio data. Alternatively, the user input may be associated with, for example, a volume control or sound elimination.

The sensor 730 may measure a physical amount or sense an operating state of the electronic device 700. The sensor 730 may convert the measured or sensed information into an electric signal. The sensor 730 may include, for example, an acceleration sensor, a gyro sensor, a geomagnetic field sensor, a magnetic sensor, a proximity sensor, a gesture sensor, a grip sensor, or a biometric sensor, or one of the other aforementioned sensors of FIG. 2.

The sensor 730 may acquire information to be used for determining whether the user is positioned close to the electronic device 700. For example, the sensor 730 may output information or a signal indicating whether the electronic device 700 is worn on a user's ear(s).

The sensor 730 may output information or a signal indicating whether the electronic device 700 is coupled to an external device.

The audio processing circuit 740 may support an audio data collection function. The audio processing circuit 740 may reproduce collected audio data. The audio processing circuit 740 may include an audio decoder and a digital to analog (D/A) converter. The audio decoder may convert audio data stored in the memory 750 into a digital audio signal. The D/A converter may convert the digital audio signal, which has been converted by the audio decoder, into an analog audio signal. Alternatively, the audio decoder may convert audio data, which has received from an external device (e.g., a server, a smart phone, a PC, a PDA, or an access point) through the communication circuit 710 and stored in the memory 750, into a digital audio signal. The speaker 741 may output the analog audio signal converted by the D/A converter.

The A/D converter may convert an analog sound signal delivered through the microphone 742 into a digital sound signal.

The audio processing circuit 740 may reproduce various audio data set in the operating action of the electronic device 700. For example, when it is sensed that the user comes close to the electronic device 700, or when it is sensed that the user is not positioned close to the electronic device 700, the audio processing circuit 740 may be configured to reproduce audio data related to a corresponding effect or guide sound. Alternatively, when it is sensed that the electronic device 700 is coupled to an external device (e.g., a charging device), or when it is sensed that the electronic device 700 is separated from the external device, the audio processing circuit 740 may be configured to reproduce audio data related to a corresponding effect or guide sound. The output of the effect sound or guide sound may be omitted according to the user's setting or the designer's intention.

The audio processing circuit 740 may be included in the processor 780.

The memory 750 stores data, application programs, and algorithms, which correspond to various basic operation systems required for operating the electronic device 700 or various user functions. The memory 750 may include at least one high speed RAM (e.g., a magnetic disc storage device) and/or a non-volatile memory or at least one optical storage device and/or a flash memory (e.g., NAND or NOR).

The memory 750 may include a non-volatile memory that stores first audio data (hereinafter, "non-volatile audio data") received from an external electronic device (e.g., a server, a smart phone, a PC, a PDA, or an access point). Alternatively, the memory 750 may include a volatile memory that stores second audio data (hereinafter, "volatile audio data") received from the external device.

The power management circuit 760 (e.g., PMIC) may effectively manage and optimize the use of power of the battery 770 within the electronic device 700. For example, to be suitable for a load to be processed, the processor 780 may transmit a signal according to the load to the power management circuit 760. The power management circuit 760 may adjust the power to be supplied to the processor 780.

The power management circuit 760 may include a battery charging circuit. For example, when the electronic device 700 is coupled to an external device, the power management circuit 760 receives power from the external device to charge the battery 770.

The power management circuit 760 may include a wireless charging circuit. The power management circuit 760 may be configured to optimize power distribution between the battery charging circuit and the power supply device of the electronic device 700.

The electronic device 700 may further include a display device. For example, the display device may be configured to provide various screen interfaces required for operating the electronic device 700. The display device may provide a user interface related to the reproduction of audio data. The display device may provide a user interface related to a function of receiving audio data from an external device. Alternatively, the display device may provide a user interface related to a function of receiving audio data from an external device. Alternatively, the display device may provide a user interface related to a function of receiving audio data from an external device, and transmitting the received audio data to another external device.

The display device may be provided as a touch screen in which a display panel and a touch panel are superimposed with each other. For example, images or texts corresponding to various screens may be output to the display panel, and at least one of the screen interfaces may be output to the display panel. The touch panel may set a touch-effective region configured to collect touch events according to a screen characteristic output to the display panel and a touch-non-effective region configured to ignore collected touch events or not to perform touch event collection. The touch panel may deliver a touch event generated in the touch-effective region to the processor 780.

The processor 780 may support various operations at least partially based on the user input induced from the input device 720. For example, the processor 780 may turn on or off the electronic device 700 according to a user input. For example, the processor 780 may be connected to another electronic device that is in communication with the electronic device 700 according to the user input. For example, the processor 780 may control the reproduction of audio data according to the user input. For example, the processor 780 may control reproduction start, reproduction pause, reproduction stop, reproduction speed control, or sound elimination of audio data according to the user input.

The processor 780 may support various operations at least partially based on information acquired from the sensor 730.

The processor 780 may receive status information of another electronic device from the communication circuit 710, and may support various operations at least partially based on the status information of the other electronic device.

The electronic device 700 may provide a sound recognition function that generates a sound command from an analog sound signal received using the microphone 742. The sound command may be related to an input for supporting, for example, the reception, transmission, or reproduction of audio data.

The processor 780 may be configured to control various signal flows and to control information collection and output in order to support the reproduction of various audio data. The processor 780 may include the components illustrated in FIG. 8 (e.g., an input collection unit, a use mode determination unit, and a reproduction support unit), a description of which is described below.

The electronic device 700 may further include various modules according to a provided type. For example, the electronic device 700 may further include components, such as an internet communication module that is configured to communicate with an internet network to perform an internet function and a digital broadcasting module configured to perform a function of receiving and reproducing a digital broadcasting. Although such components are modified according to the convergence tendency of digital devices such that it is impossible to enumerate all of the components, components on a level of the above-mentioned components may be additionally included in the electronic device. With respect to the electronic device 700, specific components may be omitted from the above-mentioned components or may be replaced by other components according to the provided type of the electronic device 700.

Figure 8:
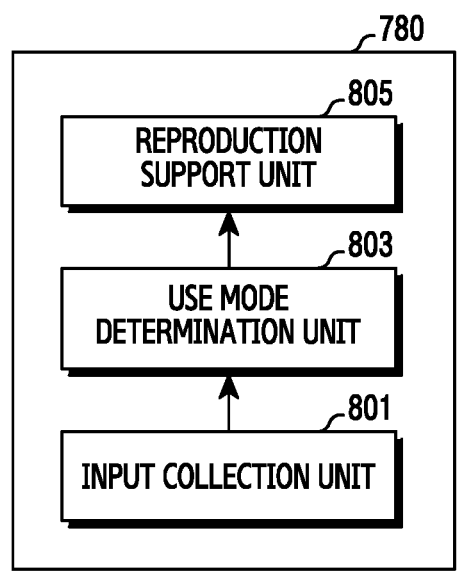
FIG. 8 is a diagram of a processor, according to an embodiment of the present disclosure.

FIG. 8 is a diagram of the processor 780, according to an embodiment of the present disclosure.

Referring to FIG. 8, the processor 780 includes an input collection unit 801, a use mode determination unit 803, and a reproduction support unit 805.

The input collection unit 801 collects inputs from the sensor 730, the input device 720, or the communication circuit 710, and delivers the collected inputs to the use mode determination unit 803.

The input collection unit 801 collects one or more inputs from the input device 720. For example, the input collection unit 801 may collect gestures generated on a touch pad of the electronic device 700. Alternatively, the input collection unit 801 may collect inputs made using a button of the electronic device 700. Alternatively, the input collection unit 801 may collect sound inputs.

The input collection unit 801 may collect inputs related to switch-setting of reproduction methods of audio data from the input device 720. The reproduction methods of audio data may be set through manual switching or automatic switching. For example, when there is an input that causes an audio reproduction method to be manually switched, the input collection unit 801 collects the user inputs related to the selection of an audio reproduction method through the input device 720. Alternatively, when there is an input to cause the audio reproduction method to be automatically switched, the input collection unit 801 collects inputs from a plurality of components (e.g., the sensor 730) in order to collect status information related to the electronic device 700 and/or an external device.

The input collection unit 801 may collect information from the sensor 730. For example, the input collection unit 801 may acquire position information of the electronic device 700 from the sensor 730. The position information may be related to whether the electronic device 700 is positioned close to the user, whether the electronic device 700 is worn by the user, and/or whether the electronic device 700 is mounted on an external device, such as a charging device, or the position information may include a distance between the electronic device 700 and the external electronic device.

The input collection device 801 may collect position information of an external electronic device through the communication circuit 710. For example, the position information may be related to whether the external electronic device is positioned close to the user, whether the electronic device 700 is worn by the user, or whether a first external electronic device is mounted on a second external device, such as a charging device.

The input collection device 801 may collect information related to the residual amount of the battery 770 of the electronic device 700. Alternatively, the input collection device 801 may collect position information related to a residual amount of the battery of an external electronic device through the communication circuit 710.

The input collection device 801 may collect information related to whether the electronic device 700 is operating in a power saving mode or a sleep mode. Alternatively, the input collection device 801 may collect information related to whether an external electronic device is operating in a power saving mode or a sleep mode through the communication circuit 710.

The input collection device 801 may collect wireless signal intensity of the external electronic device through the communication circuit 710.

The use mode determination unit 803 determines a use mode based on various inputs acquired from the input collection unit 801. The use mode may include, for example, a dual mode or a non-dual mode. The dual mode may refer to a state in which the electronic device 700 and an external electronic device are or are not worn on opposite ears of a user.

When it is confirmed that the user is positioned relatively close to the electronic device 700 and the external electronic device, the use mode determination unit 803 may select the dual mode. Alternatively, when it is confirmed that at least one of the electronic device 700 and the external electronic device is not positioned relatively close to the user, the use mode determination unit 803 may select the non-dual mode.

When it is confirmed that the electronic device 700 and the external electronic device are worn on the user's body, the use mode determination unit 803 may select the dual mode. Alternatively, when it is confirmed that at least one of the electronic device 700 and the external electronic device is not worn on the user's body, the use mode determination unit 803 may select the non-dual mode.

When the distance between the electronic device 700 and the external electronic device does not exceed a critical distance, the use mode determination unit 803 may select the dual mode. For example, when the electronic device 700 and an external electronic device are worn on opposite ears of the user, the distance between the two electronic devices may be within a critical distance. Alternatively, when the distance between the electronic device 700 and the external electronic device exceeds the critical distance, the use mode determination unit 803 may select the non-dual mode.

When an external electronic device, which is connectable to the electronic device 700 in communication, is not found, the use mode determination unit 803 may select the non-dual mode. For example, when a power source of an external electronic device is in an off state, it may be difficult for the electronic device 700 to find the external electronic device.

Alternatively, in a case where the power source of an external electronic device is in the on state, but the external electronic device is located at a distance where a communication connection is difficult to establish, it may be difficult for the electronic device 700 to find the external electronic device.

An external electronic device may be set not to allow a communication connection with the electronic device 700, and the use mode determination unit 803 may select the non-dual mode. Alternatively, the electronic device 700 may be set not to allow a communication connection with an external electronic device, and the use mode determination unit 803 may select the non-dual mode.

When it is sensed that at least one of the electronic device 700 and a first external electronic device is mounted on a second external electronic device (e.g., a power supplier), the use mode determination unit 803 may select the non-dual mode.

The reproduction support unit 805 may select a reproduction method of audio data based on the type of audio data and a determination result from the use mode determination unit 803. The reproduction method may include, for example, stereo reproduction or mono reproduction.

When the audio data is mono audio data, because the audio data cannot be reproduced with the stereo method, the use mode determination unit 803 may select the mono reproduction method regardless of the use mode (non-dual mode or dual mode).

In the non-dual mode, the reproduction support unit 805 may reproduce audio data stored in the memory 750 with the mono method. For example, even if audio data is stereo audio data, in the non-dual mode, the reproduction support unit 805 may decode the entire stereo audio data to acquire an audio signal, and may output the audio signal through the speaker 741.

The reproduction support unit 805 may store audio data (or streamed audio data) received from an external electronic device (e.g., a smart phone, a PC, a PDA, a server or an access point) in the memory 750. In the non-dual mode, the reproduction support unit 805 may reproduce the audio data received from the external electronic device with the mono method. For example, even if audio data received from the external electronic device is stereo audio data, in the non-dual mode, the reproduction support unit 805 may decode the entire stereo audio data to acquire an audio signal, and may output the audio signal through the speaker 741.

In the case where the audio data stored in the memory 750 is mono audio data, because the audio data cannot be reproduced with the stereo method, in the dual mode, the reproduction support unit 805 may reproduce the audio data with the mono method. For example, in the dual mode, the reproduction support unit 805 may decode the mono audio data to acquire an audio signal, and may output the audio signal through the speaker 741.

In the case where the audio data stored in the memory 750 is stereo audio data, in the dual mode, the reproduction support unit 805 may reproduce the stereo audio data with the stereo method. For example, in the dual mode, the reproduction support unit 805 may decode a portion of the stereo audio data to acquire an audio signal, and may output the audio signal through the speaker 741.

In the dual mode, the reproduction support unit 805 may transmit a synchronization signal related to audio data stored in the memory 750 to an external electronic device. Based on a response related to the synchronization signal received from the external electronic device, the reproduction support unit 805 may reproduce the audio data with the mono method or the stereo method. The operation of transmitting the synchronization signal to the external electronic device by the reproduction support unit 805 in the dual mode and the operation of transmitting a response to respond to the synchronization signal by the external electronic device to the electronic device 700 may be performed periodically. For example, the electronic device 700 may transmit a request message for using a time stamp to the external electronic device, and may receive a response message to respond thereto from the external electronic device.

In the case where the same audio data corresponding to the synchronization signal is stored in an external electronic device, the external electronic device may transmit a synchronization enable response related to the synchronization signal to the electronic device 700. In response to the synchronization signal from the electronic device 700, the external electronic device may reproduce the same audio data with the mono method or stereo method according to the type of the audio data (mono audio data or stereo audio data).

In the case where the electronic device 700 and the external electronic device are worn on opposite ears of the user (dual mode), the external electronic device transmits a synchronization enable response to the electronic device 700, and the electronic device 700 receives the synchronization enable response from the external electronic device, the electronic device 700 and the external electronic device may independently reproduce the same mono audio data with the mono method.

In the case where the electronic device 700 and the external electronic device are worn on opposite ears of the user (dual mode), the external electronic device transmits a synchronization enable response to the electronic device 700, and the electronic device 700 receives the synchronization enable response from the external electronic device; the electronic device 700 and the external electronic device may independently reproduce the same stereo audio data with the stereo method. For example, the electronic device 700 may decode a first portion of the stereo audio data to acquire a first audio signal, and may output the first audio signal through the speaker 741. The external electronic device may decode a second portion of the same stereo audio data to acquire a second audio signal, and may output the second audio signal through the speaker 741. First sound related to the first portion of the stereo audio data reproduced by the electronic device 700 may be introduced into one of the user's ear, and a second sound related to the second portion of the same stereo audio data reproduced by the external electronic device may be introduced into the other of the user's ears, which may provide the user with a chance to experience stereophonic sound.

In the case where audio data corresponding to the synchronization signal is not stored in another electronic device, the external electronic device may transmit a synchronization disable response related to the synchronization signal to the electronic device 700. In the case where the synchronization disable response is received from the external electronic device, the reproduction support unit 805 may reproduce the audio data. For example, in the case where the audio data stored in the memory 750 is mono audio data, the reproduction support unit 805 may decode the mono audio data to acquire an audio signal, and may output the audio signal through the speaker 741 (mono reproduction). Alternatively, in the case where the audio data stored in the memory 750 is stereo audio data, the reproduction support unit 805 may decode a portion of the stereo audio data to acquire an audio signal, and may output the audio signal through the speaker 741 (stereo reproduction).

In the case where the synchronization disable response is received from the external electronic device in the dual mode, the reproduction support unit 805 may transmit the audio data to the external electronic device (e.g., streaming). For example, the electronic device 700 may serve as a master and the external electronic device may serve as a slave. The external electronic device may reproduce the audio data received from the electronic device 700. For example, in the case where the audio data received from the electronic device 700 is mono audio data, the external electronic device may decode the mono audio data to acquire an audio signal, and may output the audio signal through a speaker (mono reproduction). For example, in the case where the audio data received from the electronic device 700 is stereo audio data, the external electronic device may decode a portion of the stereo audio data to acquire an audio signal, and may output the audio signal through a speaker (stereo reproduction). For example, when the electronic device 700 and the external electronic device are mounted on opposite ears of the user (dual mode), the electronic device 700 may decode a first portion of the stereo audio data stored in the memory 750 to acquire a first audio signal, and may output the first audio signal through the speaker 741. In addition, the external electronic device may decode a second portion of the stereo audio data received from the electronic device 700 to acquire a second audio signal, and may output the second audio signal through the speaker. The output of the first audio signal by the electronic device 700 and the output of the second audio signal by the external electronic device may provide the user with a chance to experience stereophonic sound.

When a synchronization disable response is received from the external electronic device in the dual mode, the reproduction support unit 805 may decode the audio data stored in the memory 750 to acquire an audio signal, and may output the audio signal through the speaker 741. In addition, the reproduction support unit 805 may transmit the audio signal to the external electronic device. The external electronic device may output, through its speaker, the audio signal received from the electronic device 700 without decoding the corresponding audio data.

For example, the reproduction support unit 805 may decode mono audio data stored in the memory 750 to acquire an audio signal. In addition, the reproduction support unit 805 may output the audio signal through the speaker, and may transmit the audio signal to the external electronic device. When the electronic device 700 and the external electronic device are mounted on opposite ears of the user (dual mode), the electronic device 700 and the external electronic device may output the same mono audio data through the speakers thereof, respectively.

For example, the reproduction support unit 805 may decode a first portion of the stereo audio data stored in the memory 750 to acquire a first audio signal, and may decode a second portion of the stereo audio data to obtain a second audio signal. The reproduction support unit 805 may output the first audio signal through the speaker 741. The reproduction support unit 805 may transmit the second audio signal to the external electronic device. When the electronic device 700 and the external electronic device are mounted on opposite ears of the user (dual mode), the electronic device 700 may output the first audio signal through its speaker and the external electronic device may output the second audio signal through its speaker. This may provide the user with a chance to experience stereophonic sound.

In the dual mode, the reproduction support unit 805 may receive audio data from an audio providing device (e.g., a server, a portable phone, a PC, a PDA, or an access point) (streaming). In the dual mode, the reproduction support unit 805 may store the audio data that is received from the audio providing device in the memory 750. In the dual mode, the reproduction support unit 805 may reproduce the audio data received from the audio providing device. For example, in the case where the audio data received from the audio providing device is mono audio data, in the dual mode, the reproduction support unit 805 may decode the mono audio data to acquire an audio signal, and may output the audio signal through the speaker 741 (mono reproduction). Alternatively, in the case where the audio data received from the audio providing device is stereo audio data, in the dual mode, the reproduction support unit 805 may decode a portion of the stereo audio data to acquire an audio signal, and may output the audio signal through the speaker 741 (stereo reproduction).

In the dual mode, the reproduction support unit 805 may transmit the audio data received from the audio providing device to an external electronic device (streaming). For example, the electronic device 700 may serve as a master and the external electronic device may serve as a slave. The external electronic device may reproduce the audio data received from the electronic device 700. For example, in the case where the audio data received from the electronic device 700 is mono audio data, the external electronic device may decode the mono audio data to acquire an audio signal, and may output the audio signal through a speaker (mono reproduction). For example, in the case where the audio data received from the electronic device 700 is stereo audio data, the external electronic device may decode a portion of the stereo audio data to acquire an audio signal, and may output the audio signal through a speaker (stereo reproduction). For example, when the electronic device 700 and the external electronic device are mounted on opposite ears of the user (dual mode), the electronic device 700 may output, through the speaker 741, a portion of the stereo audio data received from the audio providing device, and the external electronic device may output, through its speaker, a portion of the audio data received from the electronic device 700. This may provide the user with a chance to experience stereophonic sound.

In the dual mode, the reproduction support unit 805 may decode the audio data received from the audio providing device to acquire an audio signal, and may output the audio signal through the speaker 741. In addition, the reproduction support unit 805 may transmit the audio signal to the external electronic device. The external electronic device may output, through the speaker, the audio signal received from the electronic device 700 without decoding the corresponding audio data.

For example, the reproduction support unit 805 may decode mono audio data received from the audio providing device to acquire an audio signal. In addition, the reproduction support unit 805 may output the audio signal through the speaker, and may transmit the audio signal to the external electronic device. When the electronic device 700 and the external electronic device are mounted on opposite ears of the user (dual mode), the electronic device 700 and the external electronic device may output the same mono audio signal through the speakers thereof, respectively.

For example, the reproduction support unit 805 may decode a first portion of the stereo audio data received from the audio providing device to acquire a first audio signal, and may decode a second portion of the stereo audio data to obtain a second audio signal. The reproduction support unit 805 may output the first audio signal through the speaker 741. The reproduction support unit 805 may transmit the second audio signal to the external electronic device. When the electronic device 700 and the external electronic device are mounted on opposite ears of the user (dual mode), the electronic device 700 may output the first audio signal through its speaker and the external electronic device may output the second audio signal through its speaker. This may provide the user with a chance to experience stereophonic sound.

The electronic device may include a housing including a portion configured to be detachably mounted on one of a user's ears, a wireless communication circuit included in the housing, a battery included in the housing, a speaker included in the housing and disposed to face the user's eardrum when the portion of the housing is coupled to one of the user's ears, and at least one sensor included in the housing. The electronic device may include a processor included in the housing and electrically connected to the wireless communication circuit, the battery, the speaker, and the at least one sensor. The electronic device may include a memory included in the housing and electrically connected to the processor, the memory being configured to store audio data. The memory may store instructions, which cause the processor to: request a connection from an external device configured to be detachably mounted on another one of the user's ears by using the communication circuit; determine a portion to be output from the audio data stored in the memory based on whether a response of the external device for the request for the connection is received and/or at least a portion of at least one signal received from the external device by formation of the requested connection; and output the determined portion through the speaker.

The at least one signal received from the external device may include status information of the external device. The instructions may cause the processor to determine a portion to be output in the audio data stored in the memory based on the received status information of the external device.

The instructions may cause the processor to: output only a portion of the audio data through the speaker in a case where the received status information of the external device includes a first status; and output the audio data entirely through the speaker in a case where the received status information of the external device includes a second status.

The instructions may cause the processor to: transmit a synchronization signal related to the audio data to the external device in a case where the received status information of the external device includes a first status; receive a response related to the synchronization signal from the external device; and output the portion through the speaker in response to the received response. The instructions may cause the processor not to transmit the synchronization signal related to the audio data to the external device in a case where the received status information of the external device includes a second status.

The instructions may cause the processor to: acquire the status information of the electronic device using the at least one sensor; and transmit the acquired status information of the electronic device to the external device by using the communication circuit.

The instructions may cause the processor to output the audio data entirely through the speaker in a case where the external device does not respond to the request for the connection.

The first status may include a state where the external device is positioned close to a user, and the second status may include a state where the external device is not positioned close to a user.

The electronic device may include a housing including a portion configured to be detachably mounted on one of a user's ears, a wireless communication circuit included in the housing, a battery included in the housing, a speaker included in the housing and disposed to face the user's eardrum when the portion of the housing is coupled to one of the user's ears, and at least one sensor included in the housing. The electronic device may include a processor included in the housing and electrically connected to the wireless communication circuit, the battery, the speaker, and the at least one sensor. The electronic device may include a storage device included in the housing and electrically connected to the processor. The electronic device may include a volatile memory included in the housing. The storage device may store instructions, which, upon being executed, cause the processor to: receive audio data from a first external device by using the communication circuit; store the received audio data in the volatile memory; request a connection from a second external device configured to be detachably mounted on another one of the user's ears by using the communication circuit; determine a portion to be output from the audio data stored in the volatile memory based on whether a response of the second external device for the request for the connection is received and/or at least a portion of at least one signal received from the second external device by formation of the requested connection; and output the determined portion through the speaker.

The instructions may cause the processor to output the audio data entirely through the speaker in a case where the second external device does not respond to the request for the connection.

The at least one signal received from the second external device may include status information of the second external device. The instructions may cause the processor to output only a portion of the audio data through the speaker in a case where the received status information of the external device includes a first status, and to output the audio data entirely through the speaker in a case where the received status information of the external device includes a second status.

The first status may include a state where the second external device is positioned close to a user, and the second status may include a state where the second external device is not positioned close to a user.

Figure 9A:
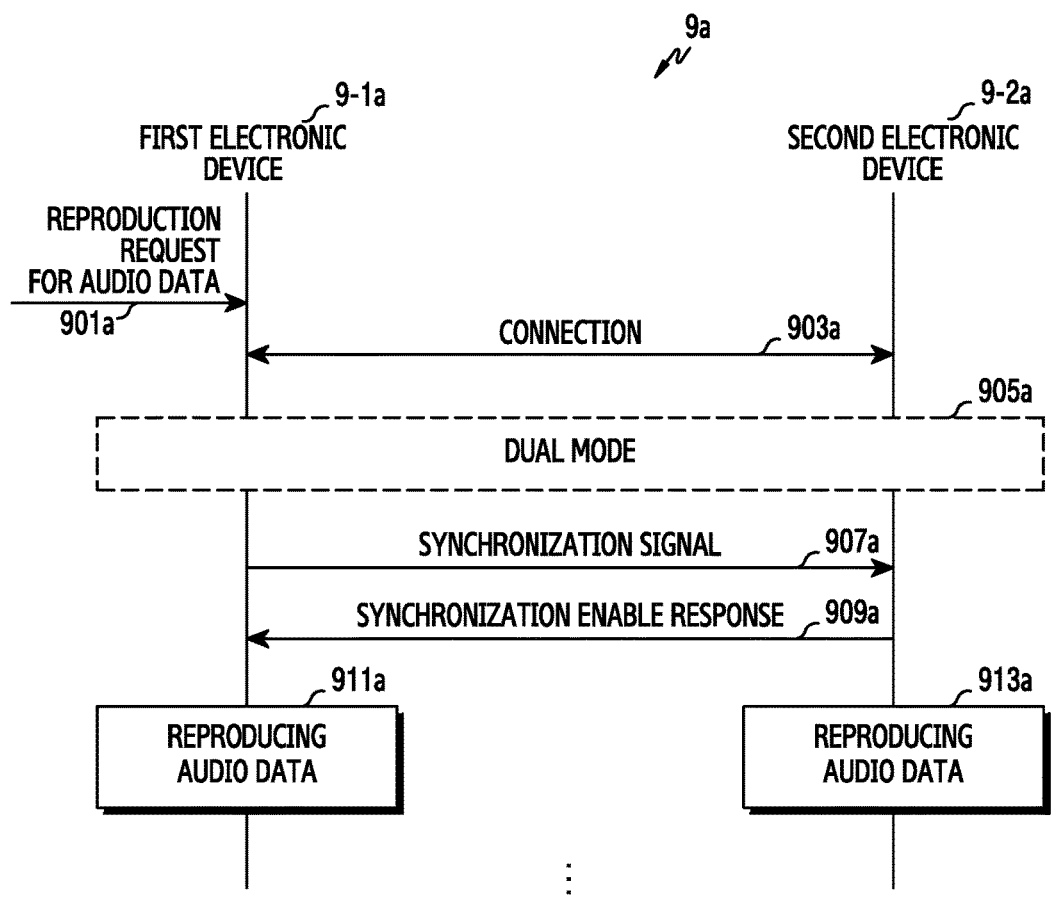
FIG. 9A is a signaling diagram of communication flow of a system between electronic devices, according an embodiment of the present disclosure.

FIG. 9A is a signaling diagram of communication flow between electronic devices, according to an embodiment of the present disclosure.

the system 9a includes a first electronic device 9-1a and/or the second electronic device 9-2a which may include all or some of the components of the electronic device 101 and/or the second external electronic device 104 of FIG. 1, or the first electronic device 9-1a may include all or some of the components of the first electronic device 5 of FIG. 6, and the second electronic device 9-2a may include all or some of the components of the second electronic device 6 of FIG. 6.

Referring to FIG. 9A, in step 901a, the first electronic device 9-1a may receive a reproduction request for audio data stored in the memory of the first electronic device 9-1a. For example, the reproduction request for the audio data may be made by a user input.

In step 903a, the first electronic device 9-1a and the second electronic device 9-2a may be in operating communication with each other. For example, the first electronic device 9-1a and the second electronic device 9-2a may be connected by using short range communication (e.g., WiFi, Bluetooth, NFC, or GNSS). Alternatively, the first electronic device 9-1a and the second electronic device 9-2a may be connected prior to the reproduction request.

In step 905a, when it is confirmed that the first electronic device 9-1a and the second electronic device 9-2a are positioned relatively close to the user, the first electronic device 9-1a and the second electronic device 9-2a may be set in a dual mode. For example, in the case where the first electronic device 9-1a and the second electronic device 9-2a are worn on the opposite ears of the user, the first electronic device 9-1a and the second electronic device 9-2a may be set in a dual mode.

In step 907a, the first electronic device 9-1a may transmit a synchronization signal related to the audio data, for which the reproduction request is made, to the second electronic device 9-2a.

In step 909a, the second electronic device 9-2a may transmit a synchronization enable response to the first electronic device 9-1a in response to the synchronization signal. For example, in the case where audio data, which is the same as audio data corresponding to the synchronization signal received from the first electronic device 9-1a, is stored in the second electronic device 9-2a, the second electronic device 9-2a may transmit a synchronization enable response related to the synchronization signal to the first electronic device 9-1a.

In step 911a, when the synchronization enable response related to the synchronization signal is received from the second electronic device 9-2a, the first electronic device 9-1a may reproduce the audio data, for which the reproduction request is made. For example, in the case where the audio data, for which the reproduction request is made, is mono audio data, the first electronic device 9-1a may decode the mono audio data to acquire an audio signal, and may output the audio signal through a speaker (mono reproduction). Alternatively, in the case where the audio data, for which the reproduction request is made, is stereo audio data, the first electronic device 9-1a may decode a portion of the stereo audio data to acquire an audio signal, and may output the audio signal through a speaker (stereo reproduction). The portion decoded by the first electronic device 9-1a in the stereo audio data may be a portion designated to the first electronic device 9-1a.

In step 913a, the synchronization signal is received from the first electronic device 9-1a, the second electronic device 9-2a may reproduce the same audio data stored in the second electronic device 9-2a based on the synchronization signal. For example, in the case where the synchronization enable audio data is mono audio data, the second electronic device 9-2a may decode the mono audio data to acquire an audio signal, and may output the audio signal through a speaker (mono reproduction). Alternatively, in the case where the reproduction enable audio data is stereo audio data, the second electronic device 9-2a may decode a portion of the stereo audio data to acquire an audio signal, and may output the audio signal through a speaker (stereo reproduction). The portion decoded by the second electronic device 9-2a in the stereo audio data may be a portion designated to the second electronic device 9-2a.

In the case where the first electronic device 9-1a and the second electronic device 9-2a store the same audio data, the first electronic device 9-1a and the second electronic device 9-2a may independently reproduce the audio data. For example, when the first electronic device 9-1a and the second electronic device 9-2a are mounted on opposite ears of the user (dual mode), the first electronic device 9-1a may output a first portion of the stereo audio data through its speaker, and the second electronic device 9-2a may output a second portion of the same stereo audio data through its speaker. This may provide the user with a chance to experience stereophonic sound.

All the audio data of the first electronic device 9-1a may be stored in the second electronic device 9-2a, as indicated Table 1 below. Because the second electronic device 9-2a stores all of the audio data of the first electronic device 9-1a, the first electronic device 9-1a and the second electronic device 9-2a may reproduce the same audio data.

TABLE 1

| First Electronic Device 9-1a | Second Electronic Device 9-2a |
|---|---|
| ABC | ABC |
| BCD | BCD |
| CDE | CDE |
| ... | ... |

The order of the steps of FIG. 9A may be changed, or some of the operations may be simultaneously executed.

Figure 9B:
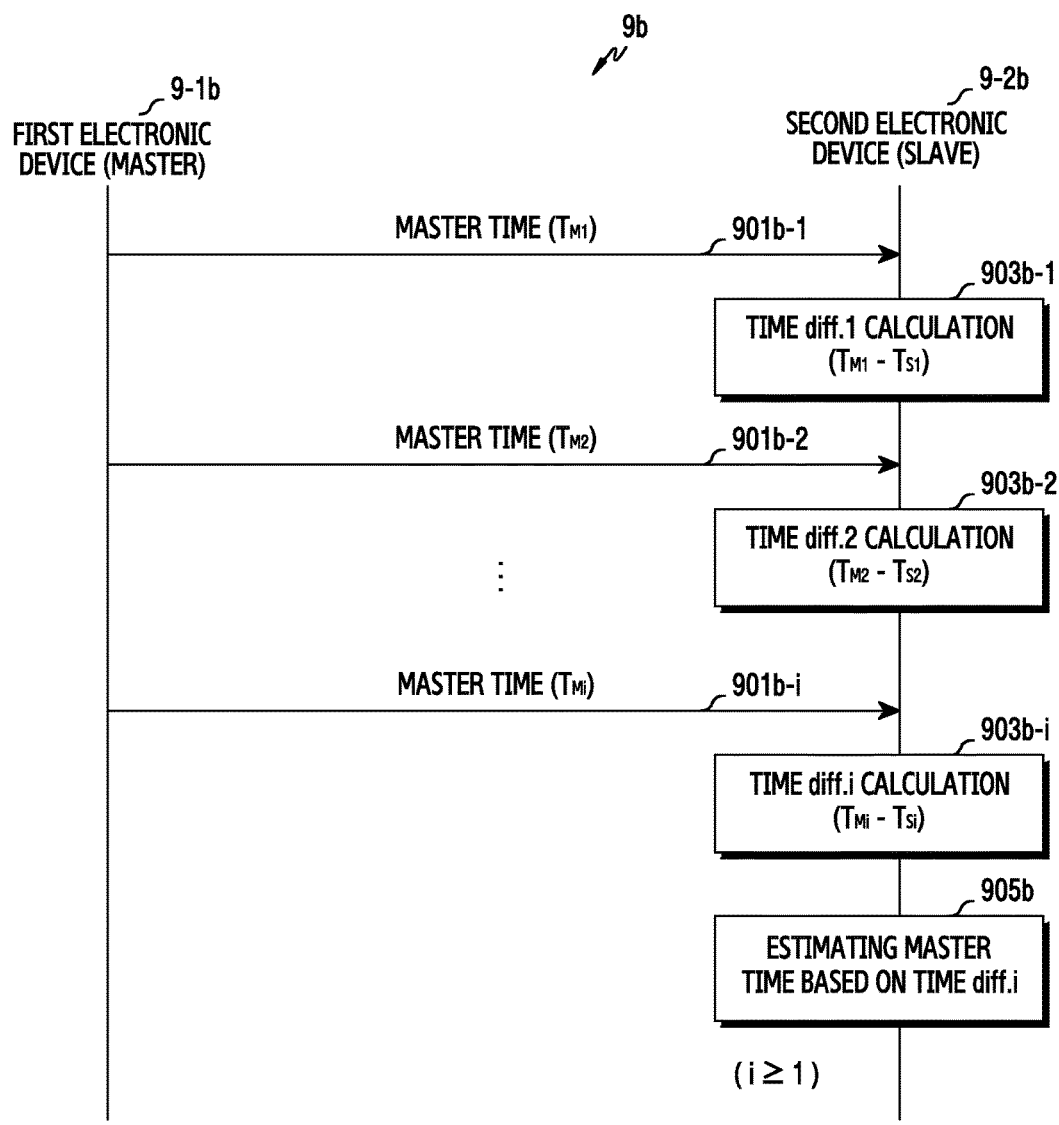
FIG. 9B is a signaling diagram of communication flow of a system between electronic devices, according to an embodiment of the present disclosure.

FIG. 9B is a signaling diagram of communication flow between electronic devices, according to an embodiment of the present disclosure. A system 9b includes a first electronic device 9-1b and a second electronic device 9-2b. The first electronic device 9-1b or the second electronic device 9-2b may include all or some of the components of the electronic device 101 and/or all or some of the components of the first external electronic device 102 or the second external electronic device 104 of FIG. 1. Alternatively, the first electronic device 9-1b may include all or some of the components of the first electronic device 5 of FIG. 6, and the second electronic device 9-2b may include all or some of the components of the second electronic device 6 of FIG. 6. Alternatively, the first electronic device 9-1b may include all or some of the components of the first electronic device 9-1a of FIG. 9A, and the second electronic device 9-2b may include all or some of the components of the second electronic device 9-2a of FIG. 9A.

The first electronic device 9-1b may be a master electronic device (hereinafter, referred to as a "master"), and the second electronic device 9-2b may be a slave electronic device (hereinafter, referred to as a "slave").

Referring to FIG. 9B, in step 901b-i, the master 9-1b may transmit its own time (hereinafter, referred to as "master time") $T_{Mi}$ to the slave 9-2b. The master time $T_{Mi}$ may be a clock of a first timer included in the master 9-1b.

In step 903b-i, in response to the reception of the master time $T_{Mi}$ from the master 9-1b, the slave 9-2b confirms its own time (hereinafter, referred to as "slave time") $T_{Si}$, and may calculate a difference between the master time $T_{Mi}$ and the slave time $T_{Si}$, Time diff.i. The slave time $T_{Si}$ may be a clock of a second timer included in the slave 9-2b.

In step 905b, the slave 9-2b may estimate the time of the master 9-1b based on at least some of the differences Time diff.i. The slave 9-2b may confirm the minimum difference Time diff.i from at least one difference Time diff.i, and may estimate the time of the master 9-1b by adding the current slave time $T_{Si}$ to the minimum difference Time diff.i. The slave 9-2b may estimate the time of the master 9-1b in consideration of at least one difference Time diff.i and a deviation rate among the differences.

The estimated master time may be used for time synchronization between the master 9-1b and the slave 9-2b in a wireless embedded environment.

In step 905*b*, time may be synchronized in the wireless embedded environment including the master 9-1*b* and the slave 9-2*b*.

Figure 9C:
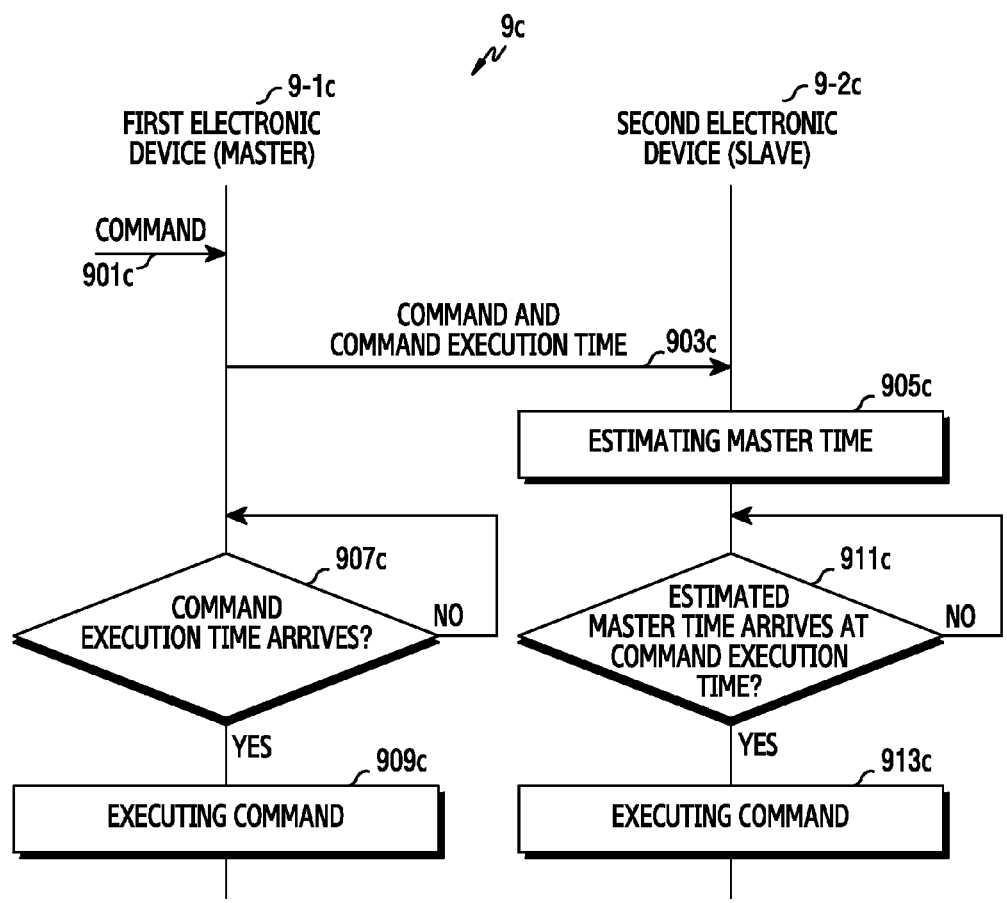
FIG. 9C is a signaling diagram of communication flow of a system between electronic devices, according to an embodiment of the present disclosure.

FIG. 9C is a signaling diagram of communication flow of a system between electronic devices, according to an embodiment of the present disclosure. A system 9*c* may include a first electronic device 9-1*c* and a second electronic device 9-2*c*. The first electronic device 9-1*c* or the second electronic device 9-2*c* may include all or some of the components of the electronic device 101 of FIG. 1, or may include all or some of the components of the first external electronic device 102 or the second external electronic device 104 of FIG. 1. Alternatively, the first electronic device 9-1*c* may include all or some of the components of the first electronic device 5 of FIG. 6, and the second electronic device 9-2*c* may include all or some of the components of the second electronic device 6 of FIG. 6. The first electronic device 9-1*c* may include all or some of the components of the first electronic device 9-1*b* of FIG. 9B, and the second electronic device 9-2*c* may include all or some of the components of the second electronic device 9-2*b* of FIG. 9B.

The first electronic device 9-1*c* may be a master electronic device, and the second electronic device 9-2*c* may be a slave electronic device.

In step 901*c*, the master 9-1*c* may sense a command related to audio data. The command may be transmitted to the master 9-1*c* from an external electronic device, or may be generated through various input devices (e.g., a key button, a touch key button, and a sound recognition device) included in the master 9-1*c*.

In step 903*c*, the master 9-1*c* may deliver the command and the time for executing the command to the slave 9-2*c*. For example, the time for executing the command may a time obtained by adding a preset time to the master time when the master 9-1*c* has sensed the command. Alternatively, the time for executing the command may a time obtained by adding a set time to the master time when the master 9-1*c* has transmitted the command to the slave 9-2*c*. The set time may be a time determined in consideration of a time required for transmitting the command to the slave 9-2*c*, and a time required for executing the command by the slave 9-2*c*.

In step 905*c*, the slave 9-2*c* may estimate the time of the master 9-1*c*. The slave 9-2*c* may estimate the time of the master 9-1*c* based on the operation flow described with reference to FIG. 9B. In step 905*c*, the estimated master time may be used for time synchronization between the master 9-1*c* and the slave 9-2*c* in a wireless embedded environment.

When the command execution time arrives, the master 9-1*c* senses it in step 907*c*, and executes the command in step 909*c*.

When the estimated master time arrives at the command execution time, the slave 9-2*c* senses it in step 911*c*, and executes the command in step 913*c*.

The command related to the audio data may be related to, for example, reproduction start, reproduction stop, reproduction pause, reproduction resume, reproduction position, reproduction speed, reproduction skip, next audio data reproduction, or previous audio data reproduction. Alternatively, the command related to the audio data may be related to, for example, a volume control or a sound effect. Other various commands may be enabled.

The master 9-1*c* and the slave 9-2*c* may execute the command at the time synchronized according to the operation flow of FIG. 9C.

The flow for executing a command by synchronizing time as represented in FIG. 9C may be applied to the operation flow of independently reproducing the same audio data by the first electronic device 9-1*a* and the second electronic device 9-2*a* in the dual mode represented in FIG. 9A.

Figure 9D:
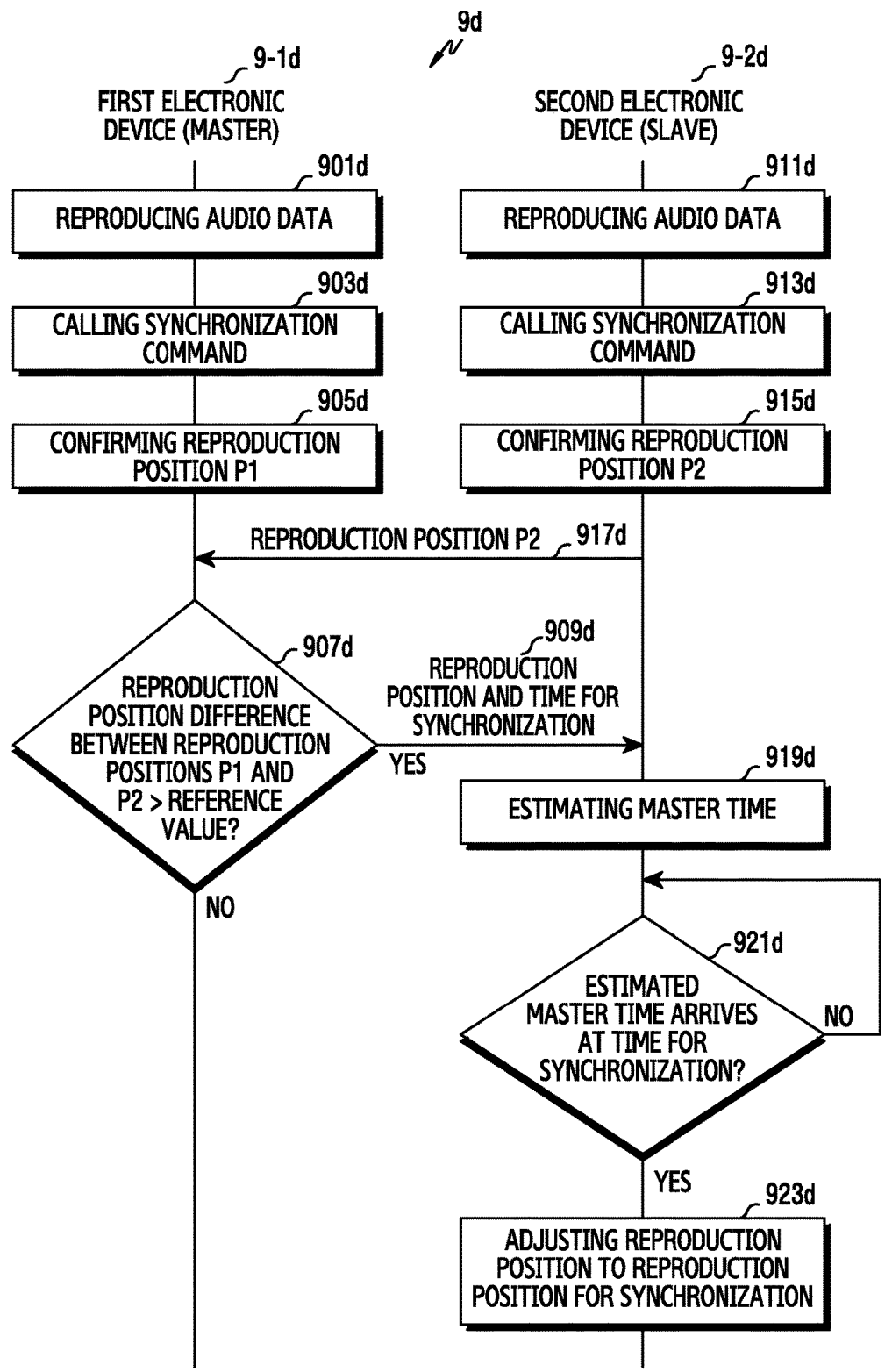
FIG. 9D is a diagram of communication flow of a system between electronic devices, according to an embodiment of the present disclosure.

FIG. 9D is a signaling diagram of communication flow of a system between electronic devices, according to an embodiment of the present disclosure. A system 9*d* may include a first electronic device 9-1*d* and a second electronic device 9-2*d*. The first electronic device 9-1*d* or the second electronic device 9-2*d* may include all or some of the components of the electronic device 101 of FIG. 1, or may include all or some of the components of the first external electronic device 102 or the second external electronic device 104 of FIG. 1. Alternatively, the first electronic device 9-1*d* may include all or some of the components of the first electronic device 5 of FIG. 6, and the second electronic device 9-2*d* may include all or some of the components of the second electronic device 6 of FIG. 6. The first electronic device 9-1*d* may include all or some of the components of the first electronic device 9-1*b* of FIG. 9B, and the second electronic device 9-2*d* may include all or some of the components of the second electronic device 9-2*b* of FIG. 9B.

The first electronic device 9-1*d* may be a master electronic device, and the second electronic device 9-2*d* may be a slave electronic device.

In step 901*d*, the master 9-1*d* may reproduce audio data.

In step 911*d*, the slave 9-2*d* may reproduce audio data. The master 9-1*d* and the slave 9-2*d* may independently reproduce the same audio data in the dual mode based on the operation flow described above with reference to FIG. 9A. The master 9-1*d* and the slave 9-2*d* may independently reproduce the same audio data by executing the command at the time synchronized by using the operation flow of FIG. 9C.

In step 903*d*, while the audio data is being reproduced, the master 9-1*d* may send a synchronization command.

In step 913*d*, while the audio data is being reproduced, the slave 9-2*d* may send a synchronization command. The master 9-1*d* and the slave 9-2*d* may send the synchronization command by using the operation flow of FIG. 9B. For example, the synchronization command may be periodically called through time synchronization between the master 9-1*d* and slave 9-2*d*.

In step 905*d*, the master 9-1*d* may confirm a reproduction position P1 of audio data according to the synchronization command.

In step 915*d*, the slave 9-2*d* may confirm a reproduction position P2 of audio data according to the synchronization command.

In step 917*d*, the slave 9-2*d* may transmit the reproduction position P2 to the master 9-1*d*.

In step 907*d*, the master 9-1*d* may determine whether a reproduction position difference between the reproduction positions P1 and P2 is larger than a reference value.

When the reproduction position difference between the reproduction positions P1 and P2 is larger than the reference value, in step 909*d*, the master 9-1*d* may transmit the reproduction position and time for synchronization to the slave 9-2*d*. The reproduction position for synchronization may refer to the reproduction position after a set time from the reproduction position P1. The time for synchronization may be a time obtained by adding the set time to the master time of the reproduction position P1.

In step 919d, the slave 9-2d may estimate the time of the master 9-1d. The slave 9-2d may estimate the time of the master 9-1d based on the operation flow of FIG. 9B.

When the estimated master time arrives at the time for synchronization, the slave 9-2d senses it in step 921d, and adjust the reproduction position to the reproduction position to be synchronized in step 923d.

The operation flow of FIG. 9D may synchronize the reproduction positions of audio data by using time synchronization between the master 9-1d and the slave 9-2d.

Figure 9E:
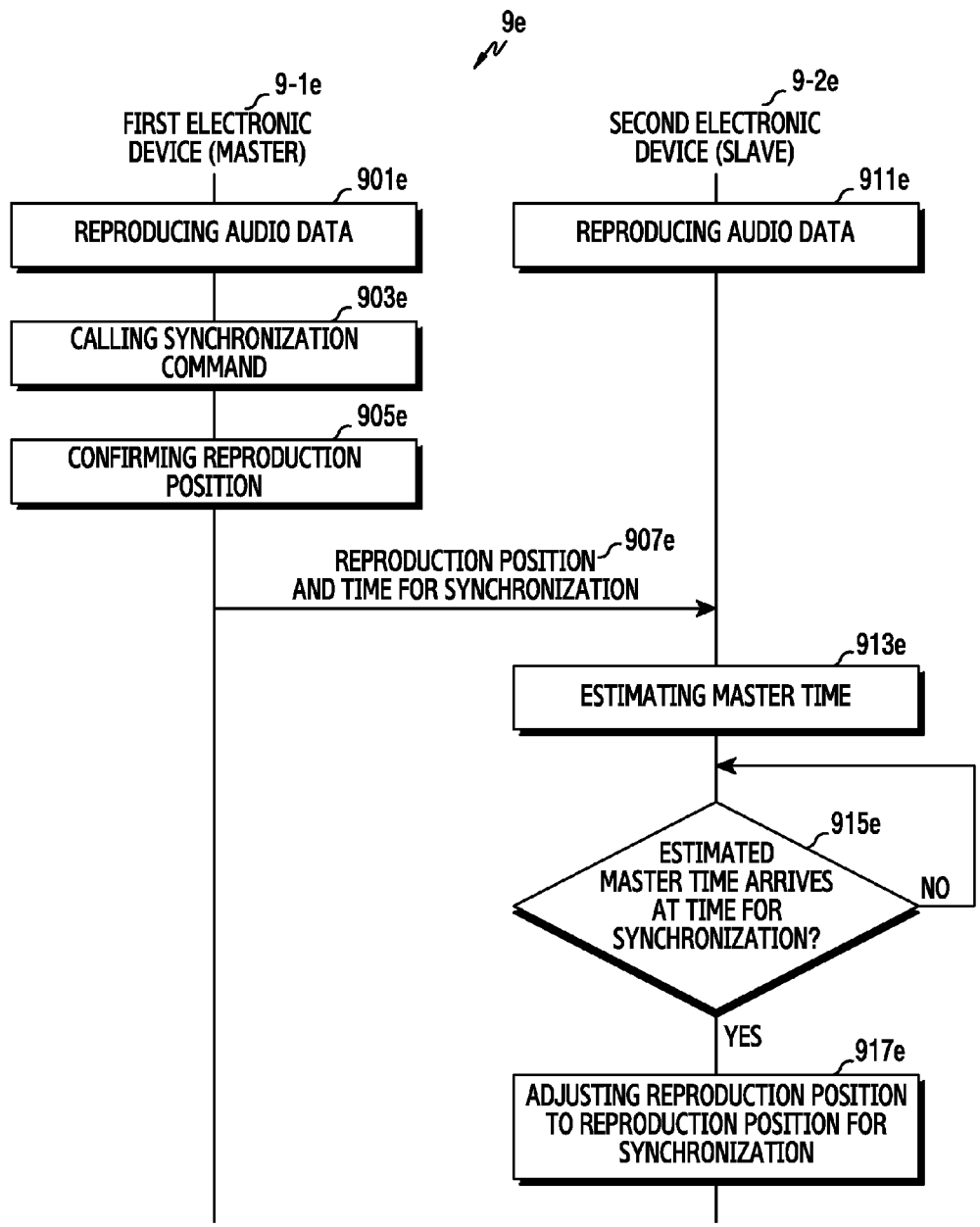
FIG. 9E is a signaling diagram of a communication flow of a system between electronic devices, according to an embodiment of the present disclosure.

FIG. 9E is a signaling diagram of communication flow of a system between electronic devices, according to an embodiment of the present disclosure. A system 9e may include a first electronic device 9-1e and a second electronic device 9-2e. The first electronic device 9-1e or the second electronic device 9-2e may include all or some of the components of the electronic device 101 of FIG. 1, or may include all or some of the components of the first external electronic device 102 or the second external electronic device 104 of FIG. 1. Alternatively, the first electronic device 9-1e may include all or some of the components of the first electronic device 5 of FIG. 6, and the second electronic device 9-2e may include all or some of the components of the second electronic device 6 of FIG. 6. The first electronic device 9-1e may include all or some of the components of the first electronic device 9-1b of FIG. 9B, and the second electronic device 9-2e may include all or some of the components of the second electronic device 9-2b of FIG. 9B.

The first electronic device 9-1e may be a master electronic device, and the second electronic device 9-2e may be a slave electronic device.

The master 9-1e and the slave 9-2e may synchronize the reproduction positions of audio data by using time synchronization according to the following operation flow.

In step 901e, the master 9-1e may reproduce audio data.

In step 911e, the slave 9-2e may reproduce audio data. The master 9-1e and the slave 9-2e may independently reproduce the same audio data in the dual mode based on the operation flow described above with reference to FIG. 9A. The master 9-1e and the slave 9-2e may independently reproduce the same audio data by executing the command at the time synchronized by using the operation flow of FIG. 9C.

In step 903e, while the audio data is being reproduced, the master 9-1e may call a synchronization command. The synchronization command may be periodically called.

In step 905e, the master 9-1e may confirm the reproduction positions of audio data according to the synchronization command. For example, the master 9-1e may confirm the reproduction positions of audio data after the set time at the time point where the synchronization command is called or after a set time from the time point.

In step 907e, the master 9-1e may transmit a reproduction position and time for synchronization to the slave 9-2e based on the confirmed reproduction position. For example, the reproduction position for synchronization may refer to the reproduction position after a set time from the confirmed reproduction position. The time for synchronization may be a time obtained by adding the set time to the master time of the confirmed reproduction position.

In step 913e, the slave 9-2e may estimate the time of the master 9-1e. The slave 9-2e may estimate the time of the master 9-1e based on the operation flow of FIG. 9B.

When the estimated master time arrives at the time for synchronization, the slave 9-2e senses it in operation 915e and adjusts the reproduction position to the reproduction position for synchronization in step 917e.

Figure 9F:
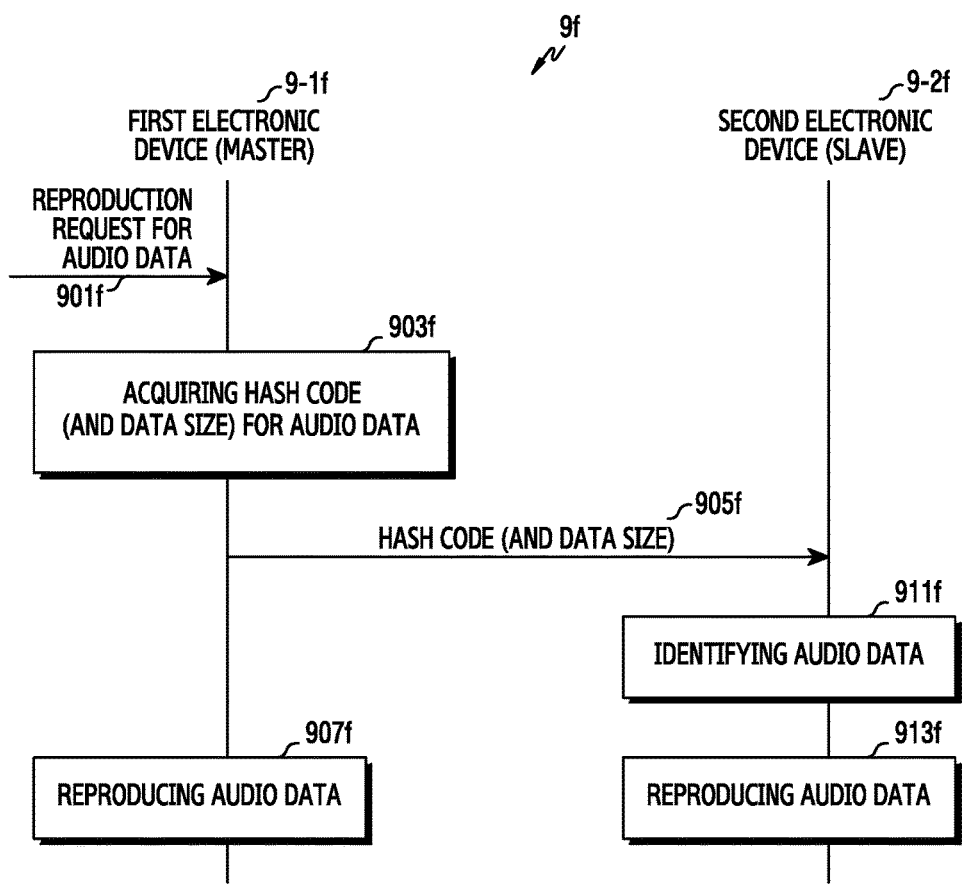
FIG. 9F is a signaling diagram of communication flow of a system between electronic devices, according to an embodiment of the present disclosure.

FIG. 9F is a signaling diagram of communication flow of a system between electronic devices, according to an embodiment of the present disclosure. A system 9f may include a first electronic device 9-1f and a second electronic device 9-2f. The first electronic device 9-1f or the second electronic device 9-2f may include all or some of the components of the electronic device 101 of FIG. 1, or may include all or some of the components of the first external electronic device 102 or the second external electronic device 104 of FIG. 1. Alternatively, the first electronic device 9-1f may include all or some of the components of the first electronic device 5 of FIG. 6, and the second electronic device 9-2f may include all or some of the components of the second electronic device 6 of FIG. 6. The first electronic device 9-1f may include all or some of the components of the first electronic device 9-1b of FIG. 9B, and the second electronic device 9-2f may include all or some of the components of the second electronic device 9-2b of FIG. 9B.

The first electronic device 9-1f may be a master electronic device, and the second electronic device 9-2f may be a slave electronic device.

The master 9-1f and the slave 9-2f may reproduce the same audio data according to the following operation flow.

When a request (or a command) for reproducing audio data is generated, in step 901f, the master 9-1f may sense the generated audio. The request for reproducing the audio data may be transmitted to the master 9-1f from an external electronic device, or may be generated through various input devices (e.g., a key button, a touch key button, and a sound recognition device) included in the master 9-1f.

In step 903f, the master 9-1f may acquire a hash code for the audio data, for which the reproduction request is made. The hash code may be generated from a name indicate the audio data (e.g., a file name or a content name). Alternatively, the master 9-1f may further confirm a data size of the audio data, for which the reproduction request is made. Alternatively, the hash code may be generated and stored when the audio data is stored in the first electronic device 9-1f or the second electronic device 9-2f.

In step 905f, the master 9-1f may transmit the hash code (and the data size) to the slave 9-2f. For example, by transmitting the hash code (and the data size) instead of a name indicating the audio data, the master 9-1f may reduce the data transmission amount.

In step 911f, the slave 9-2f may identify audio data corresponding to the hash code (and the data size) received from the master 9-1f. For example, the slave 9-2f may confirm the audio data, for which the reproduction request is made, from the hash code (and the data size).

In step 907f, the master 9-1f may reproduce audio data, for which the reproduction request is made.

In step 913f, the slave 9-2f may reproduce the audio data identified from the hash code (and the data size).

The flow of executing the command (e.g., the audio data reproduction request) by synchronizing time as represented in FIG. 9C may be applicable to the operation flow of FIG. 9F, and the master 9-1f and the slave 9-2f may independently reproduce the same audio data in the dual mode.

Figure 10A:
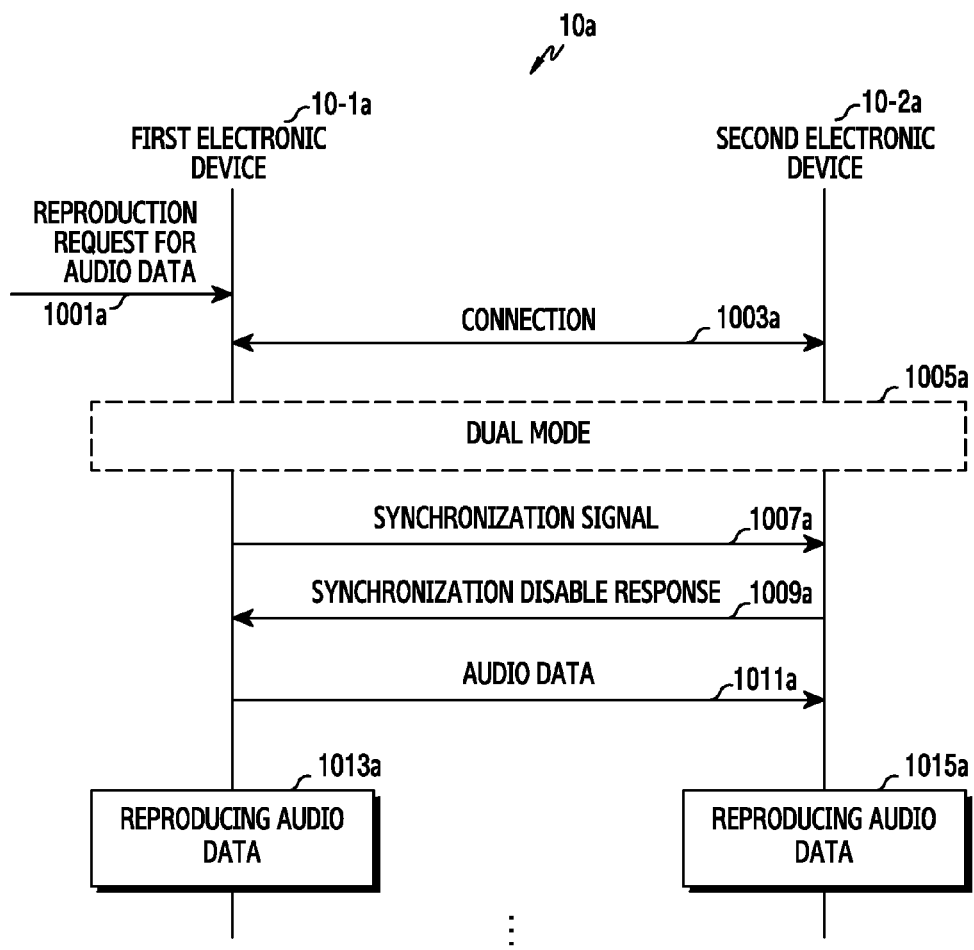
FIG. 10A is a signaling diagram of communication flow of a system between electronic devices, according to an embodiment of the present disclosure.

FIG. 10A is a signaling diagram of communication flow of a system between electronic devices, according to an embodiment of the present disclosure. A system 10a may include a first electronic device 10-1a and a second electronic device 10-2a. The first electronic device 10-1a and/or the second electronic device 10-2a may include all or some of the components of the electronic device 101 of FIG. 1, or may include all or some of the components of the first external electronic device 102 or the second external electronic device 104 of FIG. 1. Alternatively, the first electronic device 10-1*a* may include all or some of the components of the first electronic device 5 of FIG. 6, and the second electronic device 10-2*a* may include all or some of the components of the second electronic device 6 of FIG. 6.

Referring to FIG. 10A, in step 1001*a*, the first electronic device 10-1*a* may receive a reproduction request for audio data stored in the memory of the first electronic device 10-1*a*. For example, the reproduction request for the audio data may be induced by a user input.

In step 1003*a*, the first electronic device 10-1*a* and the second electronic device 10-2*a* may be connected in communication.

In step 1005*a*, when it is confirmed that the first electronic device 10-1*a* and the second electronic device 10-2*a* are in the state of being positioned close to the user, the first electronic device 10-1*a* and the second electronic device 10-2*a* may set a dual mode. For example, in the case where the first electronic device 10-1*a* and the second electronic device 10-2*a* are worn on opposite ears of the user, the first electronic device 10-1*a* and the second electronic device 10-2*a* may enter into a dual mode.

In step 1007*a*, the first electronic device 10-1*a* may transmit a synchronization signal related to the audio data for which the reproduction request is made to the second electronic device 10-2*a*.

In step 1009*a*, the second electronic device 10-2*a* may transmit a synchronization disable response to the first electronic device 10-1*a* in response to the synchronization signal. For example, in the case where audio data, which is the same as audio data corresponding to the synchronization signal received from the first electronic device 10-1*a*, is not stored in the second electronic device 10-2*a*, the second electronic device 10-2*a* may transmit a synchronization disable response related to the synchronization signal to the first electronic device 10-1*a*.

Some of the audio data of the first electronic device 10-1*a* may not be stored in the second electronic device 10-2*a*, as indicated Table 2 below.

TABLE 2

| First Electronic Device 10-1a | Second Electronic Device 10-2a |
| --- | --- |
| ABC | ABC |
| BCD | CDE |
| CDE | EFG |
| ... | ... |

For example, a reproduction request may be generated for "BCD" audio data which is stored in the first electronic device 10-1*a*, but which is not stored in the second electronic device 10-2*a*. The first electronic device 10-1*a* may transmit a synchronization signal for the "BCD" audio data to the second electronic device 10-2*a*. The second electronic device 10-2*a* may transmit a synchronization disable response to the first electronic device 10-1*a* because it does not store the "BCD" audio data.

In step 1011*a*, when the synchronization disable response related to the synchronization signal is received from the second electronic device 10-2*a*, the first electronic device 10-1*a* may transmit (or bypass) the audio data, for which the reproduction request is made, to the second electronic device 10-2*a* in real time (streaming). For example, the audio data transmitted from the first electronic device 10-1*a* to the second electronic device 10-2*a* may be mono audio data. Alternatively, the audio data transmitted from the first electronic device 10-1*a* to the second electronic device 10-2*a* may be stereo audio data. The stereo audio data may include a first portion (hereinafter, referred to as "first data") corresponding to the first electronic device 10-1*a* and a second portion (hereinafter, referred to as "second data") corresponding to the second electronic device 10-2*a*.

In step 1013*a*, the first electronic device 10-1*a* may reproduce audio data, for which the reproduction request is made. For example, in the case where the audio data, for which the reproduction request is made, is mono audio data, the first electronic device 10-1*a* may decode the mono audio data to acquire an audio signal, and may output the audio signal through a speaker (mono reproduction). Alternatively, in the case where the audio data, for which the reproduction request is made, is stereo audio data, the first electronic device 10-1*a* may decode the first audio data of the stereo audio data to acquire a first audio signal, and may output the first audio signal through a speaker (stereo reproduction).

In step 1015*a*, the second electronic device 10-2*a* may reproduce audio data received from the first electronic device 10-1*a*. For example, in the case where the audio data received from the first electronic device 10-1*a* is mono audio data, the second electronic device 10-2*a* may decode the mono audio data to acquire an audio signal, and may output the audio signal through a speaker (mono reproduction). Alternatively, in the case where the audio data receive from the first electronic device 10-1*a* is stereo audio data, the second electronic device 10-2*a* may decode the second audio data of the stereo audio data to acquire a second audio signal, and may output the second audio signal through a speaker (stereo reproduction).

As described above, when audio data, for which a reproduction request is made, exists in the first electronic device 10-1*a*, but does not exist in the second electronic device 10-2*a*, the first electronic device 10-1*a* may transmit the audio data to the second electronic device 10-2*a* (streaming). The first electronic device 10-1*a* and the second electronic device 10-2*a* may reproduce the same audio data. For example, the first electronic device 10-1*a* may serve as a master and the second electronic device 10-2*a* may serve as a slave.

When the first electronic device 10-1*a* and the second electronic device 10-2*a* are mounted on opposite ears of the user (dual mode), the first electronic device 10-1*a* may output, through its speaker, the mono audio data, and the second electronic device 10-2*a* may output, through its speaker, the same mono audio data received from the first electronic device 10-1*a*.

When the first electronic device 10-1*a* and the second electronic device 10-2*a* are mounted on opposite ears of the user (dual mode), the first electronic device 10-1*a* may output, through its speaker, first data of stereo audio data, and the second electronic device 10-2*a* may output, through its speaker, a second data of the stereo audio data provided from the first electronic device 10-1*a*. This may provide the user with a chance to experience stereophonic sound.

According to various embodiments, the order of the steps of FIG. 10A may be changed, or some of the operations may be simultaneously executed.

Figure 10B:
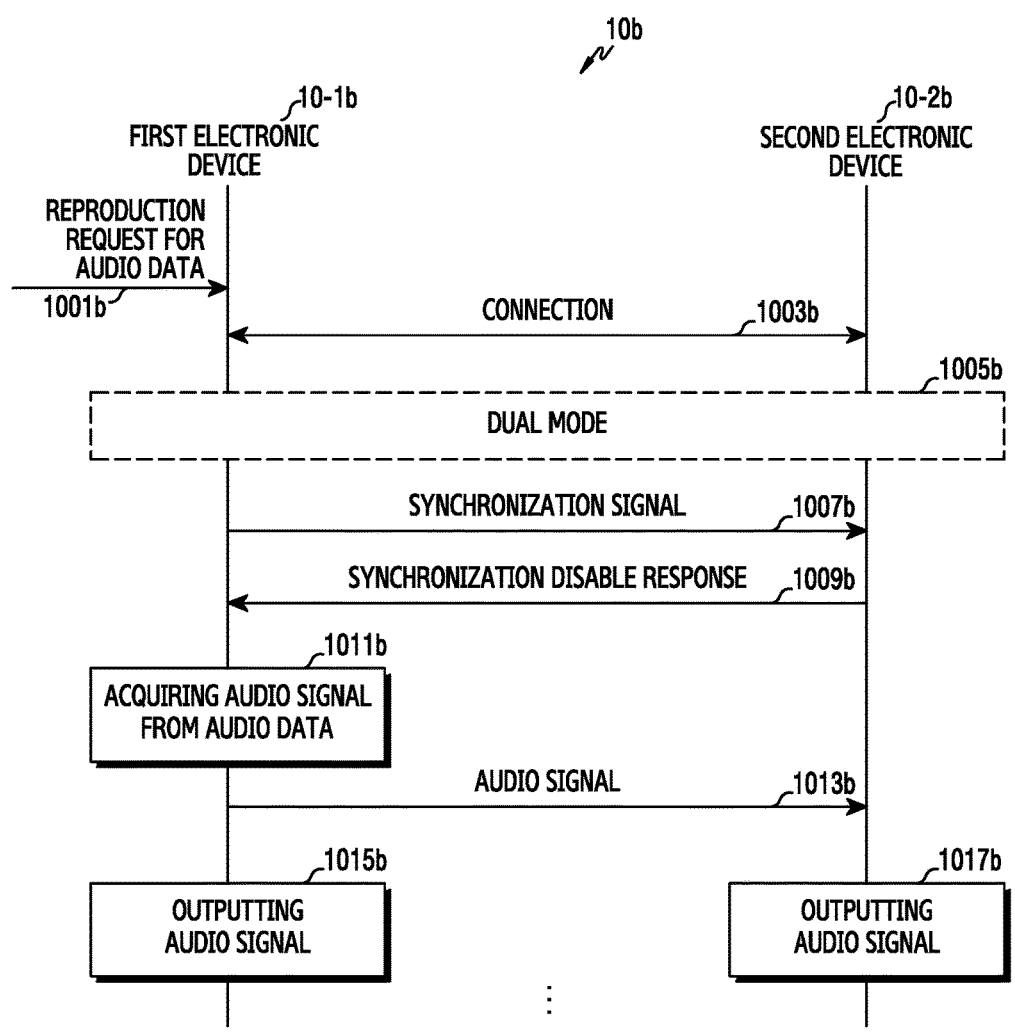
FIG. 10B is a signaling diagram of communication flow of a system between electronic devices, according to an embodiment of the present disclosure.

FIG. 10B is a signaling diagram of communication flow of a system between electronic devices, according to an embodiment of the present disclosure. A system 10*b* may include a first electronic device 10-1*b* and a second electronic device 10-2*b*. The first electronic device 10-1*b* or the second electronic device 10-2*b* may include all or some of the components of the electronic device 101 of FIG. 1, or may include all or some of the components of the first external electronic device 102 or the second external electronic device 104 of FIG. 1. Alternatively, the first electronic device 10-1*b* may include all or some of the components of the first electronic device 5 of FIG. 6, and the second electronic device 10-2*b* may include all or some of the components of the second electronic device 6 of FIG. 6.

Referring to FIG. 10B, in step 1001*b*, the first electronic device 10-1*b* may receive a reproduction request for audio data stored in the memory of the first electronic device 10-1*b*. For example, the reproduction request for the audio data may be induced by a user input.

In step 1003*b*, the first electronic device 10-1*b* and the second electronic device 10-2*b* may be connected in communication.

In step 1005*b*, when it is confirmed that the first electronic device 10-1*b* and the second electronic device 10-2*b* are in the state of being positioned close to the user, the first electronic device 10-1*b* and the second electronic device 10-2*b* may set a dual mode. For example, in the case where the first electronic device 10-1*b* and the second electronic device 10-2*b* are worn on opposite ears of the user, the first electronic device 10-1*b* and the second electronic device 10-2*b* may enter into a dual mode.

In step 1007*b*, the first electronic device 10-1*b* may transmit a synchronization signal related to the audio data, for which the reproduction request is made, to the second electronic device 10-2*b*.

In step 1009*b*, the second electronic device 10-2*b* may transmit a synchronization disable response to the first electronic device 10-1*b* in response to the synchronization signal. For example, in the case where audio data, which is the same as audio data corresponding to the synchronization signal received from the first electronic device 10-1*b*, is not stored in the second electronic device 10-2*b*, the second electronic device 10-2*b* may transmit a synchronization disable response related to the synchronization signal to the first electronic device 10-1*b*.

In step 1011*b*, when the synchronization disable response related to the synchronization signal is received from the second electronic device 10-2*b*, the first electronic device 10-1*b* may decode the audio data, for which the reproduction request is made, to acquire an audio signal. For example, the first electronic device 10-1*b* may decode the mono audio data to acquire an audio signal. Alternatively, the first electronic device 10-1*b* may decode first audio data of the stereo audio data to acquire a first audio signal, and may decode second audio data of the stereo audio data to obtain a second audio signal.

In step 1013*b*, the first electronic device 10-1*b* may transmit the audio data to the second electronic device 10-2*b*. For example, the first electronic device 10-1*b* may transmit, to the second electronic device 10-2*b*, the audio signal acquired by decoding the mono audio data. Alternatively, the first electronic device 10-1*b* may transmit, to the second electronic device 10-2*b*, the second audio signal of the first audio signal and the second audio signal acquired by decoding the stereo audio data.

In step 1015*b*, the first electronic device 10-1*b* may output the audio signal through its speaker. For example, the first electronic device 10-1*b* may output, through its speaker, the audio signal acquired by decoding the mono audio data. Alternatively, the first electronic device 10-1*b* may output, through its speaker, the first audio signal among the first audio signal and the second audio signal acquired by decoding the stereo audio data.

In step 1017*b*, the second electronic device 10-2*b* may output, through its speaker, the audio signal received from the first electronic device 10-1*b*. The second electronic device 10-2*b* may output, through its speaker, the audio signal received from the first electronic device 10-1*b* without decoding the corresponding audio data. For example, the audio signal transmitted from the first electronic device 10-1*b* to the second electronic device 10-2*b* may be an audio signal acquired by decoding the mono audio data. Alternatively, the audio signal transmitted from the first electronic device 10-1*b* to the second electronic device 10-2*b* may be a second audio signal acquired by decoding the stereo audio data.

As described above, when audio data, for which a reproduction request is made, exists in the first electronic device 10-1*b*, but which does not exist in the second electronic device 10-2*b*, the first electronic device 10-1*b* may acquire an audio signal by decoding the audio data, and may transmit the acquired audio signal to the second electronic device 10-2*b*.

When the first electronic device 10-1*b* and the second electronic device 10-2*a* are mounted on opposite ears of the user (dual mode), the first electronic device 10-1*b* may obtain an audio signal by decoding the mono audio data, may output, through its speaker, the audio signal and may transmit the audio signal to the second electronic device 10-2*b*. In step 1017*b*, the second electronic device 10-2*b* may output the same audio signal through its speaker.

When the first electronic device 10-1*b* and the second electronic device 10-2*b* are mounted on opposite ears of the user (dual mode), the first electronic device 10-1*b* may decode first data of stereo audio data to acquire a first audio signal, and may output the first audio signal through its speaker. In addition, the first electronic device 10-1*b* may decode second data of the stereo audio data to acquire a second audio signal, and may transmit the second audio signal to the second electronic device 10-2*b*. The second electronic device 10-2*b* may output, through its speaker, the second audio signal received from the first electronic device 10-1*b*. The output of the first audio signal by the first electronic device 10-1*b* and the output of the second audio signal by the second electronic device 10-2*b* may provide the user with a chance to experience stereophonic sound.

According to various embodiments, the order of the operations of FIG. 10B may be changed, or some of the operations may be simultaneously executed.

Figure 11:
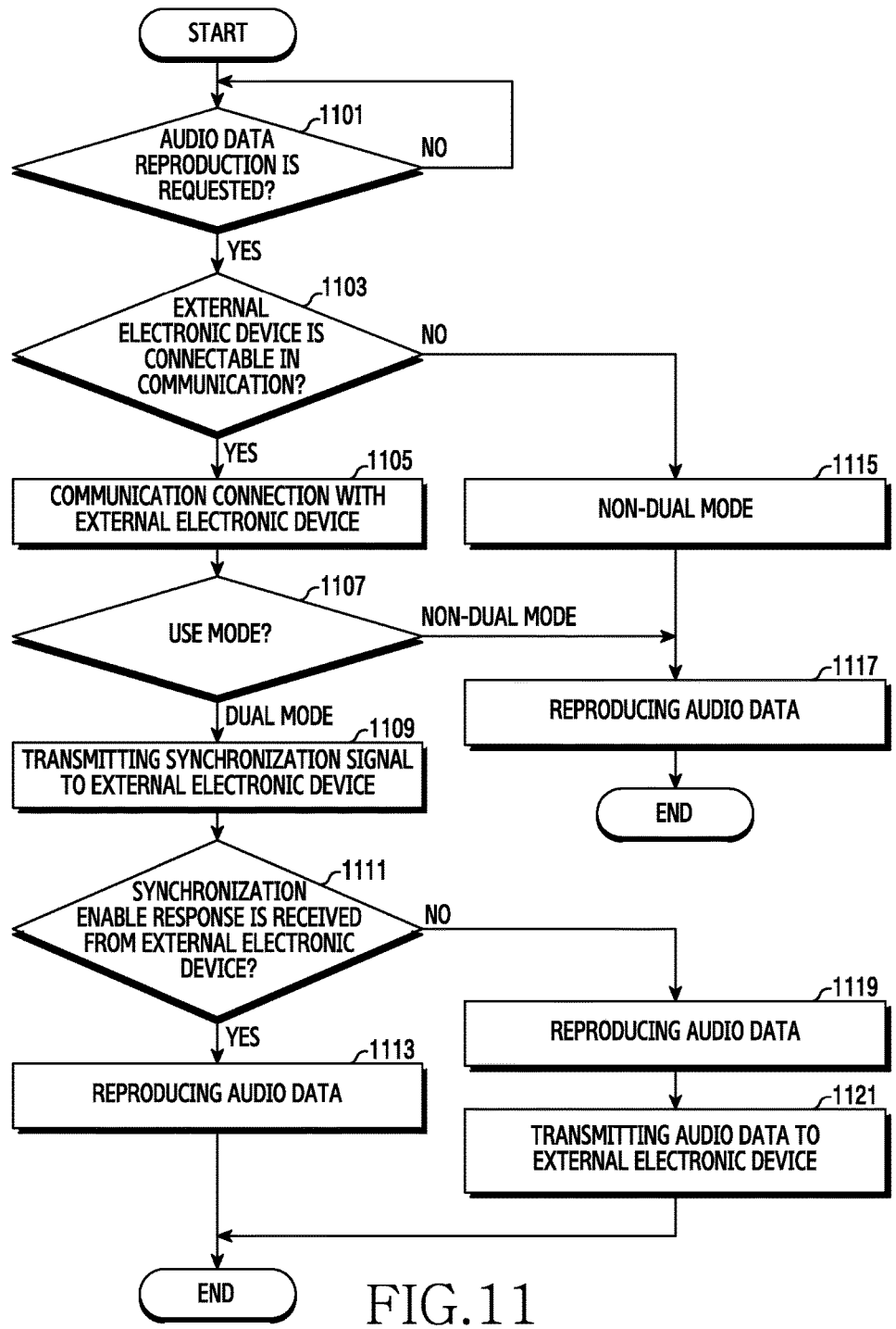
FIG. 11 is a flowchart of a method of operations of an electronic device, according to an embodiment of the present disclosure.

FIG. 11 is a flowchart of a method of operation of an electronic device, according to an embodiment of the present disclosure. The electronic device may be the electronic device 101 of FIG. 1, the first external electronic device 102 or the second external electronic device 104 of FIG. 1, or may be the electronic device 700 of FIG. 7.

Referring to FIG. 11, in step 1101, when a reproduction request is generated for audio data stored in the memory 750 of FIG. 7 of the electronic device 700, the processor 780 of FIG. 7 may sense the generated audio data.

In step 1103, in response to the reproduction request for the audio data, the processor 780 may confirm whether the external electronic device is connectable in communication.

When it is confirmed that the external electronic device is not connectable in communication in step 1103, the processor 780 may enter into a non-dual mode in step 1115.

In step 1117, the processor 780 may reproduce, with a mono method, the audio data, for which a reproduction request is made in the non-dual mode. For example, even if the audio data, for which the reproduction request is made, is stereo audio data, the processor 780 may output the entire audio data through the speaker 741 of FIG. 7.

When it is confirmed that the external electronic device is connectable in communication in step 1103, the processor 780 may support a communication connection between the electronic device 700 and an external electronic device. For example, the processor 780 may request a communication connection to the external electronic device in step 1105. When receiving a response to the request for the communication connection from the external electronic device, the processor 780 may support a communication connection with the external electronic device.

In step 1107, the processor 780 may determine a use mode.

When it is confirmed that the user is positioned close to both the electronic device 700 and the external electronic device, the processor 780 may select the dual mode. Alternatively, when it is confirmed that at least one of the electronic device 700 and the external electronic device is not positioned close to the user, the processor 780 may select the non-dual mode.

When the distance between the electronic device 700 and the external electronic device does not exceed a critical distance, the processor 780 may select the dual mode. For example, when the electronic device 700 and an external electronic device are worn on opposite ears of the user, the distance between the two electronic devices may be within the critical distance. Alternatively, when the distance between the electronic device 700 and the external electronic device exceeds a critical distance, the processor 780 may select the non-dual mode.

An external electronic device may be set not to allow a communication connection with the electronic device 700, and the processor 780 may select the non-dual mode. Alternatively, the electronic device 700 may be set not to allow a communication connection with an external electronic device, and the processor 780 may select the non-dual mode.

When it is sensed that at least one of the electronic device 700 and the external electronic device is mounted on an external device (e.g., a charging device), the processor 780 may select the non-dual mode.

When the non-dual mode is determined in step 1107, the processor 780 may reproduce the audio data, for which the reproduction request is made, with the mono method.

When the dual mode is determined in step 1107, the processor 780 may transmit a synchronization signal related to the audio data in step 1109, for which the reproduction request is made, to the external electronic device.

In step 1111, the processor 780 may confirm whether a synchronization enable response related to the synchronization signal is received from the external electronic device.

In step 1111, the processor 780 may confirm whether a synchronization enable response related to the synchronization signal is received from a second electronic device 6. For example, in the case where the same audio data corresponding to the synchronization signal received from the electronic device 700 is stored in the external electronic device, the external electronic device may transmit a synchronization enable response related to the synchronization signal to the electronic device 700.

In the case where it is sensed that the synchronization enable response is received from the external electronic device, the processor 780 may reproduce the audio data, for which the reproduction request is made in step 1113. For example, in the case where the audio data, for which the reproduction request is made, is mono audio data, the processor 780 may decode the mono audio data to acquire an audio signal, and may provide a support such that the audio signal is output through the speaker 741 of FIG. 7 (mono reproduction). Alternatively, in the case where the audio data, for which the reproduction request is made, is stereo audio data, the processor 780 may decode a portion of the stereo audio data to acquire an audio signal, and may output the audio signal through the speaker 741 (stereo reproduction). In the case where it is determined that synchronization is enabled to correspond to the synchronization signal, the external electronic device may reproduce the same audio data stored in the memory with the mono method or the stereo method depending on the type thereof. For example, when the electronic device 700 and the external electronic device are mounted on opposite ears of the user (dual mode), the electronic device 700 may output, through the speaker 741, a portion of the stereo audio data stored in the memory 750, and may output, through the speaker, a portion of the same stereo audio data stored in the memory. This may provide the user with a chance to experience stereophonic sound.

In step 1111, the processor 780 may sense that a synchronization disable response related to the synchronization signal is received from the external electronic device. For example, in the case where it is confirmed that the same audio data corresponding to the synchronization signal received from the electronic device 700 is not stored in the external electronic device, the external electronic device may transmit a synchronization disable response related to the synchronization signal to the electronic device 700.

In the case where the synchronization disable response is received from the second electronic device 6, the processor 780 may reproduce the audio data, for which the reproduction request is made, in step 1119. For example, in the case where the audio data, for which the reproduction request is made, is mono audio data, the processor 780 may decode the audio data to acquire an audio signal, and may provide a support such that the audio signal is output through the speaker 741 (mono reproduction). Alternatively, in the case where the audio data, for which the reproduction request is made, is stereo audio data, the processor 780 may decode a portion of the stereo audio data to acquire an audio signal, and may output the audio signal through the speaker 741 (stereo reproduction). For example, the stereo audio data may include first audio data corresponding to the electronic device 700 and second audio data corresponding to an external electronic device. The electronic device 700 may decode the first audio data of the stereo audio data by using a codec (e.g., SBC codec) to acquire a first audio signal. The electronic device 700 may output the first audio signal through the speaker 741.

In step 1121, the processor 780 may transmit the audio data, for which the reproduction request is made, to the external electronic device (streaming). The external electronic device may reproduce the audio data received from the electronic device 700 with the mono method or the stereo method according to the type thereof. For example, when the electronic device 700 and the external electronic device are mounted on opposite ears of the user (dual mode), the electronic device 700 may decode first data of the stereo audio data stored in the memory 750 by using a codec to acquire a first audio signal, and may output the acquired first audio signal through the speaker 741. As will be described below with reference to FIG. 13, the external electronic device may decode second data of the stereo audio data received from the electronic device 700 to acquire a second audio signal, and may output the acquired second audio signal through the speaker. The output of the first audio signal by the electronic device 700 and the output of the second audio signal by the external electronic device may provide a chance to experience stereophonic sound.

The following operations may be performed instead of operations 1119 and 1121 described above. For example, when the synchronization disable response related to the synchronization signal is received from the external electronic device, the electronic device 700 may decode the audio data, for which the reproduction request is made, to acquire an audio signal, and may transmit the acquired audio signal to the external electronic device. The external electronic device may output, through its speaker, the audio signal received from the electronic device 700 without decoding the audio data.

For example, the electronic device 700 may decode the mono audio data to acquire an audio signal. The electronic device 700 may output the audio signal through its speaker, and may transmit the audio signal to the external electronic device. When the electronic device 700 and the external electronic device are mounted on opposite ears of the user (dual mode), the electronic device 700 and the external electronic device may output the same audio signal through its speakers.

For example, the electronic device 700 may reproduce the stereo audio data to acquire a first audio signal and a second audio signal. The electronic device 700 may output the first audio signal through the speaker, and may transmit the second audio signal to the external electronic device. When the electronic device 700 and the external electronic device are mounted on opposite ears of the user (dual mode), the electronic device 700 may output the first audio signal through its speaker and the external electronic device may output the second audio signal through its speaker. This may provide the use with a chance to experience stereophonic sound.

According to various embodiments, the order of the steps of FIG. 11 may be changed, or some of the operations may be simultaneously executed.

Figure 12:
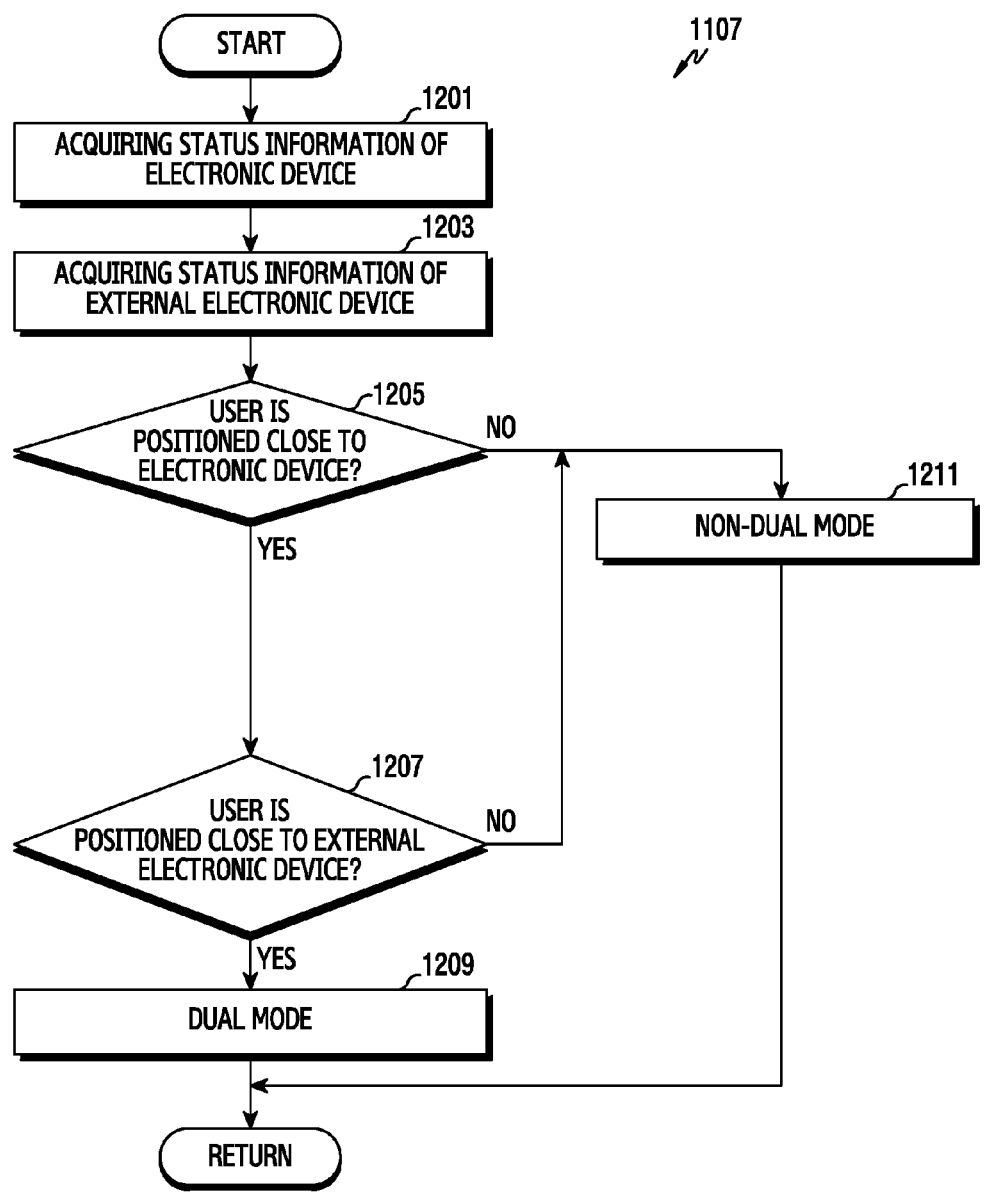
FIG. 12 is a flowchart of a step 1107 of the method of FIG. 11, according to an embodiment of the present disclosure.

FIG. 12 is a flowchart of the step 1107 of the method of FIG. 11, according to an embodiment of the present disclosure.

Referring to FIG. 12, in step 1201, the processor 780 may acquire status information of the electronic device 700. For example, the status information may be related to whether the user is positioned close to the electronic device 700. For example, when the electronic device 700 is mounted on an ear of the user, the sensor 730 may provide, to the processor 780, a signal indicating that the user is positioned relatively close to the electronic device 700. Alternatively, when the electronic device 700 is coupled to an external device (e.g., a charging device), the sensor 730 may output, to the processor 780, a signal indicating that the user is not positioned relatively close to the electronic device 700. Alternatively, when the electronic device 700 is being charged, the sensor 730 may provide, to the processor 780, a signal indicating that the user is not positioned relatively close to the electronic device 700.

In step 1203, the processor 780 may acquire status information of the external electronic device from the external electronic device. The status information may be related to whether the user is positioned relatively close to the external electronic device.

In step 1205, the processor 780 may determine whether the user is positioned relatively close to the electronic device 700, based on at least a portion of the status information of the electronic device 700.

Alternatively, when it is confirmed that the user is not positioned relatively close to the electronic device 700, the processor 780 may enter into the non-dual mode in step 1211.

In the case where it is determined that the user is positioned relatively close to the electronic device 700, step 1207 and other operations following step 1207 are performed.

In step 1207, the processor 780 may determine whether the user is positioned relatively close to the external electronic device, based on at least a portion of the status information of the external electronic device.

When it is confirmed that the user is positioned relatively close to not only the electronic device 700 but also the external electronic device, the processor 780 may be set to the dual mode in step 1209.

When it is confirmed that the user is positioned relatively close to the electronic device 700, but is not positioned relatively close to the external electronic device, the processor 780 may be set to the non-dual mode in step 1211.

According to various embodiments, the order of the steps of FIG. 12 may be changed, or some of the operations may be simultaneously executed.

Figure 13:
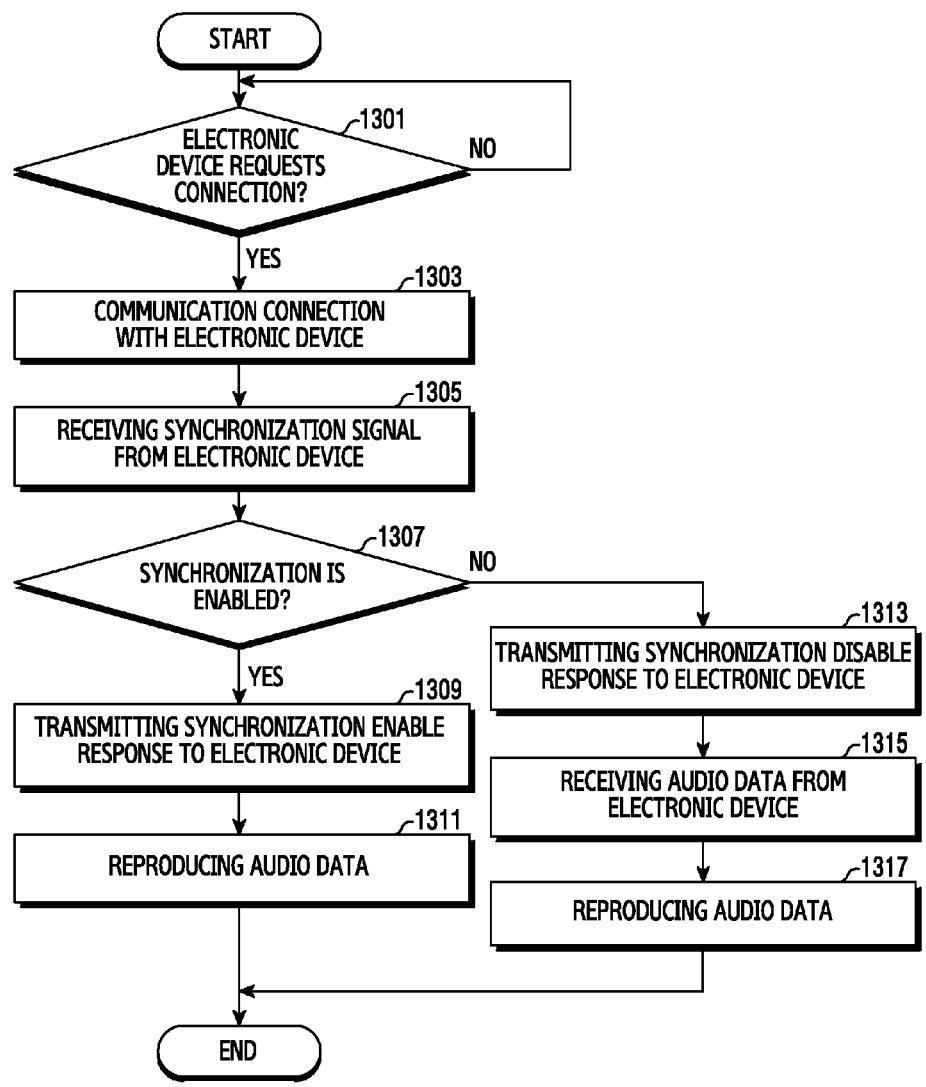
FIG. 13 is a flowchart of a method of operations of an external electronic device, according to an embodiment of the present disclosure.

FIG. 13 is a flowchart of a method of operation of an external electronic device, according to an embodiment of the present disclosure. The external electronic device may include all or some of the components of the electronic device 101 of FIG. 1, or may include all or some of the components of the first external electronic device 102 or the second external electronic device 104 of FIG. 1. Alternatively, the external electronic device may include all or some of the components of the electronic device 700 of FIG. 7.

Referring to FIG. 13, when a connection request is received from the electronic device 700, the processor of the external electronic device may sense the connection request in step 1301.

In response to the reception of the connection request from the electronic device 700, the processor of the external electronic device may support a communication connection between the electronic device 700 and the external electronic device in step 1303. For example, the processor may respond to the communication connection request from the electronic device 700.

In step 1305, the processor of the external electronic device may receive a synchronization signal related to audio data from the electronic device 700. The external electronic device may be in the dual mode state.

In response to the reception of the synchronization signal from the electronic device 700, the processor of the external electronic device may support a communication connection between the electronic device 700 and the external electronic device in step 1307. For example, in the case where it is confirmed that the same audio data corresponding to the synchronization signal received from the electronic device 700 is stored in the external electronic device, the processor of the external electronic device may determine that synchronization is enabled. Alternatively, in the case where it is confirmed that the same audio data corresponding to the synchronization signal received from the electronic device 700 is not stored in the external electronic device, the processor of the external electronic device may determine that synchronization is disabled.

When it is confirmed that the synchronization is enabled, the processor of the external electronic device may transmit a synchronization enable response related to the synchronization signal to the electronic device 700 in step 1309.

When it is confirmed that the synchronization is enabled, the processor of the external electronic device may reproduce the same audio data in step 1311. For example, in the case where the synchronizable audio data is mono audio data, the processor of the external electronic device may decode the mono audio data to acquire an audio signal, and may output the audio signal through a speaker (mono reproduction). Alternatively, in the case where the synchronizable audio data is stereo audio data, the processor of the external electronic device may decode a portion of the stereo audio data to acquire an audio signal, and may output the audio signal through a speaker (stereo reproduction).

When it is confirmed that the synchronization is disabled, the processor of the external electronic device may transmit a synchronization disable response related to the synchronization signal to the electronic device 700 in step 1313. In the case of transmitting the synchronization disable response, the external electronic device may receive audio data from the electronic device 700.

In step 1315, the processor of the external electronic device may receive audio data from the electronic device 700. The processor of the external electronic device may store the received audio data in the memory.

In step 1317, the processor of the external electronic device may reproduce the received audio data with the mono method or the stereo method according to the type thereof. For example, in the case where the audio data received from the electronic device 700 is mono audio data, the processor of the external electronic device may decode the mono audio data to acquire an audio signal, and may output the audio signal through its speaker (mono reproduction). Alternatively, in the case where the audio data received from the electronic device 700 is stereo audio data, the processor of the external electronic device may decode a portion of the stereo audio data to acquire an audio signal, and may output the audio signal through its speaker (stereo reproduction). For example, the stereo audio data may include first audio data corresponding to the electronic device 700 and second audio data corresponding to an external electronic device. The external electronic device may decode second audio data of the stereo audio data by using a codec (e.g., SBC codec) to acquire a second audio signal. The external electronic device may output the second audio signal through its speaker.

The following operations may be performed instead of operations 1315 and 1317 described above. For example, the external electronic device may receive audio signal from the electronic device 700, and may output the audio signal through its speaker. The external electronic device may output, through its speaker, the audio signal received from the electronic device 700 without decoding the audio data.

For example, the electronic device 700 may decode the mono audio data to acquire an audio signal, and may transmit the audio signal to the external electronic device. When the electronic device 700 and the external electronic device are mounted on opposite ears of the user (dual mode), the electronic device 700 and the external electronic device may output the same mono audio signal through their respective speakers thereof, respectively.

For example, the electronic device 700 may decode the stereo audio data to acquire a first audio signal and a second audio signal. The electronic device 700 may output the first audio signal through its speaker, and may transmit the second audio signal to the external electronic device. When the electronic device 700 and the external electronic device are mounted on opposite ears of the user (dual mode), the electronic device 700 may output the first audio signal through its speaker and the external electronic device may output the second audio signal through its speaker. This may provide the user with a chance to experience stereophonic sound.

According to various embodiments, the order of the steps of FIG. 13 may be changed, or some of the operations may be simultaneously executed.

A method of operating an electronic device may include receiving a reproduction request for audio data stored in a memory of the electronic device; acquiring status information of an external device connected to the electronic device; determining a portion to be output in the audio data based on at least a portion of the acquired status information; and outputting the determined portion through a speaker of the electronic device.

The status information of the external device may be related to whether the user is positioned close to the external electronic device.

In determining the portion to be output in the audio data based on at least a portion of the acquired status information, a portion of the audio data may be determined when it is confirmed that the external device is positioned close to the user. In determining the portion to be output in the audio data based on at least a portion of the acquired status information, the audio data may be entirely determined when it is confirmed that the external device is not positioned close to the user.

The method of operating the electronic device may further include acquiring the status information of the electronic device; and transmitting the acquired status information of the electronic device to the external device.

The method of operating the electronic device may further include transmitting, to the external device, a synchronization request related to audio data, for which the reproduction request is made.

The method of operating the electronic device may further include transmitting at least a portion of the audio data to the external device when a synchronization disable response is received from the external device in response to the synchronization request.

Figure 14A:
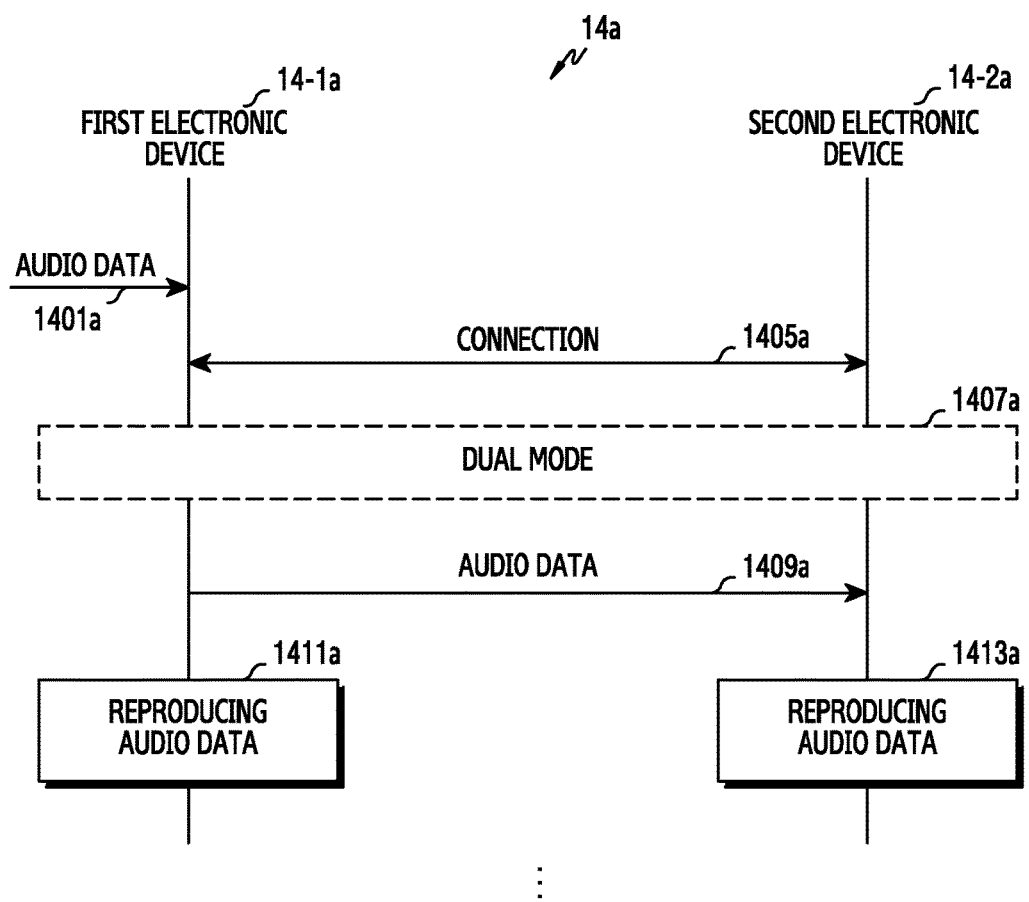
FIG. 14A is a signaling diagram of communication flow of a system, according to an embodiment of the present disclosure.

FIG. 14A is a signaling diagram of communication flow of a system, according to an embodiment of the present disclosure. A system 14a may include a first electronic device 14-1a and a second electronic device 14-2a. The first electronic device 14-1a and/or the second electronic device 14-2a may include all or some of the components of the electronic device 101 of FIG. 1, or may include all or some of the components of the first external electronic device 102 or the second external electronic device 104 of FIG. 1. Alternatively, the first electronic device 14-1a may include all or some of the components of the first electronic device 5 of FIG. 6, and the second electronic device 14-2a may include all or some of the components of the second electronic device 6 of FIG. 6.

Referring to FIG. 14A, in step 1401a, an external device (e.g., a server, a smart phone, a PC, a PDA, or an access point) may transmit audio data to the first electronic device 14-1a (streaming). The first electronic device 14-1a may receive the audio data transmitted from the external device.

In step 1405a, the first electronic device 14-1a and the second electronic device 14-2a may be connected to each other.

In step 1407a, when it is confirmed that the first electronic device 14-1a and the second electronic device 14-2a are in the state of being positioned relatively close to the user, the first electronic device 14-1a and the second electronic device 14-2a may set the dual mode. For example, in the case where the first electronic device 14-1*a* and the second electronic device 14-2*a* are worn on opposite ears of the user, the first electronic device 14-1*a* and the second electronic device 14-2*a* may enter into the dual mode.

In step 1409*a*, the first electronic device 14-1*a* may transmit the audio data received from the external device to the second electronic device 14-2*a* in real time (streaming). For example, the audio data transmitted from the first electronic device 14-1*a* to the second electronic device 14-2*a* may be mono audio data. Alternatively, the audio data transmitted from the first electronic device 14-1*a* to the second electronic device 14-2*a* may be stereo audio data.

In step 1411*a*, the first electronic device 14-1*a* may reproduce audio data received from the external device. For example, in the case where the audio data received from the external device is mono audio data, the first electronic device 14-1*a* may decode the mono audio data to acquire an audio signal, and may output the audio signal through its speaker (mono reproduction). Alternatively, in the case where the audio data received from the external device is stereo audio data, the first electronic device 14-1*a* may decode a portion of the stereo audio data to acquire an audio signal, and output the audio signal through its speaker (stereo reproduction). For example, the stereo audio data may include first audio data corresponding to the first electronic device 14-1*a* and second audio data corresponding to the second electronic device 14-2*a*. The first electronic device 14-1*a* may decode the first audio data of the stereo audio data by using a codec (e.g., SBC codec) to acquire a first audio signal. The first electronic device 14-1*a* may output the first audio signal through its speaker.

In step 1413*a*, the second electronic device 14-2*a* may reproduce audio data received from the first electronic device 14-1*a*. For example, in the case where the audio data received from the first electronic device 14-1*a* is mono audio data, the second electronic device 14-2*a* may decode the mono audio data to acquire an audio signal, and may output the audio signal through its speaker (mono reproduction). Alternatively, in the case where the audio data received from the first electronic device 14-1*a* is stereo audio data, the second electronic device 14-2*a* may decode a portion of the stereo audio data to acquire an audio signal, and may output the audio signal through its speaker (stereo reproduction). For example, the second electronic device 14-2*a* may decode the second audio data corresponding to the second electronic device 14-2*a* in the stereo audio data by using a codec (e.g., SBC codec) to acquire a second audio signal. The second electronic device 14-2*a* may output the second audio signal through its speaker.

As described above, the first electronic device 14-1*a* may receive audio data and may store the audio data. Further, the first electronic device 14-1*a* may transmit the audio data to the second electronic device 14-2*a* (streaming). Each of the first electronic device 14-1*a* and the second electronic device 14-2*a* may reproduce the same audio data.

When the first electronic device 14-1*a* and the second electronic device 14-2*a* are mounted on opposite ears of the user (dual mode), the first electronic device 14-1*a* may output the mono audio data through its speaker. The second electronic device 14-2*a* may output, through its speaker, the same mono audio data received from the first electronic device 14-1*a*.

When the first electronic device 14-1*a* and the second electronic device 14-2*a* are mounted on opposite ears of the user (dual mode), the first electronic device 14-1*a* may decode first data of stereo audio data received from the external device to acquire a first audio signal, and may output the first audio signal through its speaker. The second electronic device 14-2*a* may decode second audio data of the stereo audio data received from the first electronic device 14-1*a* to acquire a second audio signal, and may output the second audio signal through its speaker. The output of the first audio signal by the first electronic device 14-1*a* and the output of the second audio signal by the second electronic device 14-2*a* may provide the user with a chance to experience stereophonic sound.

According to various embodiments, the order of the steps of FIG. 14A may be changed, or some of the operations may be simultaneously executed.

Figure 14B:
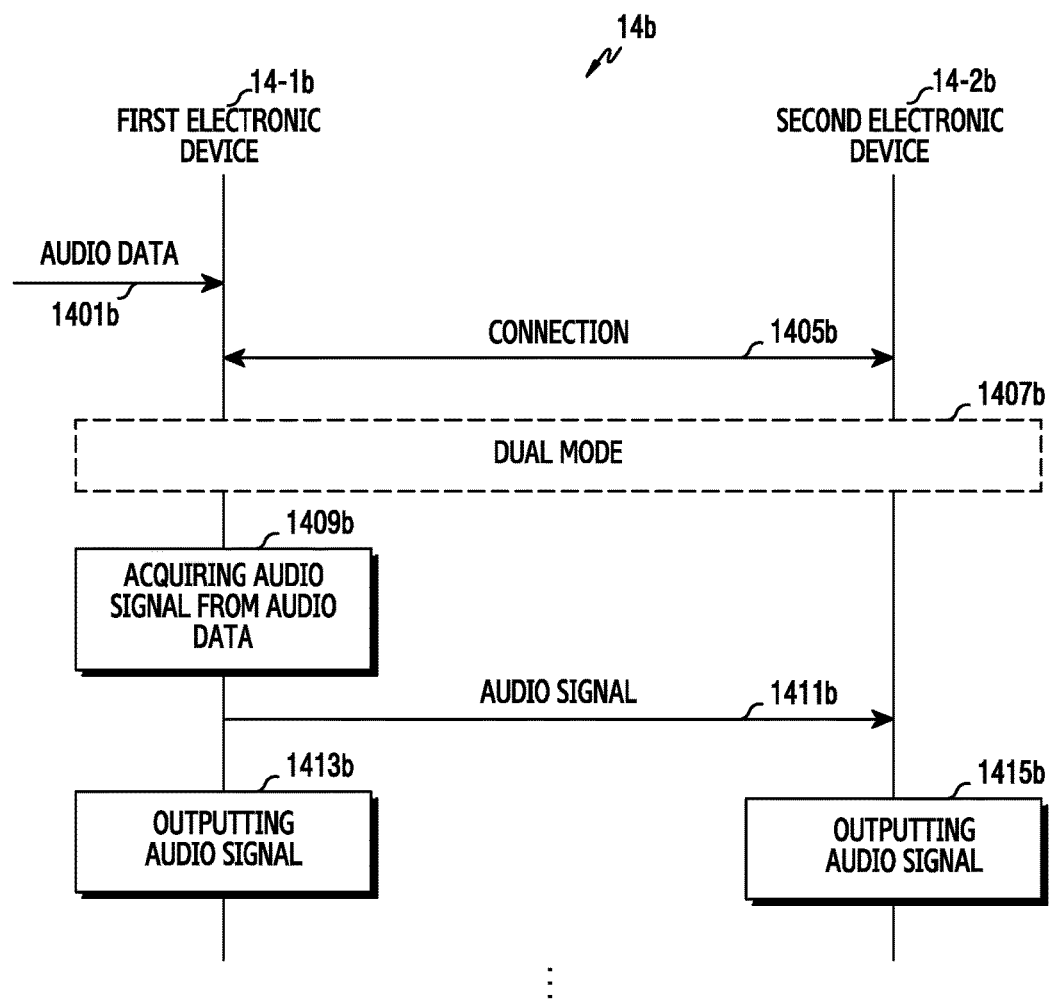
FIG. 14B is a signaling diagram of communication flow of a system, according to an embodiment of the present disclosure.

FIG. 14B is a signaling diagram of communication flow of a system, according to an embodiment of the present disclosure. A system 14*b* may include a first electronic device 14-1*b* and a second electronic device 14-2*b*. The first electronic device 14-1*b* or the second electronic device 14-2*b* may include all or some of the components of the electronic device 101 of FIG. 1, or may include all or some of the components of the first external electronic device 102 or the second external electronic device 104 of FIG. 1. Alternatively, the first electronic device 14-1*b* may include all or some of the components of the first electronic device 5 of FIG. 6, and the second electronic device 14-2*b* may include all or some of the components of the second electronic device 6 of FIG. 6.

Referring to FIG. 14B, in step 1401*b*, an external device (e.g., a server, a smart phone, a PC, a PDA, or an access point) may transmit audio data to the first electronic device 14-1*b* (streaming). The first electronic device 14-1*b* may receive the audio data transmitted from the external device.

In step 1405*b*, the first electronic device 14-1*b* and the second electronic device 14-2*b* may be connected to each other.

In step 1407*b*, when it is confirmed that the first electronic device 14-1*b* and the second electronic device 14-2*b* are in the state of being positioned relatively close to the user, the first electronic device 14-1*b* and the second electronic device 14-2*b* may set a dual mode. For example, in the case where the first electronic device 14-1*b* and the second electronic device 14-2*b* are worn on opposite ears of the user, the first electronic device 14-1*b* and the second electronic device 14-2*b* may enter into a dual mode.

In step 1409*b*, the first electronic device 14-1*b* may decode the audio data received from the external device to acquire an audio signal. For example, the first electronic device 14-1*b* may decode the mono audio data to acquire an audio signal. Alternatively, the first electronic device 14-1*b* may decode first audio data of the stereo audio data to acquire a first audio signal, and may decode second audio data of the stereo audio data to obtain a second audio signal.

In step 1411*b*, the first electronic device 14-1*b* may transmit the audio signal to the second electronic device 14-2*b*. For example, the first electronic device 14-1*b* may transmit, to the second electronic device 14-2*b*, the audio signal acquired by decoding the mono audio data. Alternatively, the first electronic device 14-1*b* may transmit, to the second electronic device 14-2*b*, the second audio signal of the first audio signal and the second audio signal acquired by decoding the stereo audio data.

In step 1413*b*, the first electronic device 14-1*b* may output, through its speaker, the audio signal acquired by decoding the audio data. For example, the audio signal may be an audio signal acquired by decoding the mono audio data. Alternatively, the audio signal may be a first audio signal acquired by decoding the first audio data of the stereo audio data.

In step 1415*b*, the second electronic device 14-2*b* may output, through its speaker, the audio signal received from the first electronic device 14-1*b*. For example, the audio signal may be an audio signal acquired by decoding the mono audio data. Alternatively, the audio signal may be a second audio signal acquired by decoding the second audio data of the stereo audio data.

When the first electronic device 14-1*b* and the second electronic device 14-2*b* are mounted on opposite ears of the user (dual mode), the first electronic device 14-1*b* may decode first data of the stereo audio data received from the external device to acquire a first audio signal and a second audio signal, may output the first audio signal through its speaker, and may transmit the second audio signal to the second electronic device 14-2*b*. The second electronic device 14-2*b* may output, through its speaker, the second audio signal received from the first electronic device 14-1*b*. The output of the first audio signal by the first electronic device 14-1*b* and the output of the second audio signal by the second electronic device 14-2*b* may provide the user with a chance to experience stereophonic sound.

According to various embodiments, the order of the steps of FIG. 14B may be changed, or some of the operations may be simultaneously executed.

Figure 15:
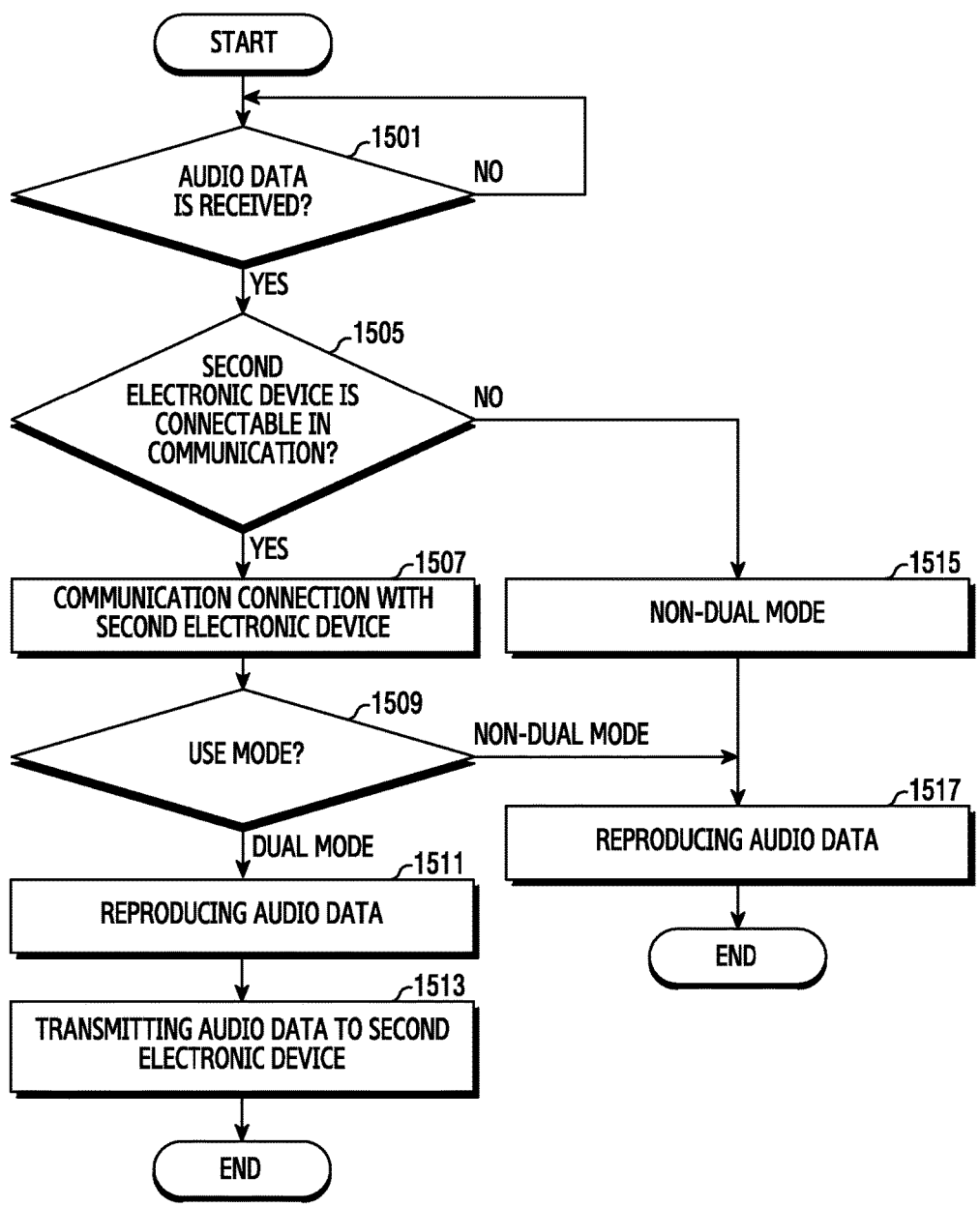
FIG. 15 is a flowchart of a method of operations of a first electronic device of FIG. 14A, according to an embodiment of the present disclosure.

FIG. 15 is a flowchart of a method of operation of the first electronic device 14-1*a* of FIG. 14A, according to an embodiment of the present disclosure. The first electronic device 14-1*a* may include all or some of the components of the electronic device 700 of FIG. 7.

Referring to FIG. 15, when audio data is received from an external electronic device (e.g., a server, a smart phone, a PC, a PDA, or an access point), the processor 780 of the first electronic device 14-1*a* may sense this in step 1501. The processor or the first electronic device 14-1*a* may store the audio data received from the external device in a memory (e.g., a volatile memory or a non-volatile memory).

In response to the reception of the audio data from the external device, the processor 780 of the first external device 14-1*a* may confirm whether the electronic device 14-2*a* of FIG. 14A is connectable in communication in step 1505.

When it is confirmed that the second electronic device 14-2*a* is not connectable in communication in operation 1507, the processor 780 of the first electronic device 14-1*a* may enter into a non-dual mode in step 1515.

In step 1517, the processor 780 of the first electronic device 14-1*a* may reproduce the audio data received from the external device in the non-dual mode. For example, in the case where the audio data received from the external device is mono audio data, the processor 780 of the first electronic device 14-1*a* may decode the mono audio data to acquire an audio signal, and may output the audio signal through its speaker (mono reproduction). Alternatively, even if the audio data received from the external device is stereo audio data, the processor 780 of the first electronic device 14-1*a* may decode the stereo audio data entirely to acquire an audio signal, and may output the audio signal through its speaker (mono reproduction).

When it is confirmed that the second electronic device 14-2*a* is connectable in communication in step 1505, the processor 780 of the first electronic device 14-1*a* may support a communication connection between the first electronic device 14-1*a* and the second electronic device 14-2*a* in step 1507. For example, the processor 780 of the first electronic device 14-1*a* may request a communication connection to the second electronic device 14-2*a*. The processor 780 of the first electronic device 14-1*a* may receive a response from the second electronic device 14-2*a* in response to the communication connection request.

In step 1509, the processor 780 of the first electronic device 14-1*a* may determine a use mode.

When it is confirmed that the user is positioned relatively close to both the first electronic device 14-1*a* and the second electronic device 14-2*a*, the processor 780 of the first electronic device 14-1*a* may select the dual mode. Alternatively, when it is confirmed that at least one of the first electronic device 14-1*a* and the second electronic device 14-2*a* is not positioned relatively close to the user, the processor 780 of the first electronic device 14-1*a* may select the non-dual mode.

When it is confirmed that the distance between the first electronic device 14-1*a* and the second electronic device 14-2*a* does not exceed a critical distance, the processor 780 of the first electronic device 14-1*a* may select the dual mode. For example, when the first electronic device 14-1*a* and the second electronic device 14-2*a* are worn on opposite ears of the user, the distance between the two electronic devices 14-1*a* and 14-2*a* may be within the critical distance. Alternatively, when the distance between the two electronic devices 14-1*a* and 14-2*a* exceeds a critical distance, the processor 780 of the first electronic device 14-1*a* may select the non-dual mode.

The second electronic device 14-2*a* may be set not to allow a communication connection with the first electronic device 14-1*a*, and the processor 780 of the first electronic device 14-1*a* may select the non-dual mode. Alternatively, the first electronic device 14-1*a* may be set not to allow a communication connection with the second electronic device 14-2*a*, and the processor 780 of the first electronic device 14-1*a* may select the non-dual mode.

When it is sensed that at least one of the first electronic device 14-1*a* and the second electronic device 14-2*a* mounted on an external device (e.g., a charging device), the processor 780 of the first electronic device 14-1*a* may select the non-dual mode.

When the non-dual mode is selected in step 1509, the processor 780 of the first electronic device 14-1*a* may reproduce the audio data received from the external device in step 1517. For example, in the case where the audio data received from the external device is mono audio data, the processor of the first electronic device 14-1*a* may decode the mono audio data to acquire an audio signal, and may output the audio signal through its speaker (mono reproduction). Alternatively, even if the audio data received from the external device is stereo audio data, the processor 780 of the first electronic device 14-1*a* may decode the stereo audio data entirely to acquire an audio signal, and may output the audio signal through its speaker (mono reproduction).

When the non-dual mode is determined in step1509, the processor 780 of the first electronic device 14-1*a* may reproduce the audio data received from the external device in step 1511. For example, in the case where the audio data received from the external device is mono audio data, the processor 780 of the first electronic device 14-1*a* may decode the mono audio data to acquire an audio signal, and may output the audio signal through its a speaker (mono reproduction). Alternatively, in the case where the audio data received from the external device is stereo audio data, the processor 780 of the first electronic device 14-1*a* may decode the first audio data of the stereo audio data to acquire a first audio signal, and may output the first audio signal through its speaker (stereo reproduction).

In step 1513, the processor 780 of the first electronic device 14-1*a* may transmit the audio data received from the external device to the second electronic device 14-2a in real time. The second electronic device 14-2a may reproduce the audio data received from the first electronic device 14-1a. For example, the second electronic device 14-2a may receive mono audio data from the first electronic device 14-1a. The second electronic device 14-1a may decode the mono audio data to acquire an audio signal, and may output the audio signal through its speaker. Alternatively, the second electronic device 14-2a may receive stereo audio data from the first electronic device 14-1a. The second electronic device 14-2a may decode a second audio data of the stereo audio data to acquire a second audio signal, and may output the second audio signal through its speaker.

The following operations may be performed instead of operations 1511 and 1513 described above. When the dual mode is determined in step 1509, the processor 780 of the electronic device 14-1b of FIG. 14B decodes audio data received from the external device to acquire an audio signal, and may transmit the acquired audio signal to the electronic device 14-2b of FIG. 14. For example, the second electronic device 14-2b may output, through its speaker, the audio signal received from the first electronic device 14-1b without decoding the audio data.

For example, the first electronic device 14-1b may decode the mono audio data to acquire an audio signal. The first electronic device 14-1b may output the audio signal through its speaker, and may transmit the audio signal to the second electronic device 14-2b. When the first electronic device 14-1b and the second electronic device 14-2b are mounted on opposite ears of the user (dual mode), the first electronic device 14-1b and the second electronic device 14-2b may output the same audio signal through their respective speakers.

For example, the first electronic device 14-1b may decode the stereo audio data to acquire a first audio signal and a second audio signal. The first electronic device 14-1b may output the first audio signal through its speaker, and may transmit the second audio signal to the second electronic device 14-2b. When the first electronic device 14-1b and the second electronic device 14-2b are mounted on opposite ears of the user (dual mode), the first electronic device 14-1b may output the first audio signal through its speaker, and the second electronic device 14-2b may output the second audio signal through its speaker. This may provide the user with a chance to experience stereophonic sound.

According to various embodiments, the order of the steps of FIG. 15 may be changed, or some of the operations may be simultaneously executed.

Figure 16:
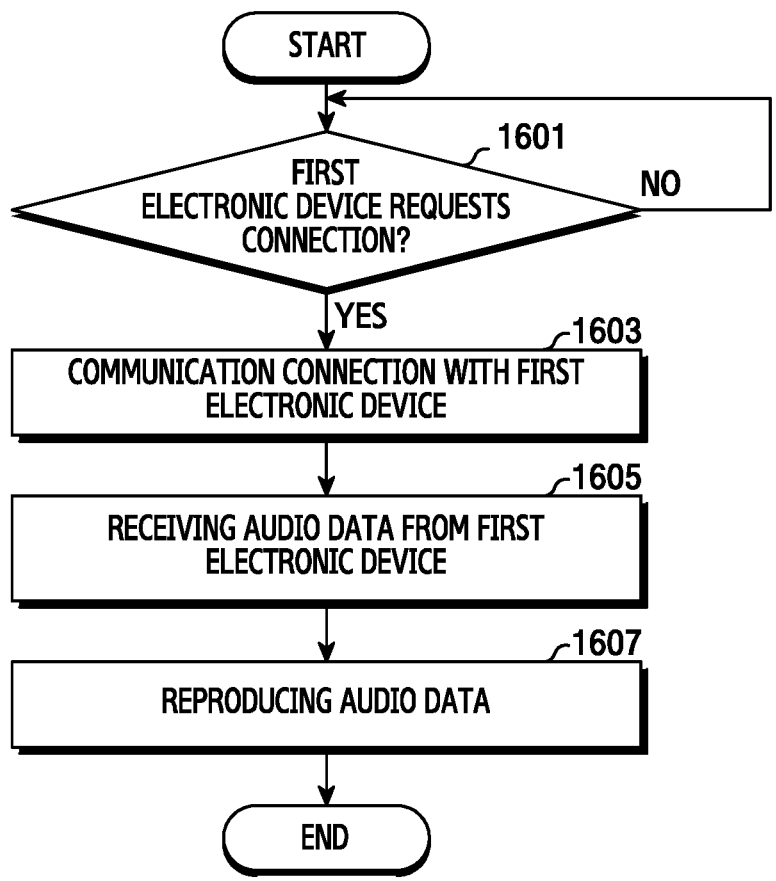
FIG. 16 is a flowchart of a method of operations of a second electronic device of FIG. 14A, according to an embodiment of the present disclosure.

FIG. 16 is a flowchart of a method of operation of the second electronic device 14-2a of FIG. 14A, according to an embodiment of the present disclosure. The second electronic device 14-2a may include all or some of the components of the electronic device 700 of FIG. 7.

Referring to FIG. 16, when a connection request is received from the electronic device 14-1a of FIG. 14, the processor 780 of the second electronic device 14-2a may sense this in step 1601.

In response to the reception of a connection request from the first electronic device 14-1a, the processor 780 of the second electronic device 14-2a may support a communication connection between the first electronic device 14-1a and the second electronic device 14-2a in step 1603. For example, the processor 780 of the second electronic device 14-2a may respond to the communication connection request from the first electronic device 14-1a.

In step 1605, the processor 780 of the second electronic device 14-2a may receive and store audio data received transmitted from the first electronic device 14-1a. The second electronic device 14-2a may be in the dual mode state.

In step 1605, the processor 780 of the second electronic device 14-2a may reproduce audio data received from the first electronic device 14-1a. For example, in the case where the audio data received from the first electronic device 14-1a is mono audio data, the processor 780 of the second electronic device 14-2a may decode the mono audio data to acquire an audio signal, and may output the audio signal through its speaker (mono reproduction). Alternatively, in the case where the audio data receive from the first electronic device 14-1a is stereo audio data, the processor 780 of the second electronic device 14-2a may decode the second audio data of the stereo audio data to acquire a second audio signal, and may output the second audio signal through its speaker (stereo reproduction).

The following operations may be performed instead of steps 1605 and 1607 described above. For example, the second electronic device 14-2b of FIG. 14B may receive the audio signal from the first electronic device 14-1b of FIG. 14B and may output the audio signal through its speaker. The second electronic device 14-2b may output, through its speaker, the audio signal received from the first electronic device 14-1b without decoding the audio data.

For example, the first electronic device 14-1b may decode the mono audio data to acquire an audio signal, and may transmit the audio signal to the second electronic device 14-2b. When the first electronic device 14-1b and the second electronic device 14-2b are mounted on opposite ears of the user (dual mode), the first electronic device 14-1b and the second electronic device 14-2b may output the same audio signal through their respective speakers.

For example, the first electronic device 14-1b may decode the stereo audio data to acquire a first audio signal and a second audio signal. The first electronic device 14-1b may output the first audio signal through its speaker, and may transmit the second audio signal to the second electronic device 14-2b. When the first electronic device 14-1b and the second electronic device 14-2b are mounted on opposite ears of the user (dual mode), the first electronic device 14-1b may output the first audio signal through its speaker, and the second electronic device 14-2b may output the second audio signal through its speaker. This may provide the user with a chance to experience stereophonic sound.

The order of the steps of FIG. 16 may be changed, or some of the operations may be simultaneously executed.

Figure 17:
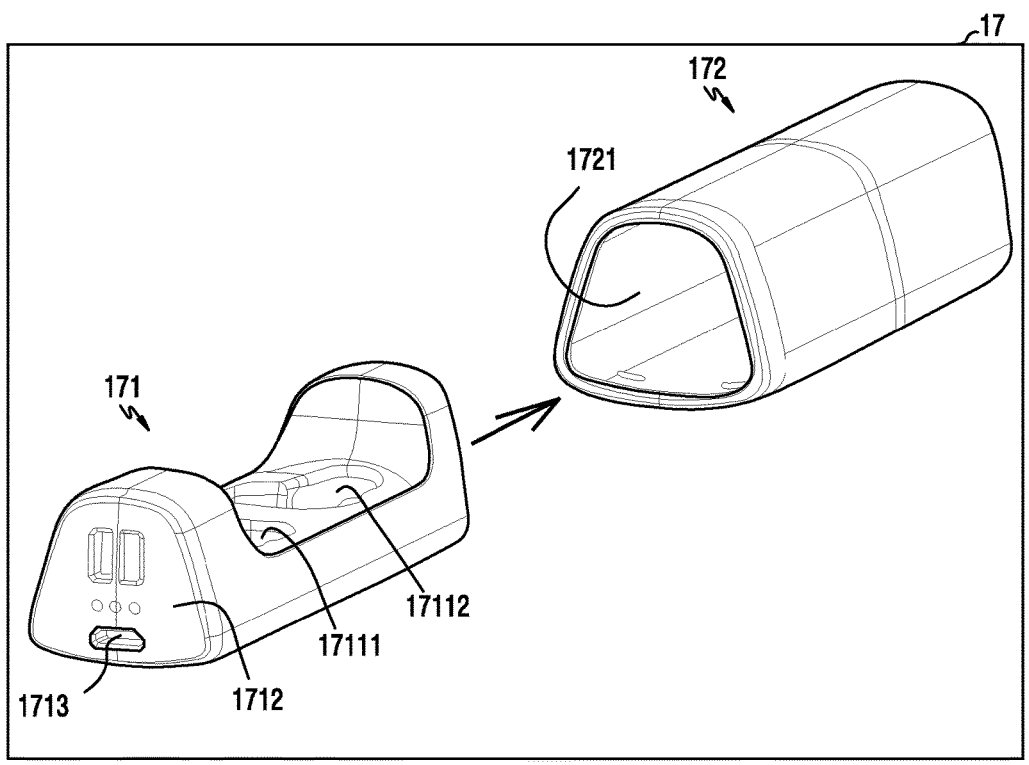
FIG. 17 is a diagram of a third electronic device, according to an embodiment of the present disclosure.

FIG. 17 is a diagram of a third electronic device 17, according to an embodiment of the present disclosure. The third electronic device 17 may include all or some of the components of the first external electronic device 102 or the second external electronic device 104 of FIG. 1.

Referring to FIG. 17, the third electronic device 17 includes a first case device 171 and a second case device 172.

The first case device 171 may include a first mounting part (or a first fixing member) 17111 configured to detachably mount a first electronic device (e.g., the first electronic device 5 of FIG. 6) and a second mounting part (or a second fixing member) 17112 configured to detachably mount a second electronic device (the second electronic device 6 of FIG. 6) thereon. For example, the first mounting part 17111 may be in the form of a recess to which a portion of the first electronic device 5 can be fitted. Similarly, the second mounting part 17112 may also be in the form of a recess to which a portion of the second electronic device 6 can be fitted.

According to one embodiment, the first mounting part 17111 may include one or more contacts. For example, when the first electronic device 5 is mounted on the first mounting part 17111, the one or more contacts of the first electronic device 5 may be electrically connected to one or more contacts of the first mounting part 17111.

The second mounting part 17112 may also include one or more contacts. For example, when the second electronic device 6 is mounted on the second mounting part 17112, the one or more contacts of the second electronic device 6 may be electrically connected to one or more contacts of the second mounting part 17112.

Through the one or more contacts of the first mounting part 17111, the first electronic device 5 may be provided with power for charging or data from the third electronic device 17. Similarly, through the one or more contacts of the second mounting part 17112, the second electronic device 6 may be provided with power for charging or data from the third electronic device 17.

The first case device 171 may include an external interface (e.g., a connector) 1713. An external device (e.g., a server, a smart phone, a PC, a PDA, or an access point) and the external interface 1713 of the first case device 171 may be electrically interconnected by using electric connection means, such as a cable, wire, etc. For example, the external interface 1713 may be a USB connector.

The first case device 171 may be provided with power from an external device (e.g., a power source) through the external interface 1713.

The first case device 171 may be provided with data from an external device (e.g., a smart phone or a data storage place) through the external interface 1713.

The first case device 171 may include a battery. For example, the first case device 171 may be provided with power from an external device so as to charge a battery. Alternatively, the first electronic device 5 may be mounted on the first mounting part 17111 of the first case device 171, and the battery of the first electronic device 5 may be charged by the power of the battery of the first case device 171. Alternatively, the second electronic device 6 may be mounted on the second mounting part 17112 of the first case device 171, and the battery of the second electronic device 6 may be charged by the power of the battery of the first case device 171.

The first case device 171 may include a radiator for wireless charging (e.g., a wireless charging coil) which is disposed in each of the first mounting part 17111 and the second mounting part 17112. The first electronic device 5 and the second electronic device 6 may include a radiator for wireless charging. For example, the first electronic device 5 may be mounted on the first mounting part 17111 of the first case device 171, and the first electronic device 5 may be wirelessly provided with power from the first case device 171 using the radiator for wireless charging so as to charge a battery. Alternatively, the second electronic device 6 may be mounted on the second mounting part 17112 of the first case device 171, and the second electronic device 6 may be wirelessly provided with power from the first case device 171 using the radiator for wireless charging so as to charge a battery.

The second case device 172 may have a substantially tubular shape including a passage 1721. For example, the first case device 171, which is mounted with the first electronic device 5 and the second electronic device 6, is inserted into the passage 1721 of the second case device 172 so as to store the first case device 171 within the second case device 172.

The first case device 171 may include a face 1712 that is exposed even if the first case device 171 is completely coupled to the second case device 172. The above-mentioned external interface 1713 may be disposed on the face 1712.

Figure 18:
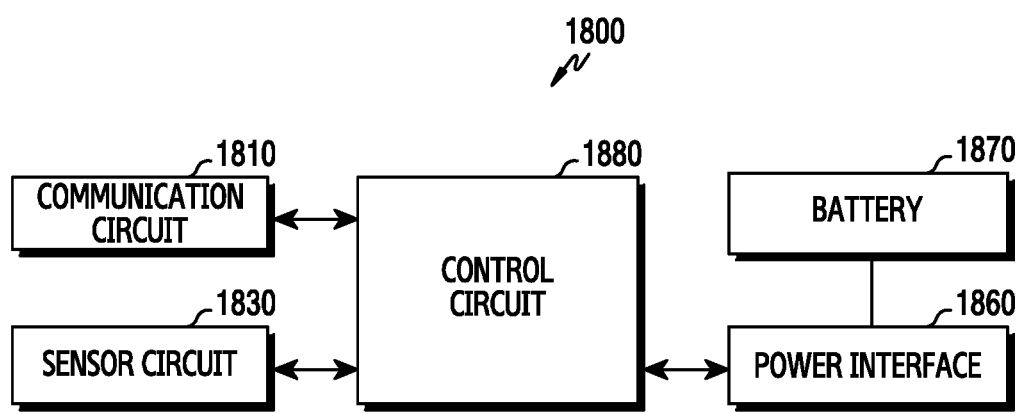
FIG. 18 is a diagram of an electronic device, according to an embodiment of the present disclosure.

FIG. 18 is a diagram of an electronic device 1800, according to an embodiment of the present disclosure. The electronic device 1800 may include all or some of the components of the third electronic device 17 of FIG. 17.

Referring to FIG. 18, the electronic device 1800 includes a communication circuit 1810, a sensor circuit 1830, at least one power interface 1860, a battery 1870, or a control circuit 1880.

The communication circuit 1810 may support reception of audio data from an external device. The communication circuit 1810 may include the external interface 1713 of FIG. 17. Using the external interface, an external device (e.g., a server, a smart phone, a PC, a PDA, or an access point) may be connected to the electronic device 1800, and the communication circuit 1810 may receive audio data from the external device.

The communication circuit 1810 may be configured such that audio data can be transmitted to the first electronic device 5 of FIG. 6 and/or second electronic device 6 of FIG. 6. The communication circuit 1810 may include contacts for the external interface. In the case where the first electronic device 5 and/or the second electronic device 6 are coupled to the mounting parts 17111 and 17112 of FIG. 17 of the electronic device 1800, the first electronic device 5 and/or the second electronic device 6 may be electrically connected to the contacts for the external interface in the communication circuit 1810. Using the contacts for the external interface, the first electronic device 5 and/or the second electronic device 6 are connected to the electronic device 1800, and the communication circuit 1810 may transmit audio data to the first electronic device 5 and/or the second electronic device 6.

The sensor circuit 1830 may output a signal indicating whether the first electronic device 5 and/or the second electronic device 6 are coupled to the electronic device 1800.

The sensor circuit 1830 may include a proximity sensor. When the first electronic device 5 and the second electronic device 6 are coupled to the mounting parts 17111 and 17112 of FIG. 17, the proximity sensor may output a signal indicating that the first electronic device 5 and/or the second electronic device 6 are coupled to the electronic device 1800.

The sensor circuit 1830 may include a hall sensor. Each of the first electronic device 5 and the second electronic device 6 may include a magnet disposed on a face thereof. When the first electronic device 5 and/or the second electronic device 6 are coupled to the mounting parts 17111 and 17112 of FIG. 17, the hall sensor may output a signal indicating that the first electronic device 5 and/or the second electronic device 6 are coupled to the electronic device 1800.

The sensor circuit 1830 may output a signal indicating that the first electronic device 5 and/or the second electronic device 6 are coupled to the electronic device 1800 using the contacts for the external interface. In the case where the first electronic device 5 and/or the second electronic device 6 are coupled to the mounting parts 17111 and 17112 of FIG. 17 of the electronic device 1800, the first electronic device 5 and/or the second electronic device 6 may be electrically connected to the contacts for the external interface in the communication circuit 1810. In the case where the first electronic device 5 and/or the second electronic device 6 are electrically connected to the contacts for the external interface in the communication circuit 1810, the sensor circuit 1830 may output a signal indicating that the first electronic device 5 and/or the second electronic device 6 are coupled to the electronic device 1800.

At least one power interface 1860 may support the charging of the battery 1870 equipped in the electronic device 1800. For example, the external device is connected to the external interface 1713 of FIG. 17 of at least one power interface 1860 through a wire, and the at least one power interface 1860 may receive power from the external device to charge the battery 1870.

At least one power interface 1860 may support the charging of the first electronic device 5 and/or the second electronic device 6. For example, in the case where the first electronic device 5 and/or the second electronic device 6 are coupled to the mounting parts 17111 and 17112 of FIG. 17 of the electronic device 1800, the first electronic device 5 and/or the second electronic device 6 may be electrically connected to the contacts for the external interface. The at least one power interface 1860 may supply power to the first electronic device 5 and/or the second electronic device 6 through the contacts for the external interface.

When both the first electronic device 5 and/or the second electronic device 6 are electrically connected to the electronic device 1800, the control circuit 1880 may be configured such that audio data from an external device (e.g., a server, a smart phone, a PC, a PDA, or a access point) is simultaneously delivered to the first electronic device 5 and the second electronic device 6. For example, in the case where, between the first electronic device 5 and the second electronic device 6, the first electronic device 5 is electrically connected to the electronic device 1800, the control circuit 1880 may be configured such that the audio data from the external device is not delivered to the first electronic device 5.

The control circuit 1880 may confirm the electrically connected state of the first electronic device 5 and the second electronic device 6 to the electronic device 1800 using the sensor circuit 1830.

An electronic device may include a housing, a communication circuit disposed within the housing, at least one power interface disposed within the housing, and a control circuit electrically connected to the communication circuit and the at least one power interface. In the electronic device, the housing may include at least one fixing member configured to accommodate a first ear piece including a first battery and/or a second ear piece including a second battery. The control circuit may be configured to form a connection with an external mobile electronic device by using the communication circuit, to receive one or more contents from the external mobile electronic device, and transmit the one or more contents to the first ear piece and/or the second ear piece.

The control circuit may be configured to receive power from an external power source by using the at least one power interface, and to transmit the received power to the first ear piece and/or the second ear piece by using the at least one power interface.

Figure 19:
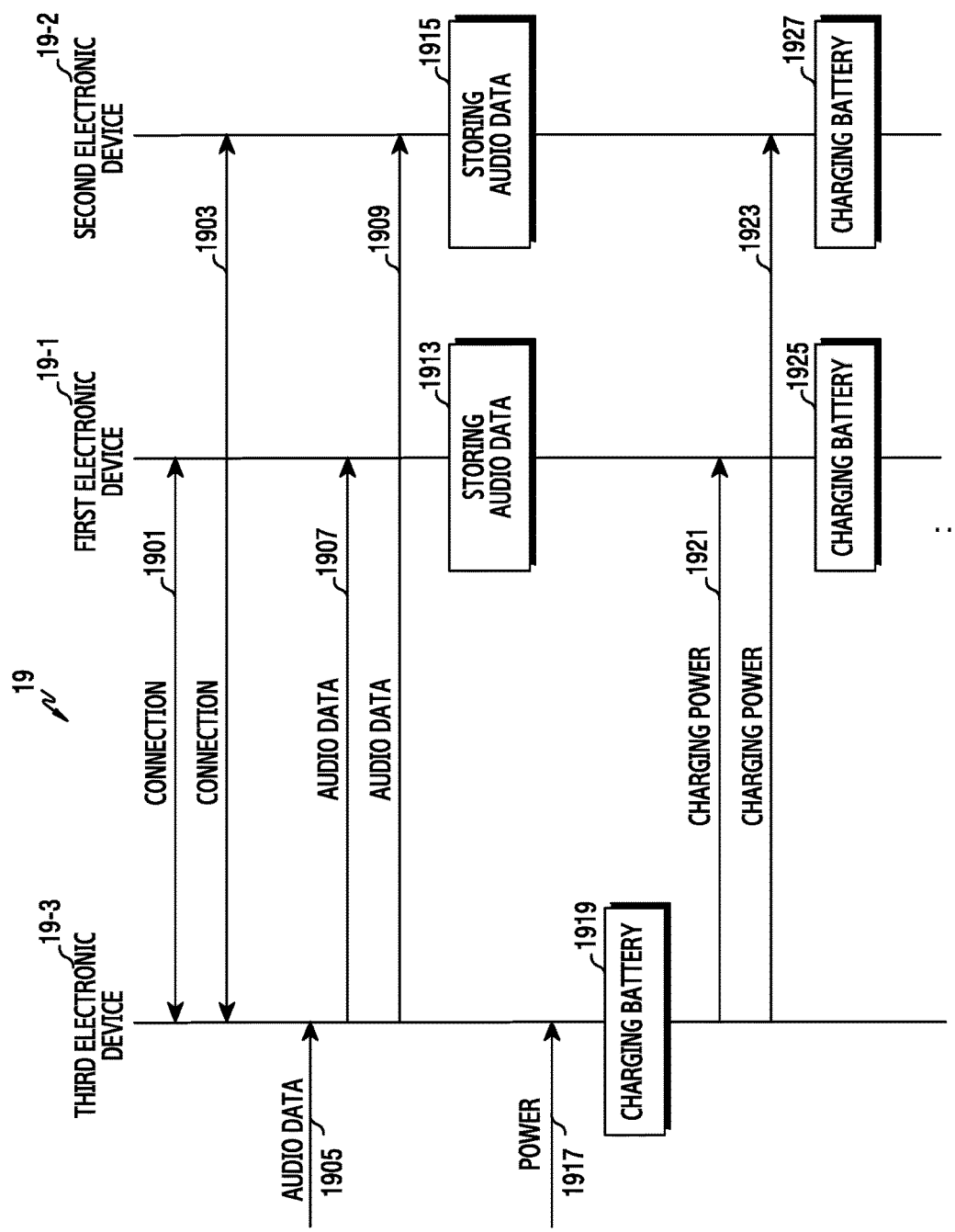
FIG. 19 is a signaling diagram of communication flow of a system, according to an embodiment of the present disclosure.

FIG. 19 is a signaling diagram of communication flow of a system, according to an embodiment of the present disclosure.

Referring to FIG. 19, the system 19 includes a first electronic device 19-1, a second electronic device 19-2, and a third electronic device 19-3. The first electronic device 19-1 may include all or some of the components of the first electronic device 5 of FIG. 6. The second electronic device 19-2 may include all or some of the components of the second electronic device 6 of FIG. 6. The third electronic device 19-3 may include all or some of the components of the third electronic device 17 of FIG. 17.

In step 1901, the third electronic device 19-3 and the first electronic device 19-1 may be connected to each other.

In step 1903, the third electronic device 19-3 and the second electronic device 19-2 may be connected to each other.

In step 1905, an external electronic device (e.g., a server, a smart phone, a PC, a PDA, or an access point) may transmit audio data to the third electronic device 19-3. The audio data may be non-volatile audio data or volatile audio data. Alternatively, the audio data may be mono audio data or stereo audio data.

In step 1907, the third electronic device 19-3 may transmit the audio data received from the external device to the first electronic device 19-1.

In step 1909, the third electronic device 19-3 may transmit the audio data received from the external device to the second electronic device 19-2.

In step 1913, the first electronic device 19-1 may store the audio data received from the third electronic device 19-3. For example, the first electronic device 19-1 may store non-volatile audio data received from the third electronic device 19-3 in the non-volatile memory of the first electronic device 19-1. Alternatively, the first electronic device 19-1 may store volatile audio data received from the third electronic device 19-3 in the volatile memory of the first electronic device 19-1.

In step 1915, the second electronic device 19-2 may receive audio data from the third electronic device 19-3. For example, the second electronic device 19-2 may store non-volatile audio data received from the third electronic device 19-3 in the non-volatile memory of the second electronic device 19-2. Alternatively, the second electronic device 19-2 may store volatile audio data received from the third electronic device 19-3 in the volatile memory of the second electronic device 19-2.

In step 1917, the external device may provide power to the third electronic device 19-3.

In step 1919, the third electronic device 19-3 may charge the battery 1870 of FIG. 18 of the third electronic device 19-3 using the power provided from the external device.

In step 1921, the third electronic device 19-3 may deliver charging power to the first electronic device 19-1.

In step 1923, the third electronic device 19-3 may deliver charging power to the second electronic device 19-2.

In step 1925, the first electronic device 19-1 may charge the battery of the first electronic device 19-1 using the charging power provided from the third electronic device 19-3.

In step 1927, the second electronic device 19-2 may charge the battery of the second electronic device 19-2 using the charging power provided from the third electronic device 19-3.

The order of the steps of FIG. 19 may be changed, or some of the operations may be simultaneously executed.

Figure 20:
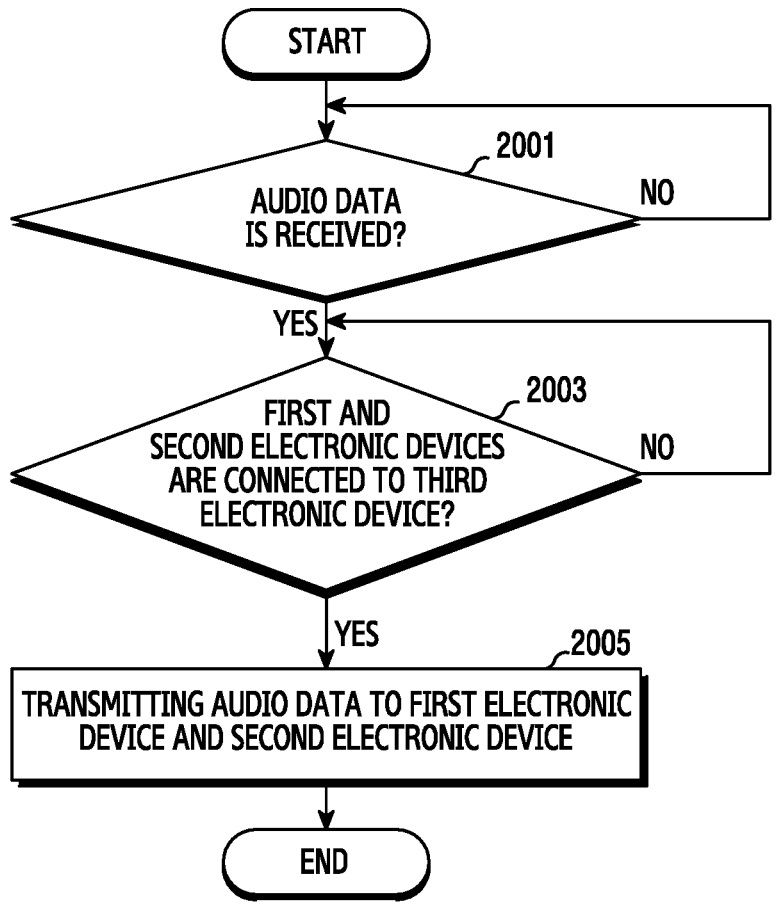
FIG. 20 is a flowchart of a method of operations of the third electronic device of FIG. 18, according to an embodiment of the present disclosure.
Figure 21A:
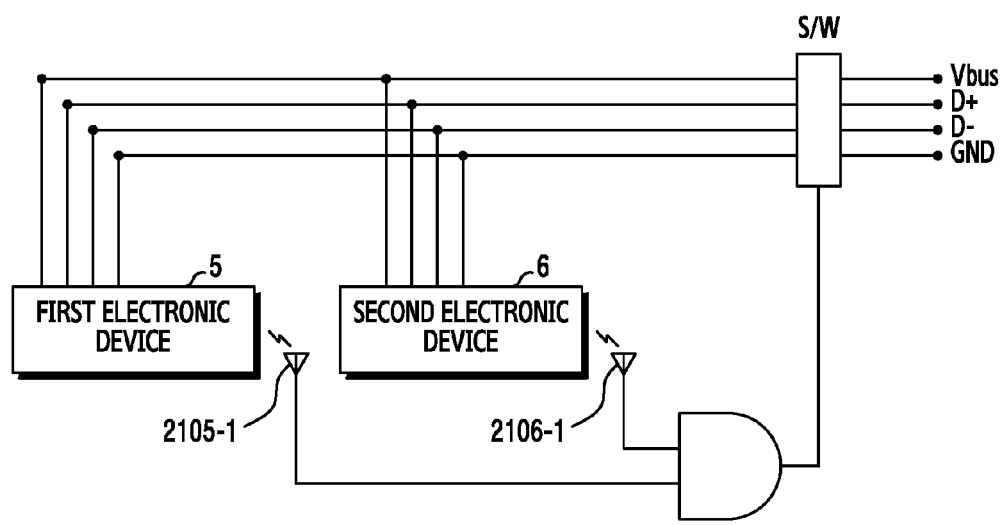
FIGS. 21A to 21C are diagrams of circuits for sensing a connected state of the first electronic device and the second electronic device in relation to the third electronic device, according to an embodiment of the present disclosure.
Figure 21B:
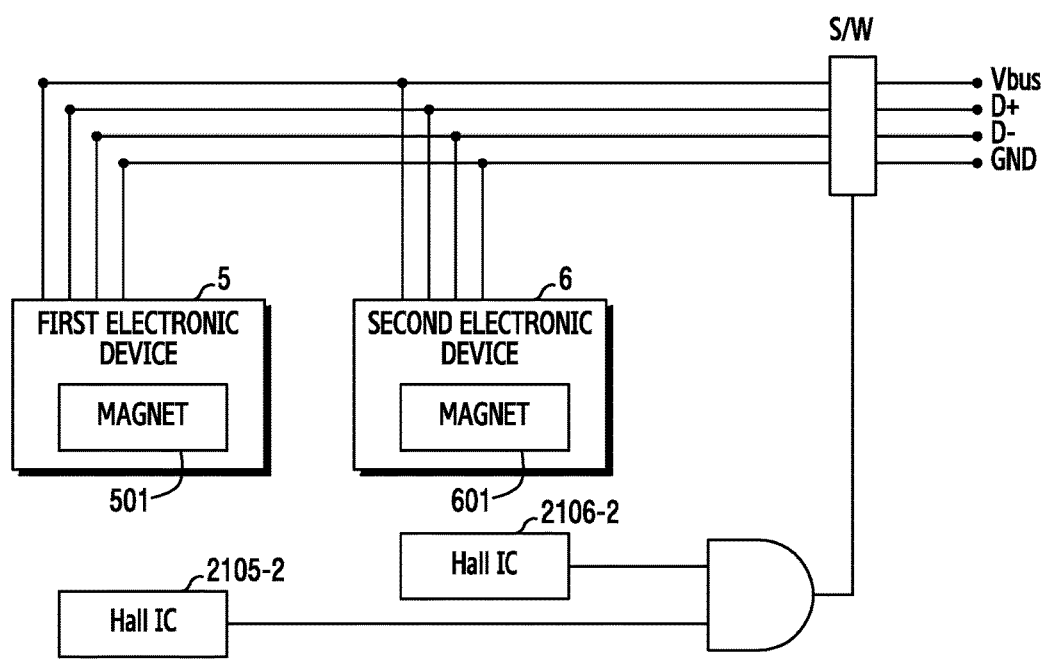
Figure 21C:
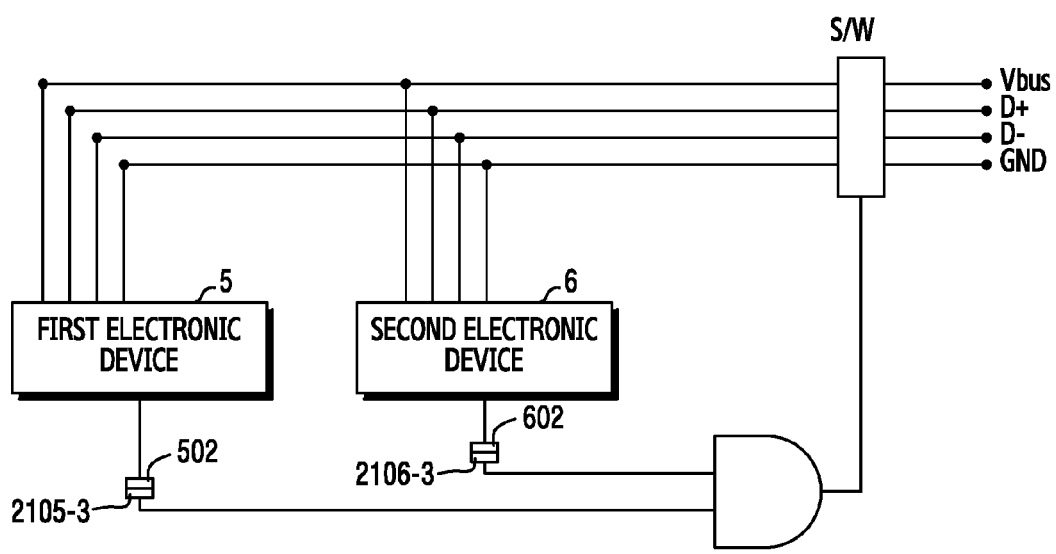

FIG. 20 is a flowchart of a method of operation of the third electronic device 1800 of FIG. 18, according to an embodiment of the present disclosure. FIGS. 21A to 21C are diagrams of circuits for sensing a state in which the first electronic device 5 of FIG. 6 and the second electronic device 6 of FIG. 6 are connected to the third electronic device 1800, according to an embodiment of the present disclosure. An external electronic device (e.g., a server, a smart phone, a PC, a PDA, or an access point) may be electrically connected to the third electronic device 1800 using the external interface 1713 of FIG. 17.

Referring to FIG. 20, audio data is received from the external device, and in step 2001, the control circuit 1880 may sense the received audio data.

In step 2003, the control circuit 1880 may confirm whether the first electronic device 5 of FIG. 6 and the second electronic device 6 of FIG. 6 are electrically connected to the third electronic device 1800. When it is confirmed that the first electronic device 5 and the second electronic device 6 are connected to the third electronic device 1800, the control circuit 1880 may perform step 2005.

In the case where the first electronic device 5 is coupled to the mounting part 17111 of FIG. 17 of the third electronic device 1800, and the second electronic device 6 is coupled to the mounting part 17112 of FIG. 17, the first electronic device 5 and the second electronic device 6 may be electrically connected to the third electronic device 1800.

Referring to FIG. 21A, the third electronic device 1800 may include a first proximity sensor 2105-1 provided in the first mounting part 17111 and a second proximity sensor 2106-1 provided in the second mounting part 17112. In the case where the first electronic device 5 is coupled to the first mounting part 17111 of the third electronic device 1800, the first proximity sensor 2105-1 of the third electronic device 1800 may output a signal indicating that the first electronic device 5 is electrically connected to the third electronic device 1800. In the case where the second electronic device 6 is coupled to the second mounting part 17112 of the third electronic device 1800, the second proximity sensor 2106-1 of the third electronic device 1800 may output a signal indicating that the second electronic device 6 is electrically connected to the third electronic device 1800.

Referring to FIG. 21B, the third electronic device 1800 may include a first hall IC 2105-2 provided in the first mounting part 17111 and a second hall IC 2106-2 provided in the second mounting part 17112. The first electronic device 5 may include a first magnet 501. The second electronic device 6 may include a second magnet 601. In the case where the first electronic device 5 is coupled to the first mounting part 17111 of the third electronic device 1800, the first hall IC 2105-2 of the third electronic device 1800 may recognize the first magnet 501 of the first electronic device 5. In the case where the second electronic device 6 is coupled to the second mounting part 17112 of the third electronic device 1800, the second hall IC 2206-2 of the third electronic device 1800 may recognize the second magnet 601 of the second electronic device 6.

Referring to FIG. 21C, the third electronic device 1800 may include a first contact 2105-3 provided in the first mounting part 17111 and a second contact 2106-3 provided in the second mounting part 17112. The first electronic device 5 may include a first contact 502. The second electronic device 6 may include a second contact 602. In the case where the first electronic device 5 is coupled to the first mounting part 17111 of the third electronic device 1800, the first contact 2105-3 of the third electronic device 1800 may be electrically connected to the first contact 502 of the first electronic device 5. In the case where the second electronic device 6 is coupled to the second mounting part 17112 of the third electronic device 1800, the second contact 2106-3 of the third electronic device 1800 may be electrically connected to the second contact 602 of the second electronic device 6.

In step 2005 (FIG. 20), the control circuit 1880 may transmit audio data received from an external device to the first electronic device 5 and the second external device 6. For example, the first electronic device 5 and the second electronic device 6 may store the same audio data.

The order of the steps of FIG. 20 may be changed, or some of the operations may be simultaneously executed.

Figure 22:
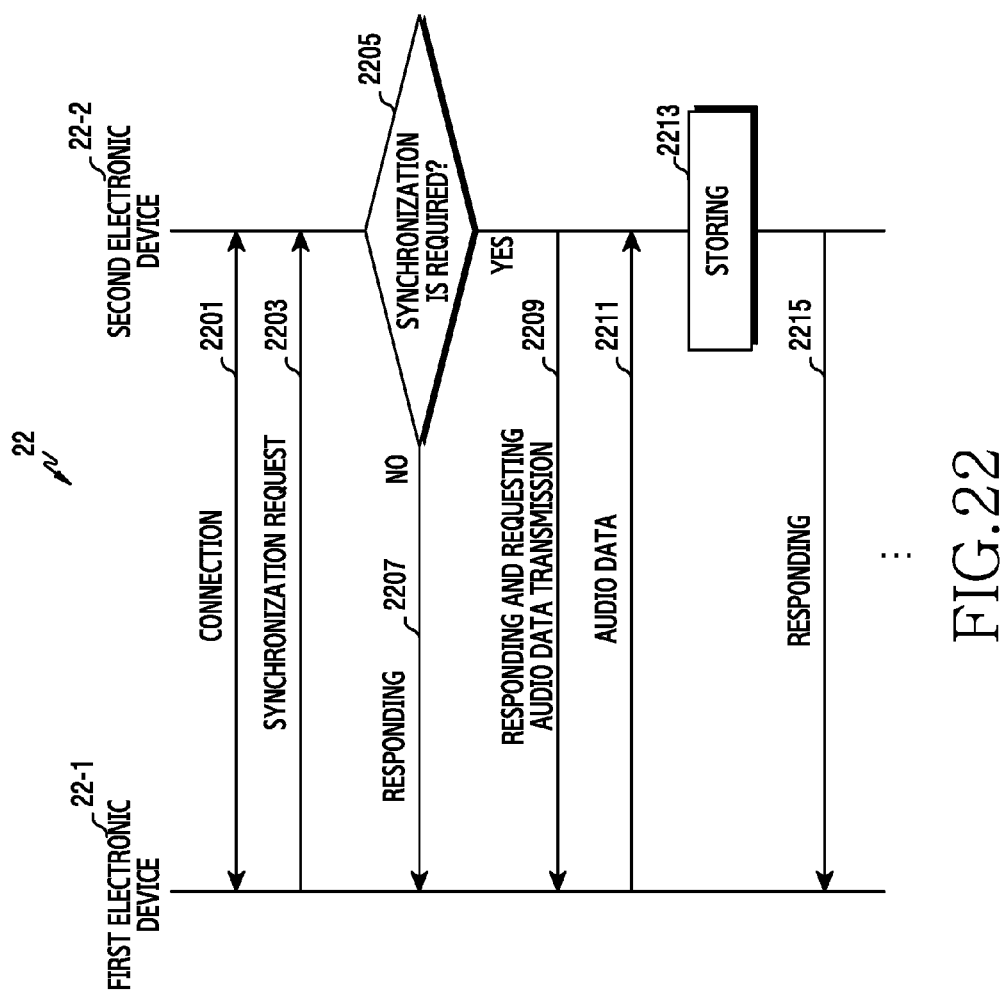
FIG. 22 is a signaling diagram of communication flow of a system, according to an embodiment of the present disclosure.

FIG. 22 is a signaling diagram of communication flow of a system, according to an embodiment of the present disclosure.

Referring to FIG. 22, the system 22 may include a first electronic device 22-1 and a second electronic device 22-2. The first electronic device 22-1 may include all or some of the components of the first electronic device 5 of FIG. 6. The second electronic device 22-2 may include all or some of the components of the second electronic device 6 of FIG. 6.

In step 2201, the first electronic device 22-1 and the second electronic device 22-2 may be connected to each other.

In step 2203, the first electronic device 22-1 may request synchronization for audio data to the second electronic device 22-2. For example, the first electronic device 22-1 may collect information related to the audio data stored in a memory, and the request for synchronization may include the information related to the collected audio data.

In step 2205, the second electronic device 22-2 may determine whether synchronization is necessary in response to the synchronization request received from the first electronic device 22-1. For example, in the case where the second electronic device 22-2 stores all the audio data stored in the first electronic device 22-1, the second electronic device 22-2 may determine that the synchronization is not necessary. Alternatively, in the case where the second electronic device 22-2 stores only a portion of the audio data stored in the first electronic device 22-1, the second electronic device 22-2 may determine that the synchronization is necessary.

When it is confirmed that the synchronization is not necessary, the second electronic device 22-2 may respond to the first electronic device 22-1 with the confirmed result, in step 2207.

When it is confirmed that the synchronization is necessary, the second electronic device 22-2 may respond to the first electronic device 22-1 with the confirmed result, and may request transmission of the audio data, in step 2209.

In step 2211, the first electronic device 22-1 may transmit, to the second electronic device 22-2, the audio data according to the request from the second electronic device 22-2.

In step 2213, the second electronic device 22-2 may store the audio data received from the first electronic device 22-1 in the memory.

In step 2215, the second electronic device 22-2 may transmit, to the first electronic device 22-1, a response indicating that reception of the audio data from the first electronic device 22-1 is completed. After receiving and storing the audio data from the first electronic device 22-1, the second electronic device 22-2 may have audio data that is synchronizable to the first electronic device 22-1.

Although not illustrated, the second electronic device 22-2 may request synchronization for audio data to the first electronic device 21-1. The first electronic device 22-1 may determine whether the synchronization is necessary in response to the synchronization request received from the second electronic device 22-2, and when it is confirmed that the synchronization is necessary, may request transmission of the audio data to the second electronic device 22-2. After receiving and storing the audio data from the second electronic device 22-2, the first electronic device 22-1 may have audio data that is synchronizable to the second electronic device 22-2.

Steps 2201 to 2215 may be periodically performed.

The order of the steps of FIG. 22 may be changed, or some of the operations may be simultaneously executed.

Figure 23A:
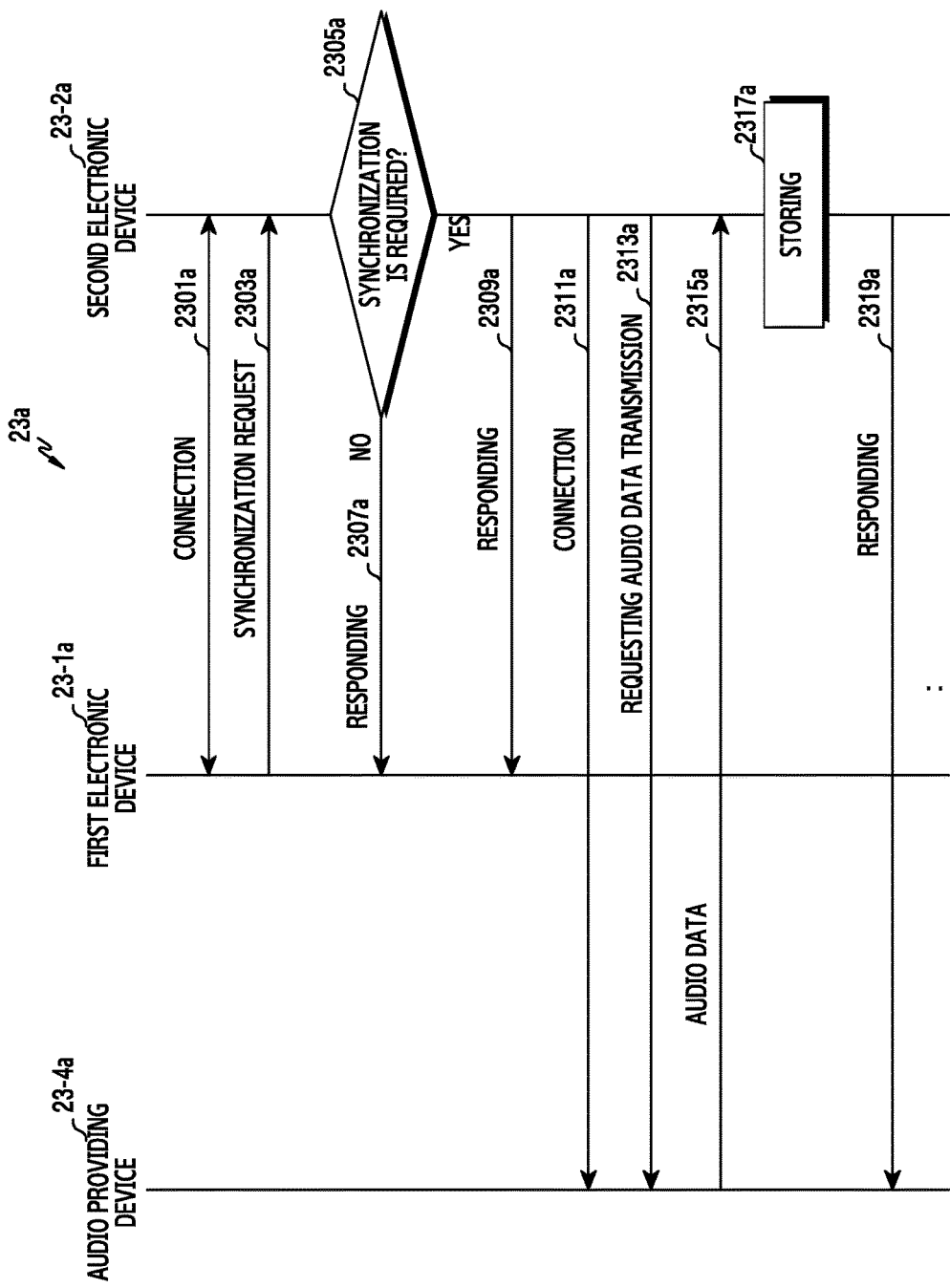
FIG. 23A is a signaling diagram, of communication flow of a system, according to an embodiment of the present disclosure.

FIG. 23A is a signaling diagram of communication flow of a system, according to an embodiment of the present disclosure.

Referring to FIG. 23A, the system 23a may include a first electronic device 23-1a, a second electronic device 23-2a, and an audio providing device 23-4a. The first electronic device 23-1a may include all or some of the components of the first electronic device 5 of FIG. 6. The second electronic device 23-2a may include all or some of the components of the second electronic device 6 of FIG. 6. The audio providing device 23-4a may include a server. Alternatively, the audio providing device 23-4a may include, for example, a portable phone, a PC, a PDA, or an access point (AP).

In step 2301a, the first electronic device 23-1a and the second electronic device 23-2a may be connected to each other.

In step 2303a, the first electronic device 23-1a may request synchronization for audio data to the second electronic device 23-2a. For example, the first electronic device 23-1a may collect information related to the audio data stored in a memory, and the request for synchronization may include the information related to the collected audio data.

In step 2305a, the second electronic device 23-2a may determine whether synchronization is necessary in response to the synchronization request received from the first electronic device 23-1a. For example, in the case where the second electronic device 23-2a stores all the audio data stored in the first electronic device 23-1a, the second electronic device 23-2a may determine that the synchronization is not necessary. Alternatively, in the case where the second electronic device 23-2a stores only a portion of the audio data stored in the first electronic device 23-1a, the second electronic device 23-2a may determine that the synchronization is necessary.

When it is confirmed that the synchronization is not necessary, the second electronic device 23-2a may respond to the first electronic device 23-1a with the confirmed result, in step 2307a.

When it is confirmed that the synchronization is necessary, the second electronic device 23-2a may respond to the first electronic device 23-1a with the confirmed result, in step 2309a.

In step 2311a, the second electronic device 23-2a and the audio providing device 23-4a may be connected to each other.

In step 2313a, the second electronic device 23-2a may request transmission of audio data from the audio providing device 23-4a.

In step 2315a, the audio providing device 23-4a may transmit, to the second electronic device 23-2a, the audio data according to the request from the second electronic device 23-2a.

In step 2317a, the second electronic device 23-2a may store the audio data received from the audio providing device 23-4a in the memory.

In step 2319a, the second electronic device 23-2a may transmit, to the audio providing device 23-4a, a response indicating that reception of the audio data from the audio providing device 23-4a is completed. After receiving and storing the audio data from the audio providing device 23-4a, the second electronic device 23-2a may have audio data that is synchronizable to the first electronic device 23-1a.

Although not illustrated, the second electronic device 23-2a may request synchronization for audio data to the first request electronic device 23-1a. The first electronic device 23-1a may determine whether the synchronization is necessary in response to the synchronization request received from the second electronic device 23-2a, and when it is confirmed that the synchronization is necessary, may request transmission of the audio data from the audio providing device 23-4a. After receiving and storing the audio data from the audio providing device 23-4a, the first electronic device 23-1a may have audio data that is synchronizable to the second electronic device 23-2a.

Steps 2301a to 2319a may be periodically performed.

The order of the steps of FIG. 23A may be changed, or some of the operations may be simultaneously executed.

Figure 23B:
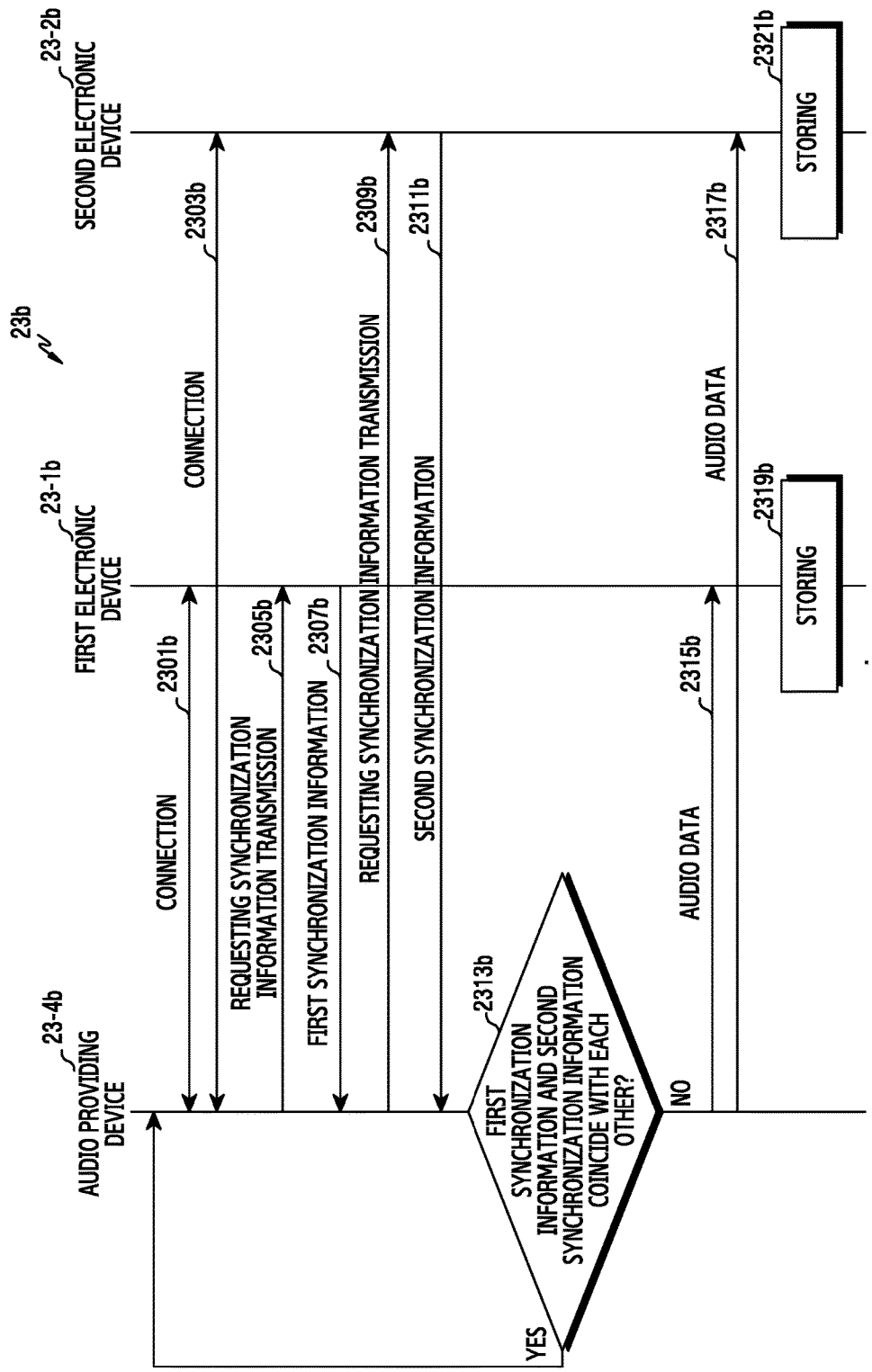
FIG. 23B is a signaling diagram of communication flow of a system, according to an embodiment of the present disclosure.

FIG. 23B is a signaling diagram of communication flow of a system, according to an embodiment of the present disclosure.

Referring to FIG. 23B, the system 23b may include a first electronic device 23-1b, a second electronic device 23-2b, and an audio providing device 23-4b. The first electronic device 23-1b may include all or some of the components of the first electronic device 5 of FIG. 6. The second electronic device 23-2b may include all or some of the components of the second electronic device 6 of FIG. 6. The audio providing device 23-4b may include a server. Alternatively, the audio providing device 23-4b may include, for example, a portable phone, a PC, a PDA, or an AP.

In step 2301b, the audio providing device 23-4b and the first electronic device 23-1b may be connected to each other.

In step 2303b, the audio providing device 23-4b and the second electronic device 23-2b may be connected to each other.

In step 2305b, the audio providing device 23-4b may request the first electronic device 23-1b to transmit synchronization information related to the audio data.

In step 2307b, the first electronic device 23-1b may collect information related to the audio data stored in the memory, and may transmit first synchronization information including the collected information to the audio providing device 23-4b.

In step 2309b, the audio providing device 23-4b may request the second electronic device 23-2b to transmit the synchronization information related to the audio data.

In step 2311b, the second electronic device 23-2b may collect information related to the audio data stored in the memory, and may transmit second synchronization information including the collected information to the audio providing device 23-4b.

In step 2313b, the audio providing device 23-4b may determine whether the first synchronization received from the first electronic device 23-1b and the second synchronization information received from the second electronic device 23-2b coincide with each other.

In the case where the first synchronization information and the second synchronization information do not coincide with each other, the audio providing device 23-4b may transmit the audio data to the first electronic device 23-1b in step 2315b. In step 2317b, the audio providing device 23-4b may transmit the audio data to the second electronic device 23-2b.

In step 2319b, the first electronic device 23-1b may store the audio data received from the audio providing device 23-4b in the memory. After receiving and storing the audio data from the audio providing device 23-4b, the first electronic device 23-1b may have audio data that is synchronizable to the second electronic device 23-2b. Alternatively, in step 2321b, the second electronic device 23-2b may store the audio data received from the audio providing device 23-4b in the memory. After receiving and storing the audio data from the audio providing device 23-4b, the second electronic device 23-2b may have audio data that is synchronizable to the first electronic device 23-1b.

Steps 2301b to 2321b may be periodically performed.

The order of the steps of FIG. 23B may be changed, or some of the operations may be simultaneously executed.

Figure 24:
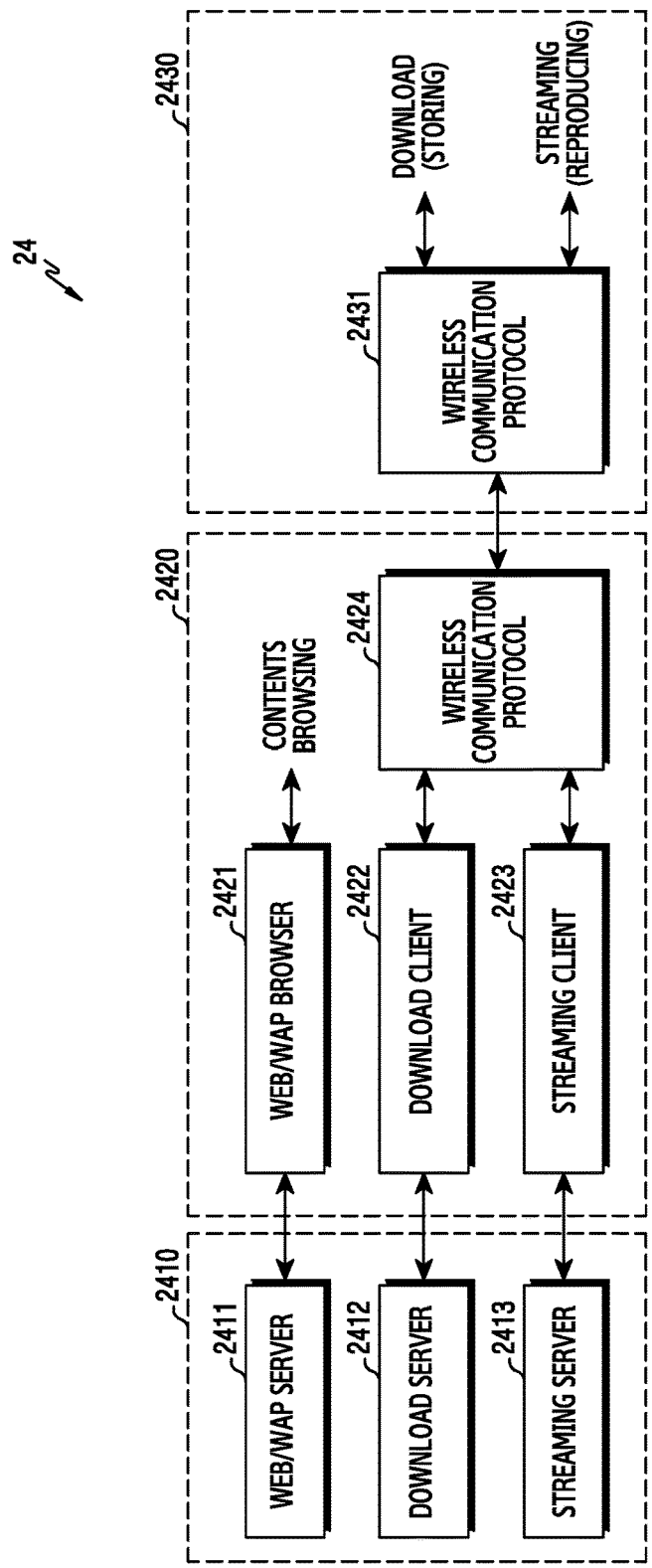
FIG. 24 is a diagram of a system, according to an embodiment of the present disclosure.
Figure 25:
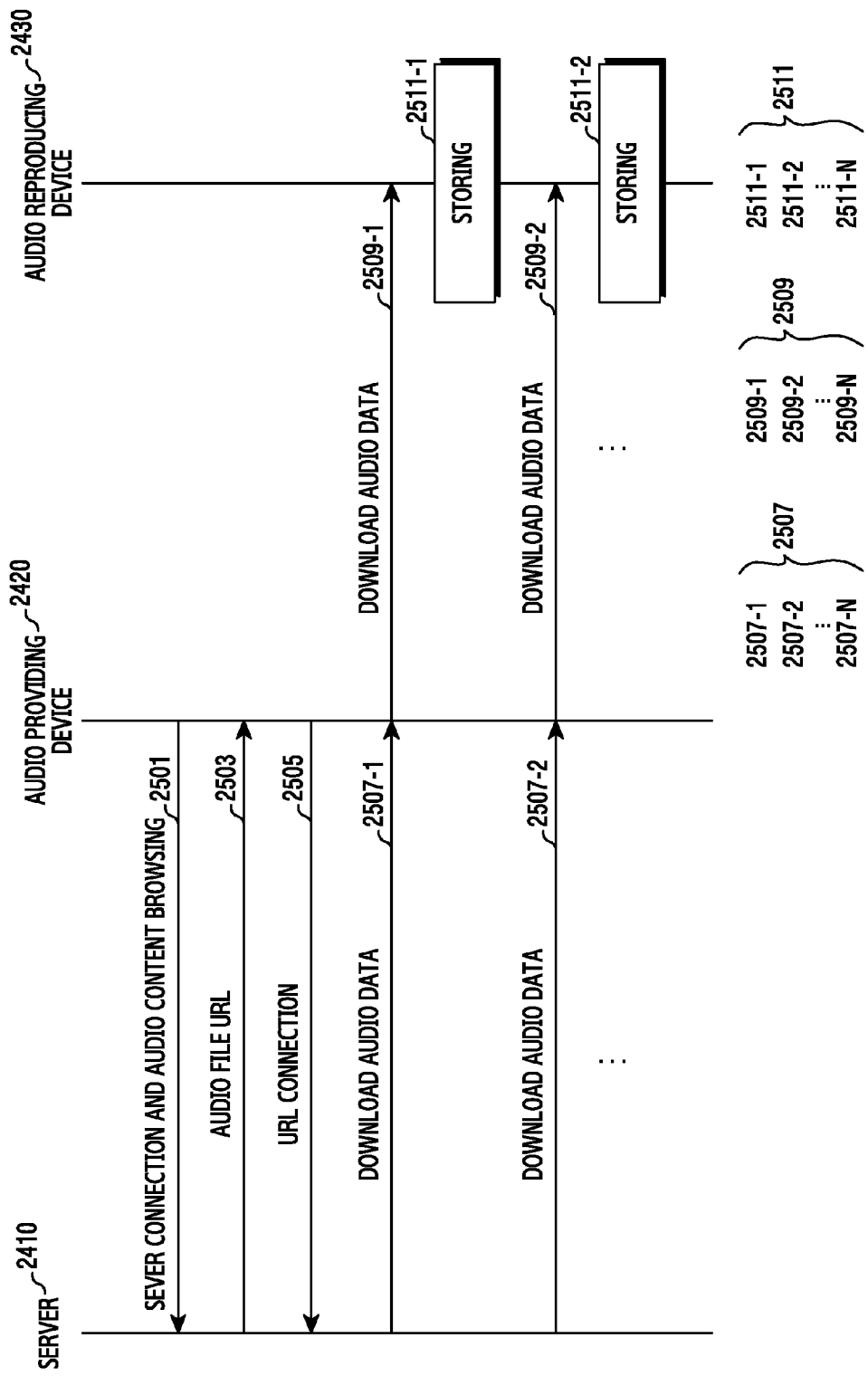
FIG. 25 is a signaling diagram of download flow of audio data, according to an embodiment of the present disclosure.
Figure 26:
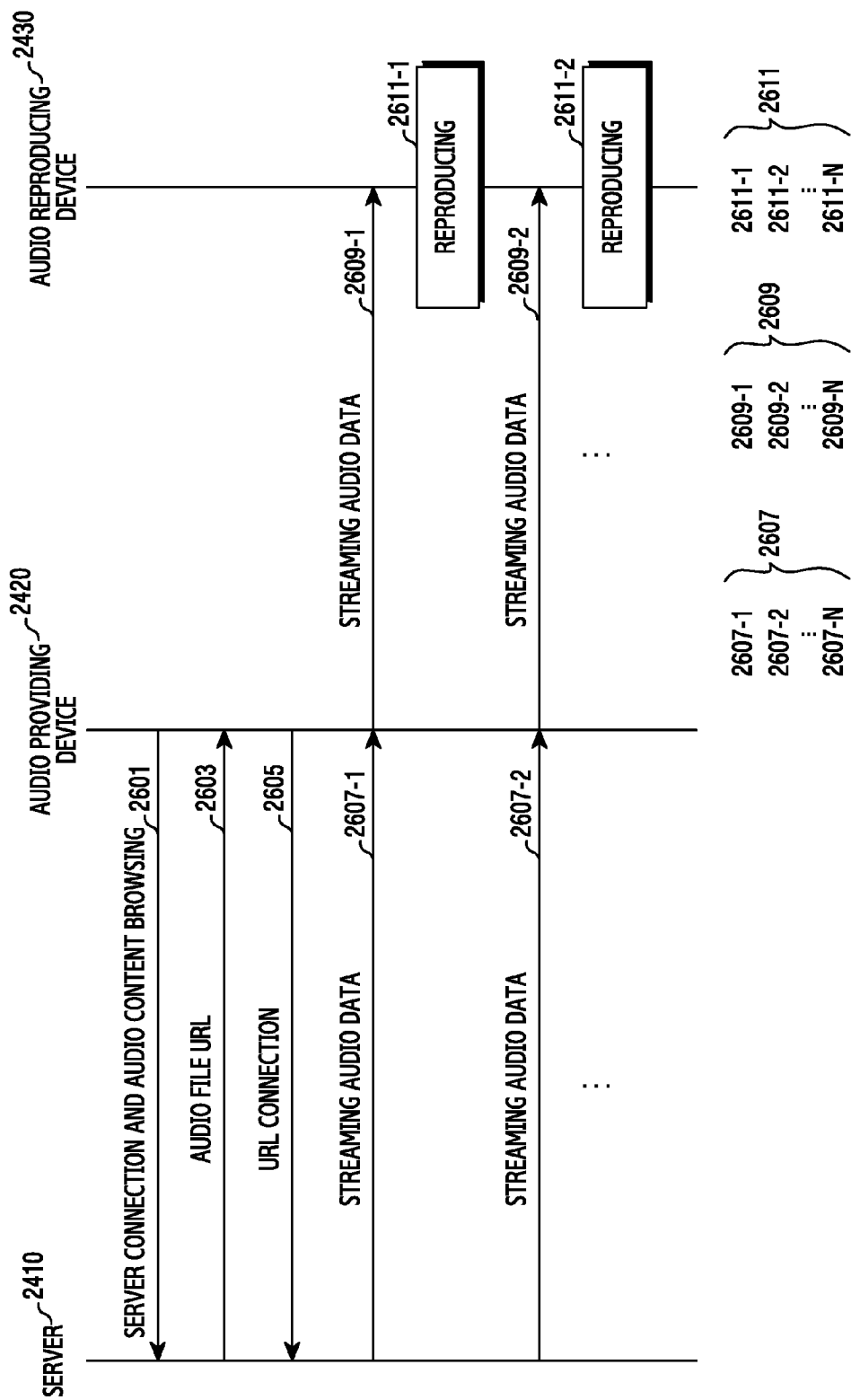
FIG. 26 is a signaling diagram of streaming flow of audio data, according to an embodiment of the present disclosure.

FIG. 24 is a diagram of a system, according to an embodiment of the present disclosure. FIG. 25 is a diagram of a download flow of audio data, according to an embodiment of the present disclosure. In addition, FIG. 26 is a diagram of streaming flow of audio data, according to an embodiment of the present disclosure.

Referring to FIG. 24, the system 24 may include a serer 2410, an audio providing device 2420, and at least one audio reproducing device 2430.

The server 2410 may include a web/wireless application protocol (wap) server 2411, a download server 2412, and a streaming server 2413. The web/wap server 2411 may support a web or wap connection. The download server 2412 may support a download service. The streaming server 2413 may support a streaming service.

The audio providing device 2420 (e.g., a portable phone, a PC, a PDA, or an AP) may include a web/wap browser 2421, a download client 2422, a streaming client 2423, and a wireless communication protocol 2424. The web/wap browser 2421 may support content browsing in response to the web/wap server 2411. The download client 2422 may support a download service in response to the download server 2412. The streaming client 2423 may support a streaming service in response to the streaming server 2413. In addition, the wireless communication protocol 2424 may support delivering streamed or downloaded data to the at least one audio reproducing device 2430.

The audio reproducing device 2430 may include a wireless communication protocol 2431 which corresponds to the wireless communication protocol 2424 of the audio providing device 2420, and may support a streaming service and a download service.

The audio reproducing device 2430 may include all or some of the components of the first external electronic device 5 or the second external electronic device 6 of FIG. 6. Alternatively, the audio reproducing device 2430 may include all or some of the components of the electronic device 700 of FIG. 7.

Referring to FIG. 25, in step 2501, the audio providing device 2420 may connect to the web/wap server 2411 of the server 2410 using the web/wap browser 2421 via a user input. The web/wap browser 2421 of the audio providing device 2420 may browse audio contents after connecting to the web/wap server 2411 via the user input. In addition, the web/wap browser 2421 of the audio providing device 2420 may select an audio file for a download service among the audio contents browsed via the user input.

In step 2503, the web/wap server 2411 may transmit the address uniform resource locator (URL) of the audio file selected in step 2501 to the audio providing device 2420. The web/wap browser 2421 of the audio providing device 2420 may receive the address URL of the audio file from the web/wap server 2411.

In step 2505, the web/wap browser 2421 of the audio providing device 2420 may deliver the address URL of the audio file received from the server 2410 to the download client 2422. The download client 2422 may deliver the address URL of the audio file to the download server 2412 of the server 2410, and may request a download service.

In step 2507, the download server 2412 of the server 2410 may receive a request for a download service from the audio providing device 2420, and may generate download audio data (or non-volatile audio data) related to the corresponding audio file. The download server 2412 of the server 2410 may transmit the download audio data to the audio providing device 2420.

In steps 2509, the download client 2422 of the audio providing device 2420 may receive the download audio data from the server 2410. The download client 2422 of the audio providing device 2420 may transmit the download audio data received from the server 2410 to the audio reproducing device 2430 using the wireless communication protocol 2424. The audio reproducing device 2430 may receive the download audio data from the audio providing device 2420 using the wireless communication protocol 2431.

In step 2511, the audio reproducing device 2430 may store the download audio data received from the audio providing device 2420 in the memory.

The order of the steps of FIG. 25 may be changed, or some of the operations may be simultaneously executed.

FIG. 26 is a signaling diagram of streaming flow of audio data, according to an embodiment of the present disclosure.

Referring to FIG. 26, in step 2601, the audio providing device 2420 may connect to the web/wap server 2411 of the server 2410 using the web/wap browser 2421 via a user input. The web/wap browser 2421 of the audio providing device 2420 may browse audio contents after connecting to the web/wap server 2411 via the user input. In addition, the web/wap browser 2421 of the audio providing device 2420 may select an audio file for a streaming service among the audio contents browsed via the user input.

In step 2603, the web/wap server 2411 may transmit the address URL of the audio file selected in step 2601 to the audio providing device 2420. The web/wap browser 2421 of the audio providing device 2420 may receive the address URL of the audio file from the web/wap server 2411.

In step 2605, the web/wap browser 2421 of the audio providing device 2420 may deliver the address URL of the audio file received from the server 2410 to the steaming client 2423. The streaming client 2423 may deliver the address URL of the audio file to the streaming server 2413 of the server 2410, and may request a streaming service.

In step 2607, the streaming server 2413 of the server 2410 may receive the request for a streaming service from the audio providing device 2420, and may generate streaming audio data (or volatile audio data) related to a corresponding audio file. The streaming server 2413 of the server 2410 may transmit the streaming audio data to the audio providing device 2420.

In step 2609, the streaming client 2423 of the audio providing device 2420 may receive the streaming audio data from the server 2410. The streaming client 2423 of the audio providing device 2420 may transmit the streaming audio data received from the server 2410 to the audio reproducing device 2430 using the wireless communication protocol 2424. The audio reproducing device 2430 may receive the streaming audio data from the audio providing device 2420 by using the wireless communication protocol 2431. The streaming reproducing device 2430 may store the received streaming audio data in a volatile memory.

In step 2611, the audio reproducing device 2430 may reproduce the streaming audio data received from the audio providing device 2420.

The order of the steps of FIG. 26 may be changed, or some of the operations may be simultaneously executed.

Figure 27:
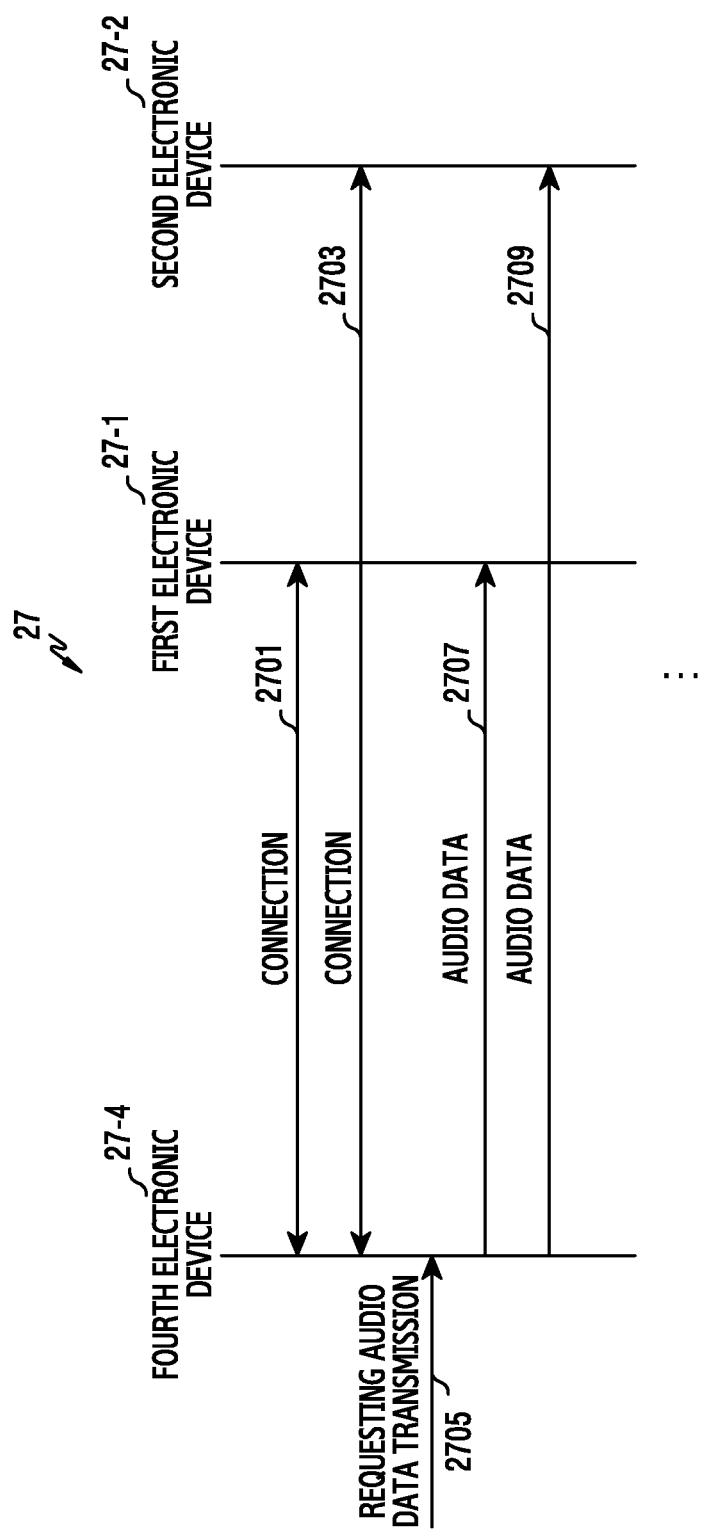
FIG. 27 is a signaling diagram of communication flow of a system, according to an embodiment of the present disclosure.

FIG. 27 is a signaling diagram of communication flow of a system, according to an embodiment of the present disclosure.

Referring to FIG. 27, the system 27 may include a first electronic device 27-1, a second electronic device 27-2, and a fourth electronic device 27-4. The first electronic device 27-1 may include all or some of the components of the first electronic device 5 of FIG. 6. The second electronic device 27-2 may include all or some of the components of the second electronic device 6 of FIG. 6. The fourth electronic device 27-4 may include all or some of the components of the audio providing device 2420 (e.g., a server, a smart phone, a PC, a PDA, or an access point) of FIG. 24.

In step 2701, the fourth electronic device 27-4 and the first electronic device 27-1 may be connected to each other.

In step 2703, the fourth electronic device 27-4 and the second electronic device 27-2 may be connected to each other.

In step 2705, the fourth electronic device 27-4 may receive a transmission request for audio data. The transmission request may be induced by a user input. The audio data may be non-volatile audio data or volatile audio data. Alternatively, the audio data may be mono audio data or stereo audio data.

In steps 2707 and 2709, the fourth electronic device 27-4 may transmit the audio data to the first electronic device 27-1 and the second electronic device 27-2.

The first electronic device 27-1 may receive the audio data transmitted from the fourth electronic device 27-4. The first electronic device 27-1 may store non-volatile audio data received from the fourth electronic device 27-4 in a non-volatile memory. Alternatively, the first electronic device 27-1 may store volatile audio data received from the fourth electronic device 27-4 in a volatile memory.

The second electronic device 27-2 may receive the audio data transmitted from the fourth electronic device 27-4. The second electronic device 27-2 may store non-volatile audio data received from the fourth electronic device 27-4 in a non-volatile memory. Alternatively, the second electronic device 27-2 may store volatile audio data received from the fourth electronic device 27-4 in a volatile memory.

The order of the steps of FIG. 27 may be changed, or some of the operations may be simultaneously executed.

Figure 28:
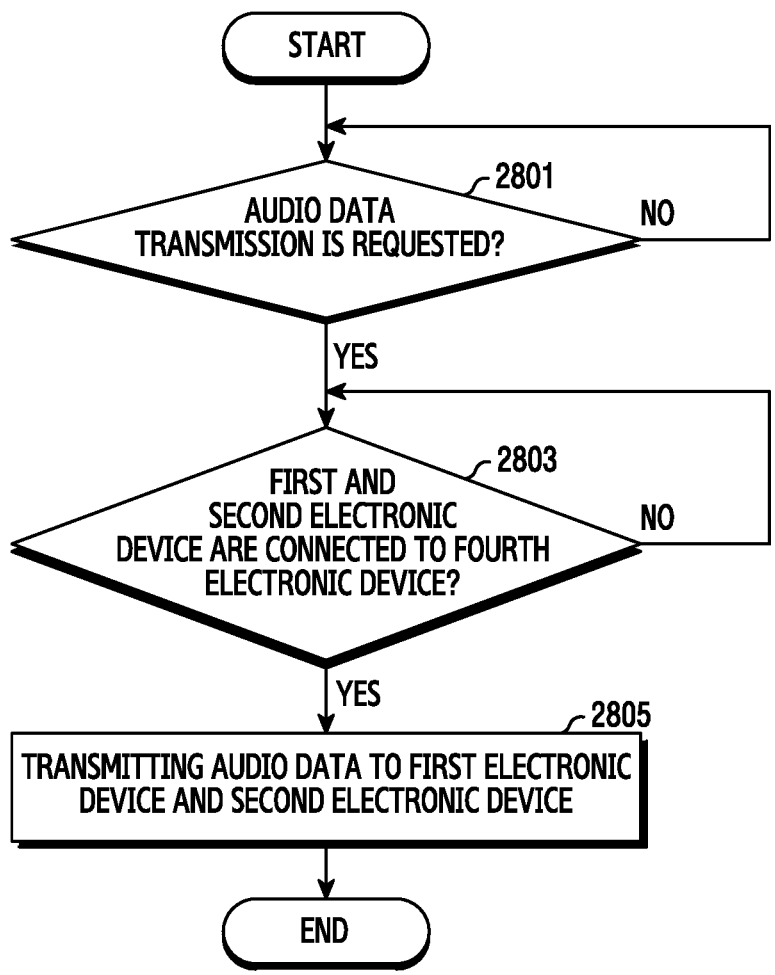
FIG. 28 is a flowchart of a method of operations of a fourth electronic device of FIG. 24, according to an embodiment of the present disclosure.
Figure 29A:
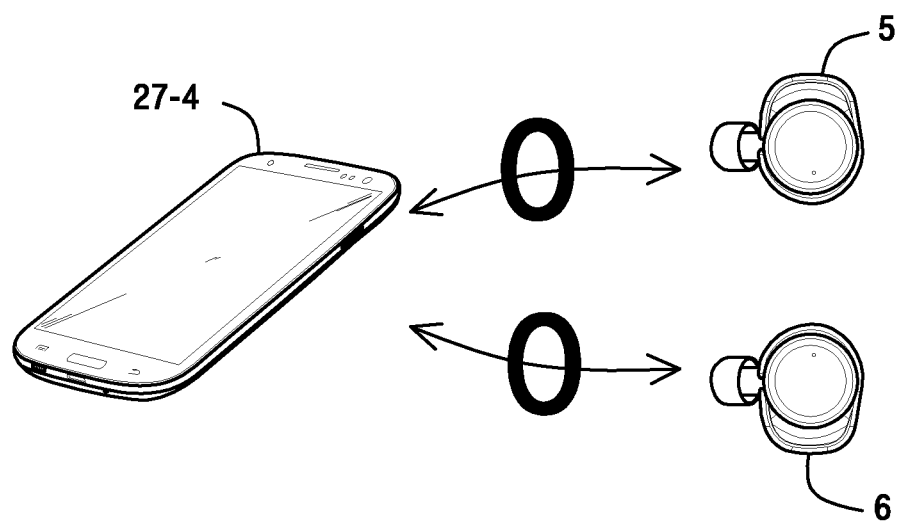
FIGS. 29A to 29C are diagrams of the operation flow of the method of FIG. 28, according to an embodiment of the present disclosure.
Figure 29B:
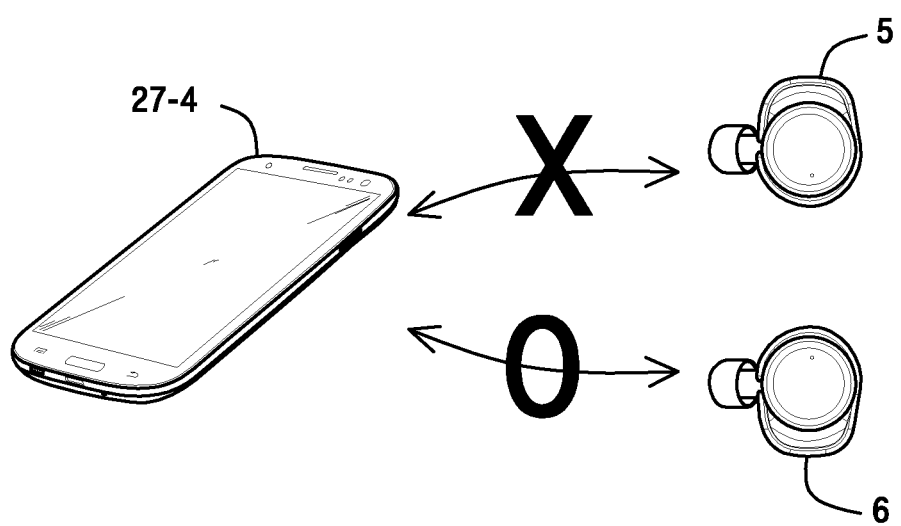
Figure 29C:
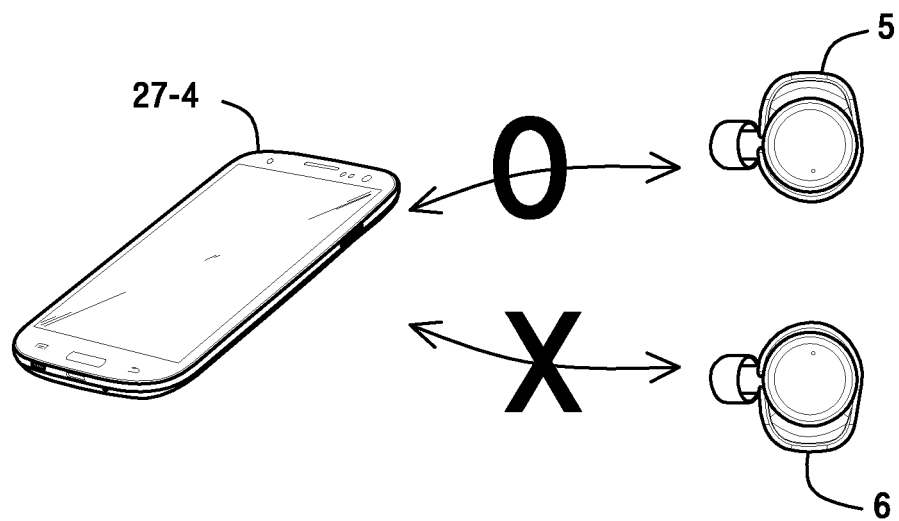

FIG. 28 is a flowchart of a method of operation of the fourth electronic device 27-4 of FIG. 27, according to an embodiment of the present disclosure. FIGS. 29A to 29C are diagrams describing the method of FIG. 28, according to an embodiment of the present disclosure. The fourth electronic device 27-4 may include all or some of the components of the audio providing device 2420 of FIG. 24.

Referring to FIG. 28 and FIGS. 29A to 29C, a transmission request for the audio data stored in the fourth electronic device 27-4 is generated by a user input, and in step 2801, the processor of the fourth electronic device 27-4 may sense the generated transmission request.

In step 2803, the processor of the fourth electronic device 27-4 may confirm whether the first electronic device 5 of FIG. 6 and the second electronic device 6 of FIG. 6 are connected to the fourth electronic device 27-4.

In the case where the first electronic device 5 and the second electronic device 6 are connected to the fourth electronic device 27-4 as shown in FIG. 29A, the processor of the fourth electronic device 27-4 may transmit audio data to the first electronic device 5 and the second electronic device 6. For example, the first electronic device 5 and the second electronic device 6 may receive and store the same audio data from the fourth electronic device 27-4.

Each of the first electronic device 5 and the second electronic device 6 may independently reproduce the same audio data stored in the memory. For example, when the first electronic device 5 and the second electronic device 6 are mounted on opposite ears of the user (dual mode), the first electronic device 5 may output, through its speaker, a portion of the stereo audio data stored in the memory, and the second electronic device 6 may output, through its speaker, a portion of the same stereo audio data stored in the memory. This may provide the user with a chance to experience stereophonic sound.

The first electronic device 5 and the second electronic device 6 may be connected to the fourth electronic device 27-4 by using short range communication (e.g., WiFi, Bluetooth, NFC, or GNSS) or cellular communication.

In the case where only one of the first electronic device 5 and the second electronic device 6 is connected to the fourth electronic device 27-4 as shown in FIG. 29B and/or FIG. 29C, the processor of the fourth electronic device 27-4 may transmit audio data to the first electronic device 5 and the second electronic device 6. For example, in the case where the first electronic device 5 and/or the second electronic device 6 are in the OFF state, the fourth electronic device 27-4 may be connected to the first electronic device 5 and/or the second electronic device 6. In the case where the first electronic device 5 and/or the second electronic device 6 are spaced away from each other by a distance where it is difficult to establish a communication connection therebetween, it may be difficult for the fourth electronic device 27-4 to connect to the first electronic device 5 and/or the second electronic device 6.

The order of the steps of FIG. 29 may be changed, or some of the operations may be simultaneously executed.

A method of operating an electronic device may include receiving a transmission request for audio data stored in a memory of the electronic device; confirming whether a first external device and a second external device are connected to the electronic device; invalidating the transmission request when it is confirmed that at least one of the first external device and the second external device is not connected to the electronic device; and transmitting the audio data to the first external device and the second external device when it is confirmed that the first external device and the second external device are connected to the electronic device.

Figure 30:
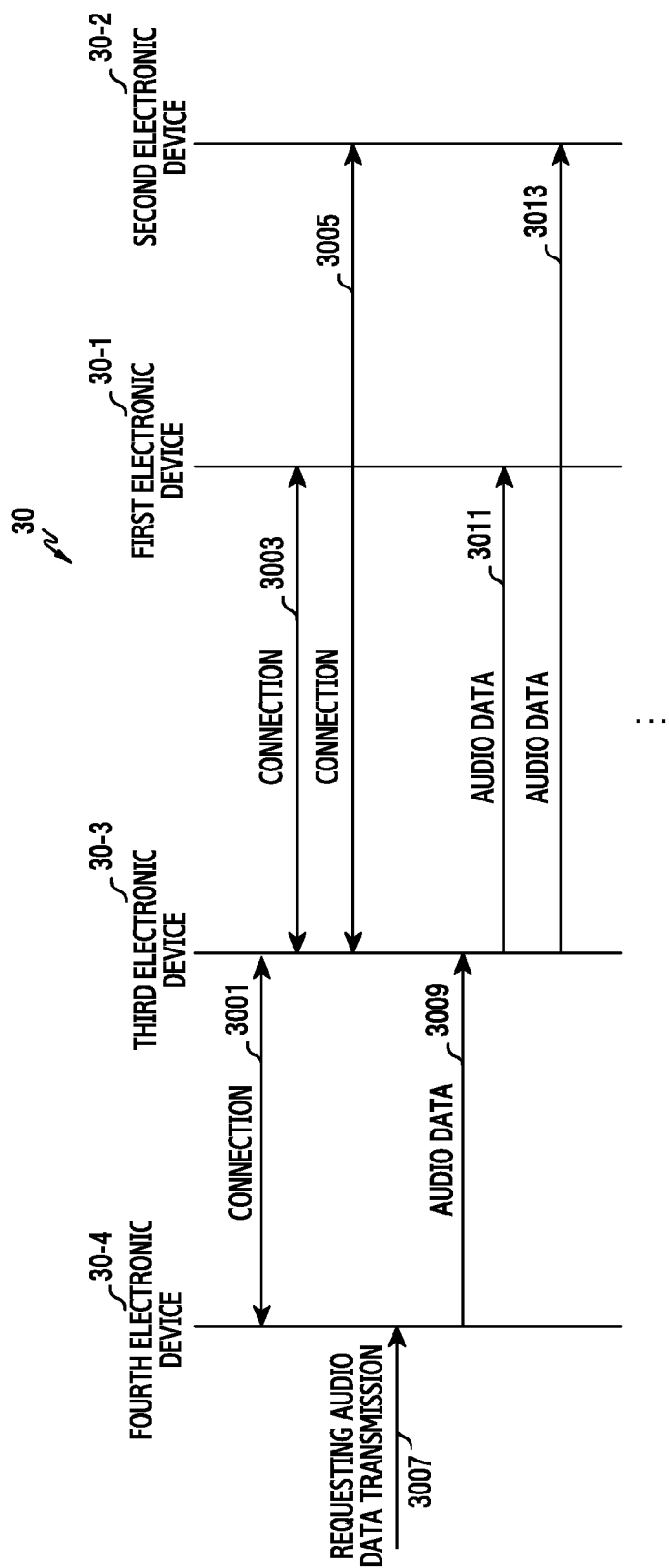
FIG. 30 is a signaling diagram of communication flow of a system, according to an embodiment of the present disclosure.

FIG. 30 is a signaling diagram of communication flow of a system, according to an embodiment of the present disclosure.

Referring to FIG. 30, the system 30 may include a first electronic device 30-1, a second electronic device 30-2, a third electronic device 30-3, and a fourth electronic device 30-4. The first electronic device 30-1 may include all or some of the components of the first electronic device 5 of FIG. 6. The second electronic device 30-2 may include all or some of the components of the second electronic device 6 of FIG. 6. The third electronic device 30-3 may include all or some of the components of the third electronic device 1800 of FIG. 18. The fourth electronic device 30-4 may include all or some of the components of the audio providing device 2420 (e.g., a server, a smart phone, a PC, a PDA, or an access point) of FIG. 24.

In step 3001, the fourth electronic device 30-4 and the third electronic device 30-3 may be connected to each other.

In step 3003, the third electronic device 30-3 and the first electronic device 30-1 may be connected to each other.

In step 3005, the third electronic device 30-3 and the second electronic device 30-2 may be connected to each other.

In step 3007, the fourth electronic device 30-4 may receive a transmission request for audio data. The transmission request may be induced by a user input.

In step 3009, the fourth electronic device 30-4 may transmit audio data to the third electronic device 30-3.

In steps 3011 and 3013, the third electronic device 30-3 may transmit the audio data received from the fourth electronic device 30-4 to the first electronic device 30-1 and the second electronic device 30-2.

The first electronic device 30-1 may receive the audio data transmitted from the third electronic device 30-3. The first electronic device 30-1 may store the audio data received from the third electronic device 30-3 in a memory.

The second electronic device 30-2 may receive the audio data transmitted from the third electronic device 30-3. The second electronic device 30-2 may store the audio data received from the third electronic device 30-3 in a memory.

The order of the steps of FIG. 30 may be changed, or some of the operations may be simultaneously executed.

Figure 31:
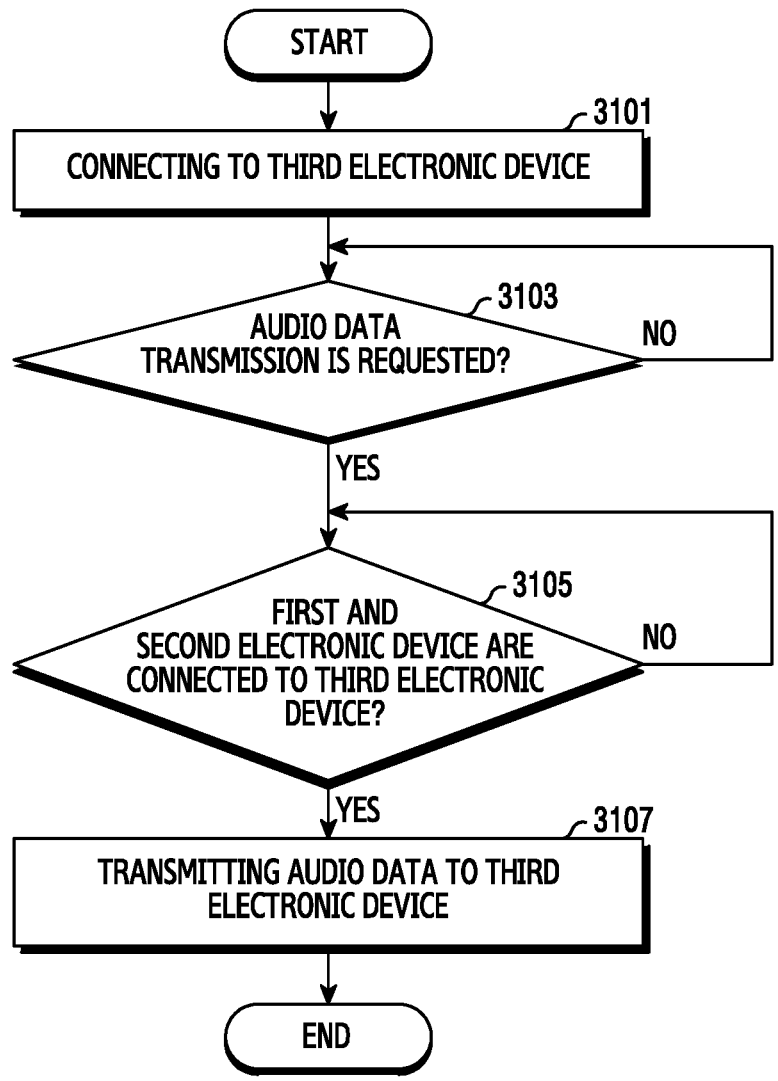
FIG. 31 is a flowchart of a method of operations of a fourth electronic device of FIG. 30, according to an embodiment of the present disclosure.

FIG. 31 is a flowchart of a method of operation of the fourth electronic device 30-4 of FIG. 30, according to an embodiment of the present disclosure. The fourth electronic device 30-4 may include all or some of the components of e the audio providing device 2420 of FIG. 24.

Referring to FIG. 31, in step 3101, the processor of the fourth electronic device 30-4 may be connected to the third electronic device 1800 of FIG. 18.

In the case where a transmission request for the audio data stored in the memory of the fourth electronic device 30-4, the processor may sense this in step 3103.

In response to the transmission request for the audio data, the processor of the fourth electronic device 30-4 may confirm whether the first electronic device 5 of FIG. 6 and the second electronic device 6 of FIG. 6 are electrically connected to the third electronic device 1800.

In the case where the first electronic device 5 is coupled to the mounting part 17111 of FIG. 17 of the third electronic device 1800, and the second electronic device 6 is coupled to the mounting part 17112 of FIG. 17 of the third electronic device 1800, the first electronic device 5 and the second electronic device 6 may be electrically connected to the third electronic device 1800.

When the steps of FIGS. 21A to 23A are applied, the third electronic device 1800 may transmit, to the fourth electronic device 30-4, a signal indicating the state in which the first electronic device 5 and the second electronic device 6 are electrically connected to the third electronic device 1800.

In the case where it is confirmed that the first electronic device 5 and the second electronic device 6 are electrically connected to the third electronic device 1800 in step 3105, the processor of the fourth electronic device 30-4 may transmit audio data to the third electronic device 1800 in step 3107.

Although not illustrated, the third electronic device 1800 may transmit the audio data received from the fourth electronic device 30-4 to the first electronic device 5 and the second electronic device 6. For example, the first electronic device 5 and the second electronic device 6 may receive and store the same audio data transmitted from the fourth electronic device 30-4.

The order of the steps of FIG. 31 may be changed, or some of the operations may be simultaneously executed.

Figure 32A:
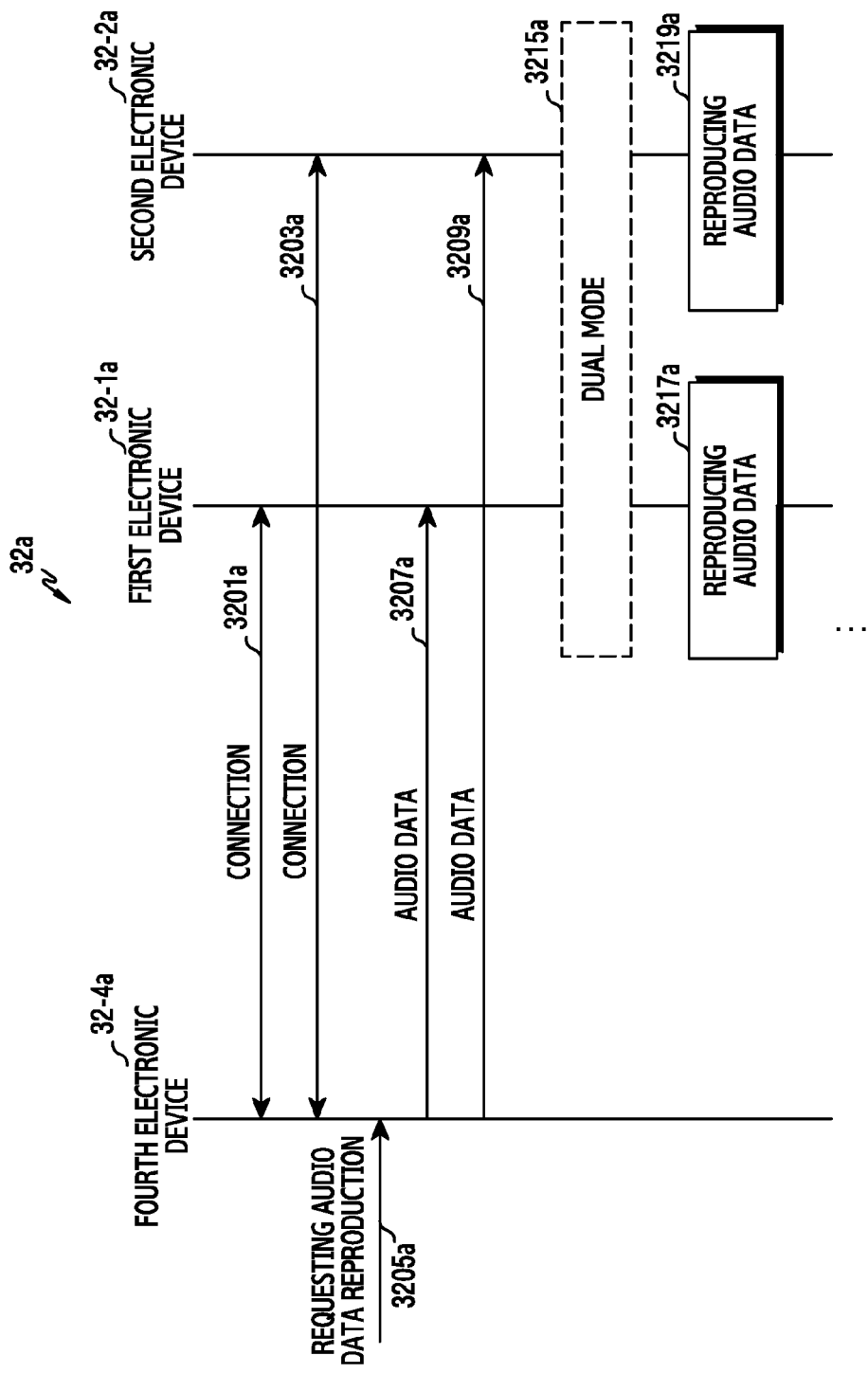
FIGS. 32A to 32C are diagrams of communication flow of systems, according to an embodiment of the present disclosure.

FIG. 32A is a signaling diagram of communication flow of a system, according to an embodiment of the present disclosure.

Referring to FIG. 32A, the system 32a may include a first electronic device 32-1a, a second electronic device 32-2a, and a fourth electronic device 32-4a. The first electronic device 32-1a may include all or some of the components of the first electronic device 5 of FIG. 6. The second electronic device 32-2a may include all or some of the components of the second electronic device 6 of FIG. 6. The fourth electronic device 32-4a may include all or some of the components of an audio providing device 2420 (e.g., a server, a smart phone, a PC, a PDA, or an access point) of FIG. 24.

In step 3201a, the fourth electronic device 32-4a and the first electronic device 32-1a may be connected to each other.

In step 3203a, the fourth electronic device 32-4a and the second electronic device 32-2a may be connected to each other.

In step 3205a, the fourth electronic device 32-4a may receive a user input related to a reproduction request for audio data.

In step 3207a, the fourth electronic device 32-4a may transmit the audio data to the first electronic device 32-1a.

In step 3209a, the fourth electronic device 32-4a may reproduce the audio data to the second electronic device 32-2a.

When audio data, for which a reproduction request is made, is stored in the fourth electronic device 32-4a, the fourth electronic device 32-4a may transmit the audio data to the first electronic device 32-1a and/or the second electronic device 32-2a.

The fourth electronic device 32-4a may receive the audio data, for which a reproduction request is made, from the server 2410 of FIG. 24, and may transmit the audio data to the first electronic device 32-1a and/or the second electronic device 32-2a.

The first electronic device 32-1a may receive the audio data transmitted from the fourth electronic device 32-4a. The first electronic device 32-1a may store the audio data received from the fourth electronic device 32-4a in a memory.

The second electronic device 32-2a may receive the audio data transmitted from the fourth electronic device 32-4a. The second electronic device 32-2a may store the audio data received from the fourth electronic device 32-4a in the memory.

In step 3215a, when it is confirmed that the first electronic device 32-1a and the second electronic device 32-2a are in the state of being positioned relatively close to the user, the first electronic device 32-1a and the second electronic device 32-2a may set a dual mode. For example, in the case where the first electronic device 32-1a and the second electronic device 32-2a are worn on opposite ears of the user, the first electronic device 32-1a and the second electronic device 32-2a may enter into a dual mode.

In step 3217a, the first electronic device 32-1a may reproduce the audio data stored in the memory. For example, in the case where the audio data stored in the memory is mono audio data, the first electronic device 32-1a may decode the mono audio data to acquire an audio signal, and may output the audio signal through its speaker (mono reproduction). Alternatively, in the case where the audio data stored in the memory is stereo audio data, the first electronic device 32-1a may decode the first audio data of the stereo audio data to acquire a first audio signal, and may output the first audio signal through its speaker (stereo reproduction).

In step 3219a, the second electronic device 32-2a may reproduce the audio data stored in the memory. For example, in the case where the audio data stored in the memory is mono audio data, the second electronic device 32-2a may decode the mono audio data to acquire an audio signal, and may output the audio signal through its speaker (mono reproduction). Alternatively, in the case where the audio data stored in the memory is stereo audio data, the second electronic device 32-2a may decode the second audio data of the stereo audio data to acquire a second audio signal, and may output the second audio signal through its speaker (stereo reproduction).

In the case where the first electronic device 32-1a and the second electronic device 32-2a are mounted on opposite ears of the user (dual mode), the first electronic device 32-1a may output the first audio signal through its speaker, and the second electronic device 32-2a may output the second audio signal through its speaker. This may provide the user with a chance to experience stereophonic sound.

The order of the steps of FIG. 32A may be changed, or some of the operations may be simultaneously executed.

Figure 32B:
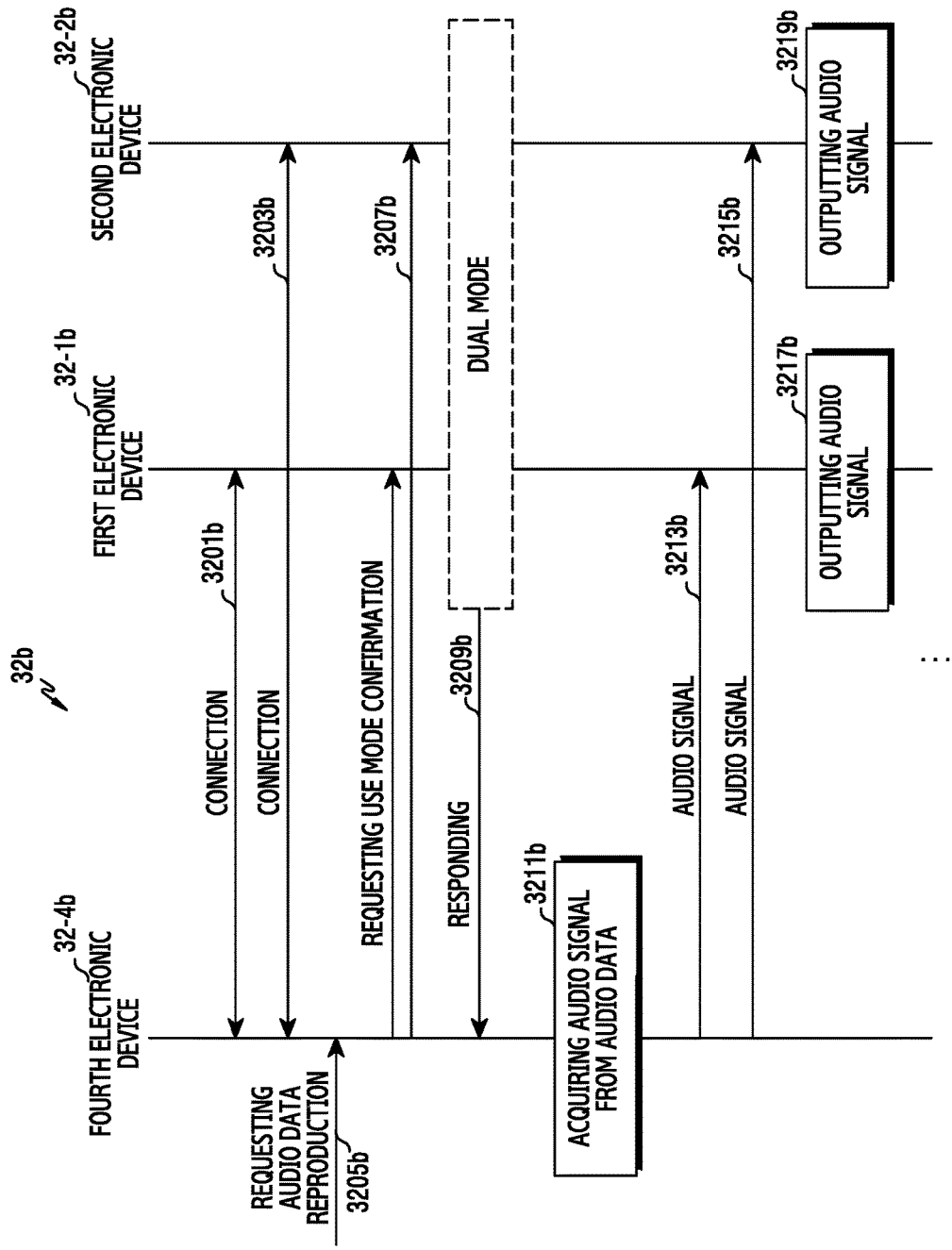

FIG. 32B is a signaling diagram of communication flow of a system, according to an embodiment of the present disclosure.

Referring to FIG. 32B, the system 32b may include a first electronic device 32-1b, a second electronic device 32-2b, and a fourth electronic device 32-4b. The first electronic device 32-1b may include all or some of the components of the first electronic device 5 of FIG. 6, or may include all or some of the components of the second electronic device 6 of FIG. 6. The fourth electronic device 32-4b may include all or some of the components of an audio providing device 2420 (e.g., a server, a smart phone, a PC, a PDA, or an access point) of FIG. 24.

In step 3201b, the fourth electronic device 32-4b and the first electronic device 32-1b may be connected to each other.

In step 3203b, the fourth electronic device 32-4b and the second electronic device 32-2b may be connected to each other.

In step 3205b, the fourth electronic device 32-4b may receive a user input related to a reproduction request for audio data.

In step 3207b, the fourth electronic device 32-4b may transmit a request for confirming a use mode to the first electronic device 32-1b and/or the second electronic device 32-2b.

The first electronic device 32-1b and/or the second electronic device 32-2b may set be in a dual mode. For example, when it is confirmed that the first electronic device 32-1b and the second electronic device 32-2b are positioned relatively close to the user, the first electronic device 32-1b and the second electronic device 32-2b may set a dual mode.

In step 3209b, the first electronic device 32-1b and/or the second electronic device 32-2b may transmit, to the fourth electronic device 32-4b, a response indicating that the use mode is the dual mode.

In step 3211b, in correspondence with the response indicating that the use mode is the dual mode, the fourth electronic device 32-4b may decode the audio data, for which the reproduction request is made, to acquire an audio signal. For example, the audio data may be mono audio data, and the fourth electronic device 32-4b may decode the mono audio data to acquire an audio signal. Alternatively, the audio data may be stereo audio data, and the fourth electronic device 32-4b may decode first audio data of the stereo audio data to acquire a first audio signal, and may decode second audio data of the stereo audio data to obtain a second audio signal.

In step 3213b, the fourth electronic device 32-4b may transmit the audio data to the first electronic device 32-1b. In step 3215b, the fourth electronic device 32-4b may transmit the audio data to the second electronic device 32-2b. For example, the fourth electronic device 32-4b may transmit, to both the first electronic device 32-1b and the second electronic device 32-2b, the audio signals acquired by decoding the mono audio data. Alternatively, the fourth electronic device 32-4b may transmit, to the first electronic device 32-1b, the first audio signal acquired from the stereo audio data, and may transmit, to the second electronic device 32-2b, the second audio signal acquired by decoding the stereo audio data.

In step 3217b, the first electronic device 32-1b may output, through its speaker, the audio signal received from the from electronic device 32-4b. In step 3219b, the second electronic device 32-2b may output, through its speaker, the audio signal received from the fourth electronic device 32-4b. For example, the first electronic device 32-1b may output the first audio signal acquired from the stereo audio data, and the second electronic device 32-2b may output the second audio signal acquired by decoding the stereo audio data. This may provide the user with a chance to experience stereophonic sound.

The order of the steps of FIG. 32B may be changed, or some of the operations may be simultaneously executed.

Figure 32C:
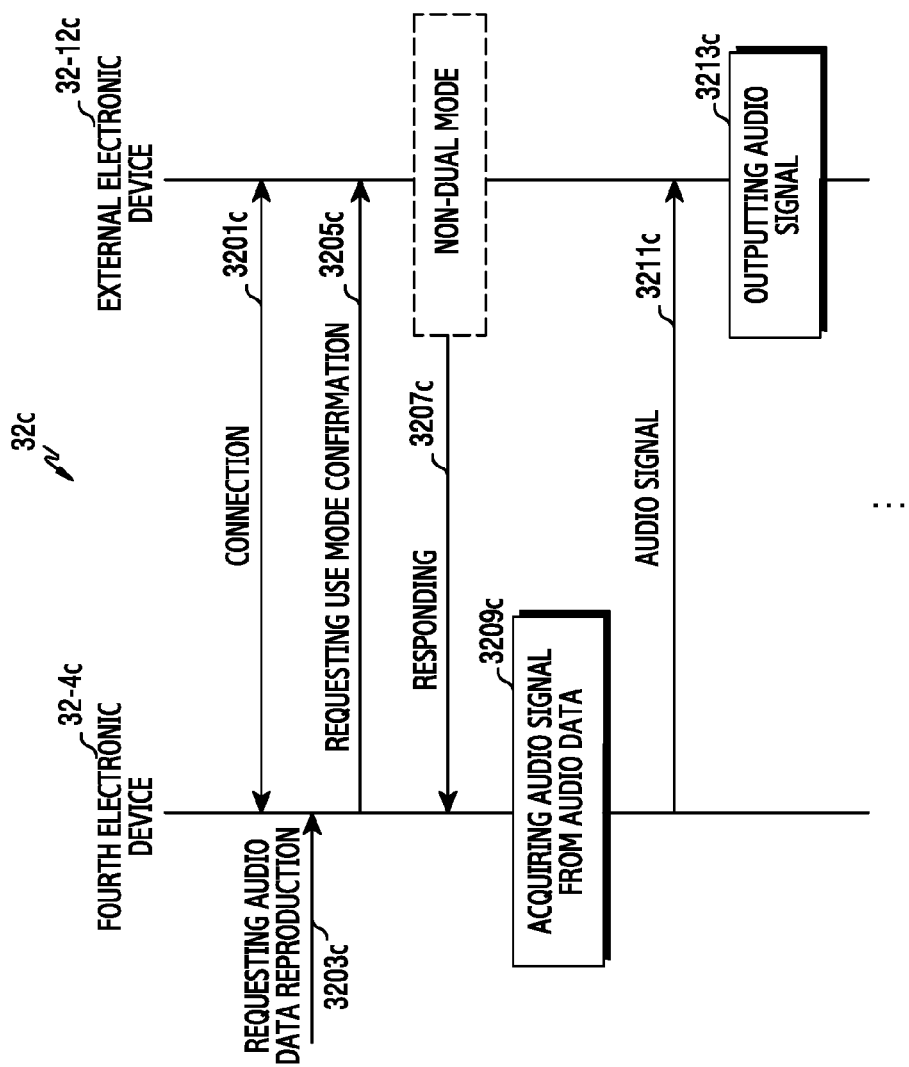

FIG. 32C is a signaling diagram of communication flow of a system, according to an embodiment of the present disclosure.

Referring to FIG. 32C, the system 32c may include a fourth electronic device 32-4c and an external electronic device 32-12c. The fourth electronic device 32-4c may include all or some of the components of an audio providing device 2420 (e.g., a smart phone, a PC, a PDA, or an access point) of FIG. 24. Alternatively, the external electronic device 32-12c may include all or some of the components of the first electronic device 5 or the second electronic device 6 of FIG. 6.

In step 3201c, the fourth electronic device 32-4c and the external electronic device 32-12c may be connected to each other.

In step 3203c, the fourth electronic device 32-4c may receive a user input related to a reproduction request for audio data.

In step 3205c, the fourth electronic device 32-4c may transmit a request for confirming a use mode to the external electronic device 32-12c.

The external electronic device 32-12c may be in the non-dual mode. For example, the external electronic device 32-12c may be separated from the user's body.

In step 3207c, the external electronic device 32-12c may transmit, to the fourth electronic device 32-4c, a response indicating that the use mode is the non-dual mode.

In step 3209c, in correspondence with the response indicating that the use mode is the non-dual mode, the fourth electronic device 32-4c may decode the audio data, for which the reproduction request is made, to acquire an audio signal. For example, the audio data may be mono audio data, and the fourth electronic device 32-4c may decode the mono audio data to acquire an audio signal. Alternatively, the audio data may be stereo audio data, and the fourth electronic device 32-4c may decode the entire stereo audio data to acquire an audio signal.

In step 3211c, the fourth electronic device 32-4c may transmit the audio signal to the external electronic device 32-12c.

In step 3213c, the external electronic device 32-12c may output, through its speaker, the audio signal received from the fourth electronic device 32-4c.

The order of the steps of FIG. 32B may be changed, or some of the operations may be simultaneously executed.

As described above, the systems 9a-f, 10a, and 10b (hereinafter, referred to as "first systems") of FIGS. 9A-9F and FIGS. 10A and 10B, respectively, may output audio contents independently from an external device (e.g., a server, a smart phone, a PC, a PDA, or an AP). As described above, the systems 14a and 14b of FIGS. 14A and 14B and the systems 32a, 32b, and 32c of FIGS. 32A to 32C (hereinafter, referred to as "second systems") may interact with an external device to output audio contents provided (streamed) from the external device.

At least one of the first systems may be provided instead of the second systems in the case where a connectable external device does not exist, and audio contents exist in the first systems.

At least one of the second systems may be provided instead of the first systems in the case where a connectable external device exists, and the external device is capable of providing audio contents.

Moreover, the first systems and the second systems may be combined to form a combined system.

Figure 33:
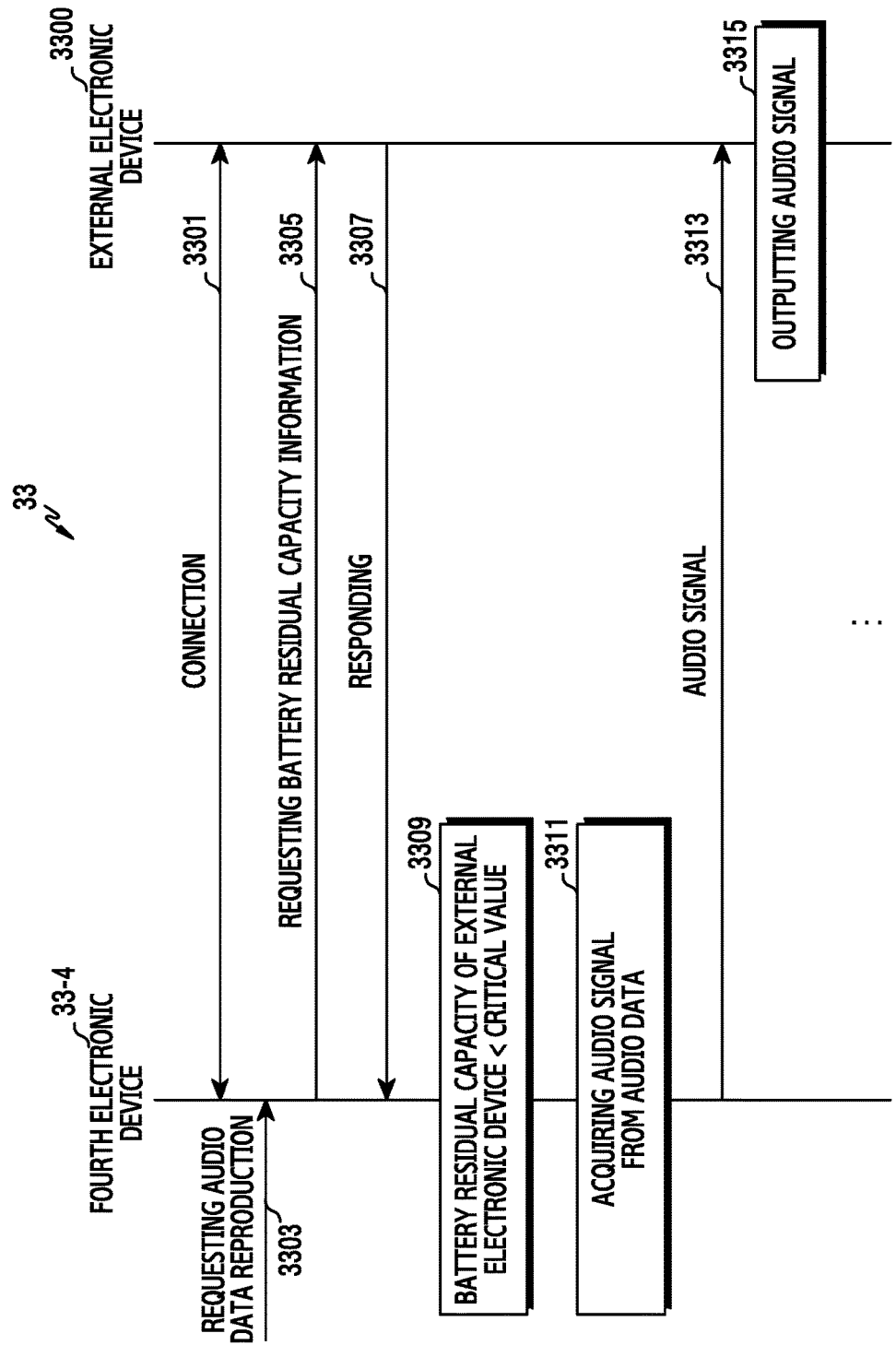
FIG. 33 is a diagram of communication flow of a system, according to an embodiment of the present disclosure.

FIG. 33 is a signaling diagram of communication flow of a system, according to an embodiment of the present disclosure. A system 33 may include a fourth electronic device 33-4 and an external electronic device 3300. The fourth electronic device 33-4 may include all or some of the components of the audio providing device 2420 of FIG. 24. The external electronic device 3300 may include all or some of the components of the electronic device 700 of FIG. 7.

In step 3301, the fourth electronic device 33-4 and the third electronic device 3300 may be connected to each other.

In step 3303, the fourth electronic device 33-4 may receive a reproduction request for the audio data stored in the memory.

In response to the reproduction request for the audio data, in step 3305, the fourth electronic device 33-4 may send a request for battery residual capacity information to the external electronic device 3300.

In step 3307, the external electronic device 3300 may respond to the forth electronic device 33-4 with the battery residual capacity information.

In step 3309, based on the battery residual capacity information received from the external electronic device 3300, the fourth electronic device 33-4 may confirm that the battery residual capacity of the external electronic device 3300 is less than a critical value.

In the case where it is confirmed that the battery residual capacity of the external electronic device 3300 is less than the critical value, in step 3311, the fourth electronic device 33-4 may decode the audio data to acquire an audio signal.

In step 3313, the fourth electronic device 33-4 may transmit the audio signal to the external electronic device 3300.

In step 3315, the external electronic device 3300 may output, through its speaker, the audio signal received from the fourth electronic device 33-4. For example, if the battery residual capacity of the external electronic device 3300 is less than the critical value, the external electronic device 3300 may output, through its speaker, the audio signal received from the fourth electronic device 33-4 without decoding the same audio data stored in the memory.

The order of the step of FIG. 33 may be changed, or some of the operations may be simultaneously executed.

Figure 34:
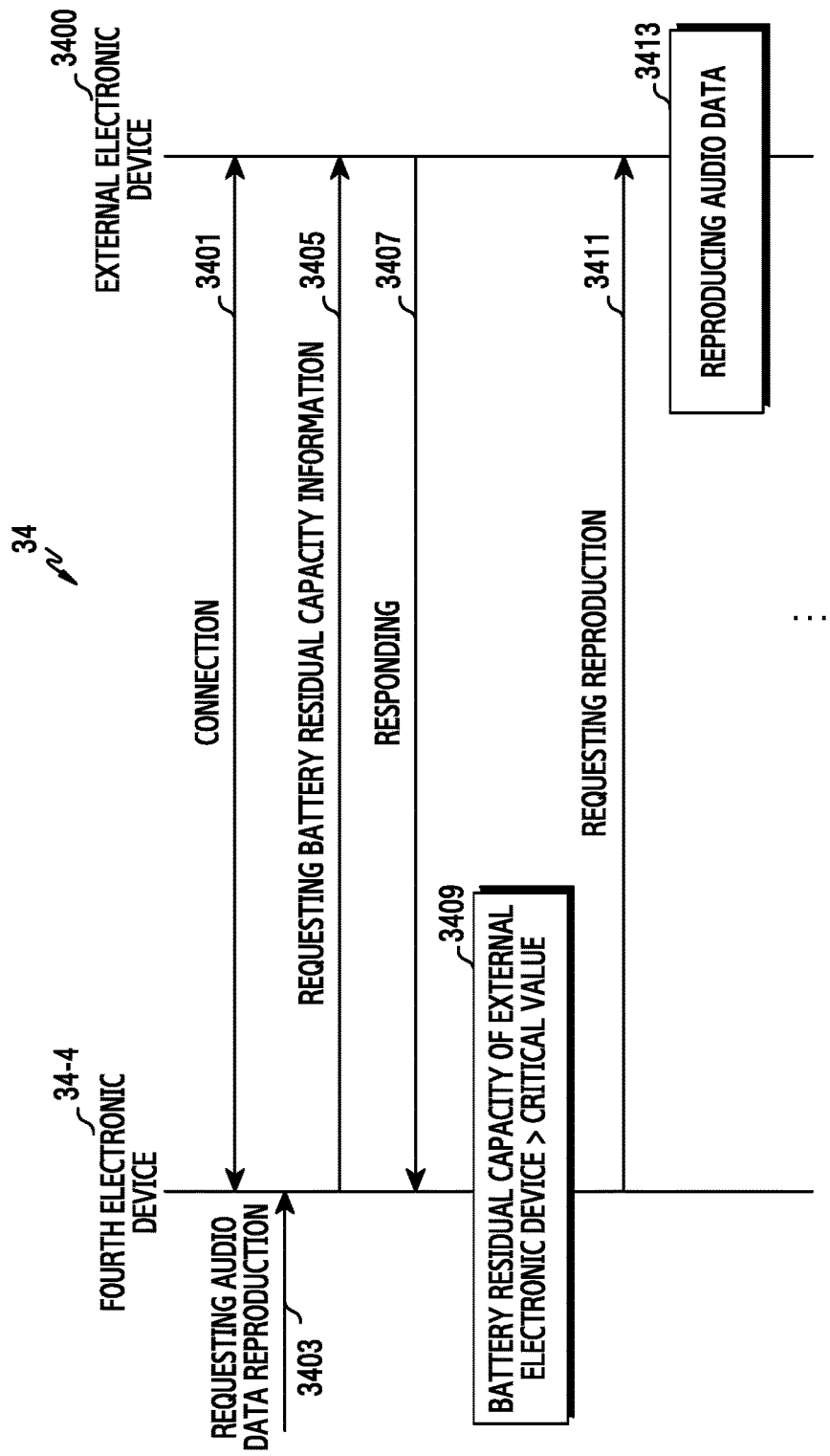
FIG. 34 is a diagram of communication flow of a system, according to an embodiment of the present disclosure.

FIG. 34 is a signaling diagram of communication flow of a system, according to an embodiment of the present disclosure. A system 34 may include a fourth electronic device 34-4 and an external electronic device 3400. The fourth electronic device 34-4 may include all or some of the components of the audio providing device 2420 of FIG. 24. The external electronic device 3400 may include all or some of the components of the electronic device 700 of FIG. 7.

In step 3401, the fourth electronic device 34-4 and the external electronic device 3400 may be connected to each other.

In step 3403, the fourth electronic device 34-4 may receive a reproduction request for the audio data stored in the memory.

In response to the reproduction request for the audio data, in step 3405, the fourth electronic device 34-4 may send a request for battery residual capacity information to the external electronic device 3400.

In step 3407, the external electronic device 3400 may respond to the forth electronic device 34-4 with the battery residual capacity information.

In step 3409, based on the battery residual capacity information received from the external electronic device 3400, the fourth electronic device 34-4 may confirm that the battery residual capacity of the external electronic device 3400 is more than a critical value.

In the case where it is confirmed that the battery residual capacity of the external electronic device 3400 is more than the critical value, in step 3411, the fourth electronic device 34-4 may transmit a reproduction request for the same audio data to the external electronic device 3400.

In step 3413, the external electronic device 3400 may reproduce the same audio data stored in the memory. For example, the external electronic device 3400 may decode the same audio data to acquire an audio signal, and may output the audio signal through its speaker.

The order of the steps of FIG. 34 may be changed, or some of the operations may be simultaneously executed.

Figure 35:
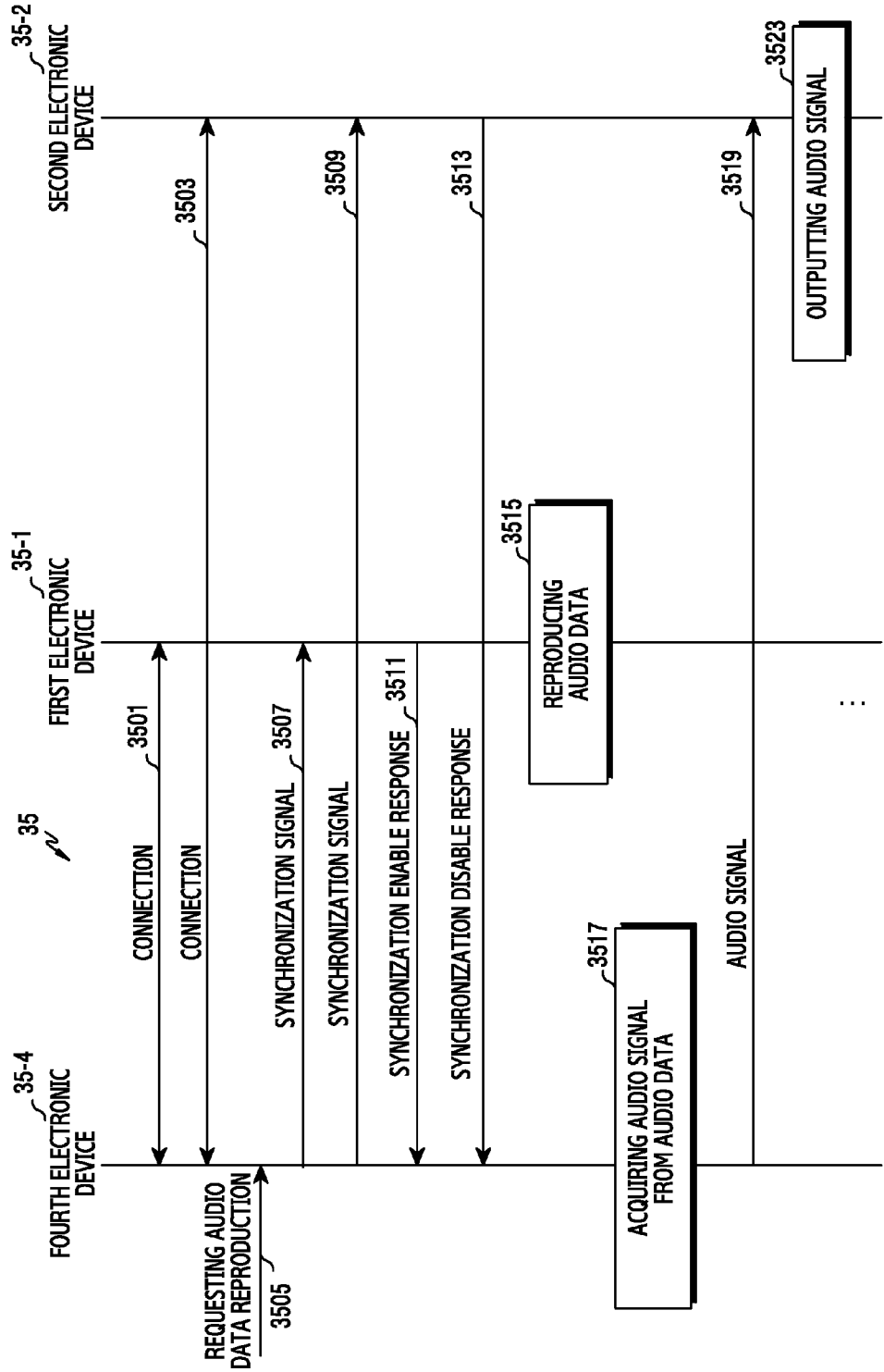
FIG. 35 is a diagram of communication flow of a system, according to an embodiment of the present disclosure.

FIG. 35 is a signaling diagram of communication flow of a system, according to an embodiment of the present disclosure. A system 35 may include a first electronic device 35-1, a second electronic device 35-2, and a fourth electronic device 35-4. The first electronic device 35-1 may include all or some of the components of the first electronic device 5 of FIG. 6. The second electronic device 35-2 may include all or some of the components of the second electronic device 6 of FIG. 6. The fourth electronic device 35-4 may include all or some of the components of e the audio providing device 2420 of FIG. 24.

In step 3501, the fourth electronic device 35-4 and the first electronic device 35-1 may be connected to each other.

In step 3503, the fourth electronic device 35-4 and the second electronic device 35-2 may be connected to each other.

In step 3505, the fourth electronic device 35-4 may receive a reproduction request for the audio data stored in the memory.

In response to the reproduction request for the audio data, in step 3507, the fourth electronic device 35-4 may transmit, to the first electronic device 35-1, a synchronization signal related to the audio data, for which a reproduction request is made. In step 3009, the fourth electronic device 35-4 may transmit the synchronization signal to the second electronic device 35-2.

In the case where audio data corresponding to the synchronization signal is stored in the first electronic device 35-1, in step 3511, the first electronic device 35-1 may transmit a synchronization enable response related to the synchronization signal to the fourth electronic device 35-4, or in step 3513 the first electronic device 35-1 may transmit a synchronization disable response related to the synchronization signal to the fourth electronic device 35-4.

In response to the synchronization signal, in step 3515, the first electronic device 35-1 may reproduce the same audio data stored in the memory. For example, in the case where the audio data is mono audio data, the first electronic device 35-1 may decode the mono audio data to acquire an audio signal, and may output the audio signal through its speaker (mono reproduction). Alternatively, in the case where the audio data is stereo audio data, the first electronic device 35-1 may decode a portion of the stereo audio data (e.g., the first audio data corresponding to the first electronic device 35-1) to acquire a first audio signal, and may output the first audio signal through its speaker (stereo reproduction).

In response to the synchronization disable signal from the second electronic device 35-2, in step 3517, the fourth electronic device 35-4 may decode the audio data, for which the reproduction request is made, to acquire an audio signal. For example, in the case where the audio data is stereo audio data, the fourth electronic device 35-4 may decode a portion of the stereo audio data (e.g., the second audio data corresponding to the second electronic device 35-2) to acquire a second audio signal.

In step 3519, the fourth electronic device 35-4 may transmit the acquired audio signal to the second electronic device 35-2.

In step 3523, the second electronic device 34-2 may output, through its speaker, the audio signal received from the fourth electronic device 35-4. For example, the second electronic device 34-2 may output, through its speaker, the audio signal received from the fourth electronic device 34-4 without decoding the audio data.

For example, the first electronic device 34-1 may output, through its speaker, the first audio signal acquired by decoding the first audio data of the stereo audio data, and the second electronic device 34-2 may receive, from the fourth electronic device 35-4, the second audio signal acquired by decoding the second audio data of the stereo audio data, and may output, through its speaker, the second audio signal. This may provide the user with a chance to experience stereophonic sound.

The order of the steps of FIG. 35 may be changed, or some of the operations may be simultaneously executed.

Figure 36:
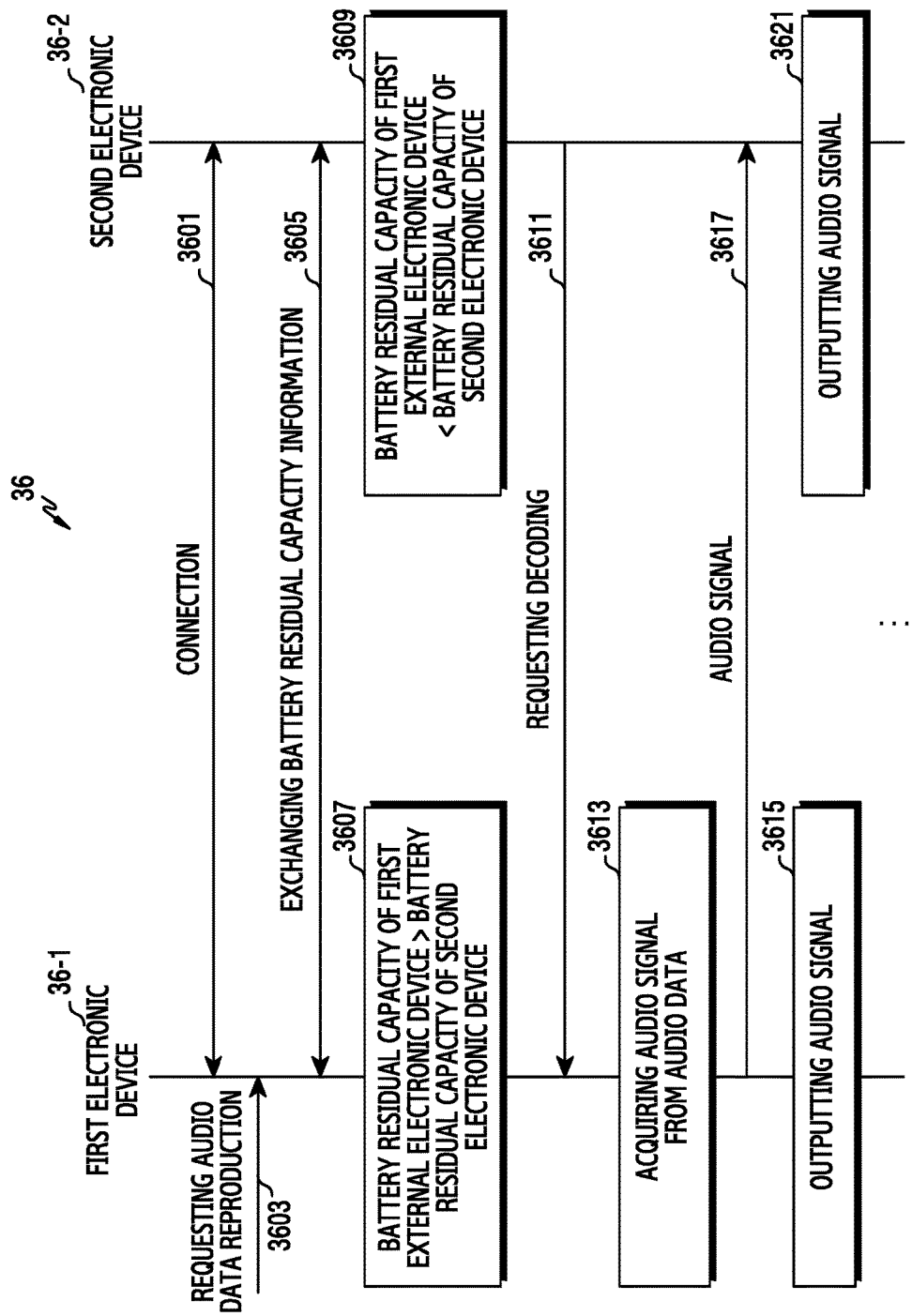
FIG. 36 is a diagram of communication flow of a system, according to an embodiment of the present disclosure.

FIG. 36 is a signaling diagram of communication flow of a system, according to an embodiment of the present disclosure. A system 36 may include a first electronic device 36-1 and a second electronic device 36-2. The first electronic device 36-1 may include all or some of the components of the first electronic device 5 of FIG. 6. The second electronic device 36-2 may include all or some of the components of e the second electronic device 6 of FIG. 6.

In step 3601, the first electronic device 36-1 and the second electronic device 36-2 may be connected to each other.

In step 3603, the first electronic device 36-1 may receive a reproduction request for the audio data stored in the memory.

In step 3605, the first electronic device 36-1 and the second electronic device 36-2 may exchange battery residual capacity information.

Based on the exchange of battery residual capacity information, in step 3607, the first electronic device 36-1 may confirm that the battery residual capacity of the first electronic device 36-1 is more than the battery residual capacity of the second electronic device 36-2.

In step 3609, the second electronic device 36-2 may confirm that the battery residual capacity of the second electronic device 36-2 is less than the battery residual capacity of the first electronic device 36-1.

In the case where the battery residual capacity of the second electronic device 36-2 is less than the battery residual capacity of the first electronic device 36-1, in step 3611, the second electronic device 36-2 may request decoding from the first electronic device 36-1.

In response to the reproduction request in 3603, in step 3613, the first electronic device 36-1 may decode the audio data stored in the memory to acquire an audio signal. For example, the first electronic device 36-1 may decode mono audio data to acquire an audio signal. Alternatively, the first electronic device 36-1 may decode first audio data of stereo audio data to acquire a first audio signal, and may decode second audio data of the stereo audio data to obtain a second audio signal.

In step 3617, the first electronic device 36-1 may transmit at least a portion of the audio signals to the second electronic device 36-2. For example, the first electronic device 36-1 may transmit, to the second electronic device 36-2, the audio signal acquired by decoding the mono audio data. Alternatively, the first electronic device 36-1 may transmit, to the second electronic device 36-2, the second audio signal of the first audio signal and the second audio signal acquired by decoding the stereo audio data.

In step 3615, the first electronic device 36-1 may output, through its speaker, at least a portion of the audio signals.

In step 3621, the second electronic device 36-2 may output, through its speaker, the audio signal received from the first electronic device 36-1. For example, when it is confirmed that the battery residual capacity of the second electronic device 36-2 is less than the battery residual capacity of the first electronic device 36-1, the second electronic device 36-2 may output, through its speaker, the audio signal received from the first electronic device 36-1 without decoding the same audio data even if the second electronic device 36-2 stores the same audio data.

For example, the first electronic device 36-1 may output, through its speaker, for example, the first audio signal acquired from the stereo audio data, and the second electronic device 36-2 may output, through its speaker, the second audio signal acquired from the stereo audio data. This may provide the user with a chance to experience stereophonic sound.

The order of the steps of FIG. 36 may be changed, or some of the operations may be simultaneously executed.

Figure 37:
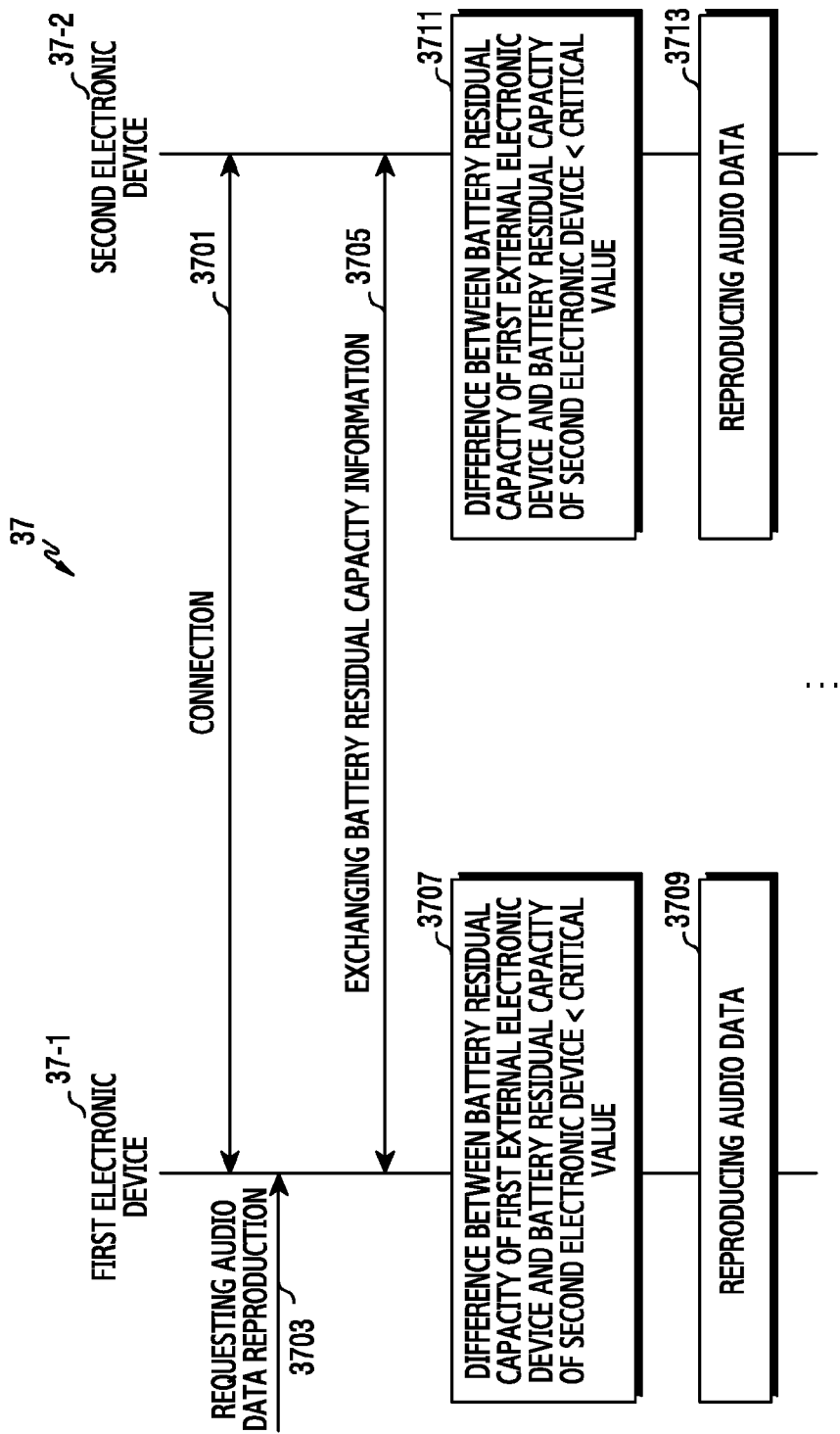
FIG. 37 is a diagram of communication flow of a system, according to an embodiment of the present disclosure.

FIG. 37 is a signaling diagram of communication flow of a system, according to an embodiment of the present disclosure. A system 37 may include a first electronic device 37-1 and a second electronic device 37-2. The first electronic device 37-1 may include all or some of the components of the first electronic device 5 of FIG. 6. The second electronic device 37-2 may include all or some of the components of the second electronic device 6 of FIG. 6.

In step 3701, the first electronic device 37-1 and the second electronic device 37-2 may be connected to each other.

In step 3703, the first electronic device 37-1 may receive a reproduction request for the audio data stored in the memory.

In step 3705, the first electronic device 37-1 and the second electronic device 37-2 may exchange battery residual capacity information.

Based on the exchange of battery residual capacity information, in step 3707, the first electronic device 37-1 may confirm that a difference between the battery residual capacity of the first electronic device 37-1 and the battery residual capacity of the second electronic device 37-2 is less than a critical value.

In response to the confirmation, in step 3709, the first electronic device 37-1 may reproduce audio data, for which a reproduction request is made. For example, the first electronic device 37-1 may decode the audio data to acquire an audio signal, and may output the audio signal through its speaker.

In step 3711, the second electronic device 37-2 may confirm that a difference between the battery residual capacity of the first electronic device 37-1 and the battery residual capacity of the second electronic device 37-2 is less than the critical value.

In response to the confirmation, in step 3713, the second electronic device 37-2 may reproduce the same audio data stored in the memory. For example, the second electronic device 37-2 may decode the audio data to acquire an audio signal, and may output the audio signal through its speaker.

The order of the steps of FIG. 37 may be changed, or some of the operations may be simultaneously executed.

Figure 38:
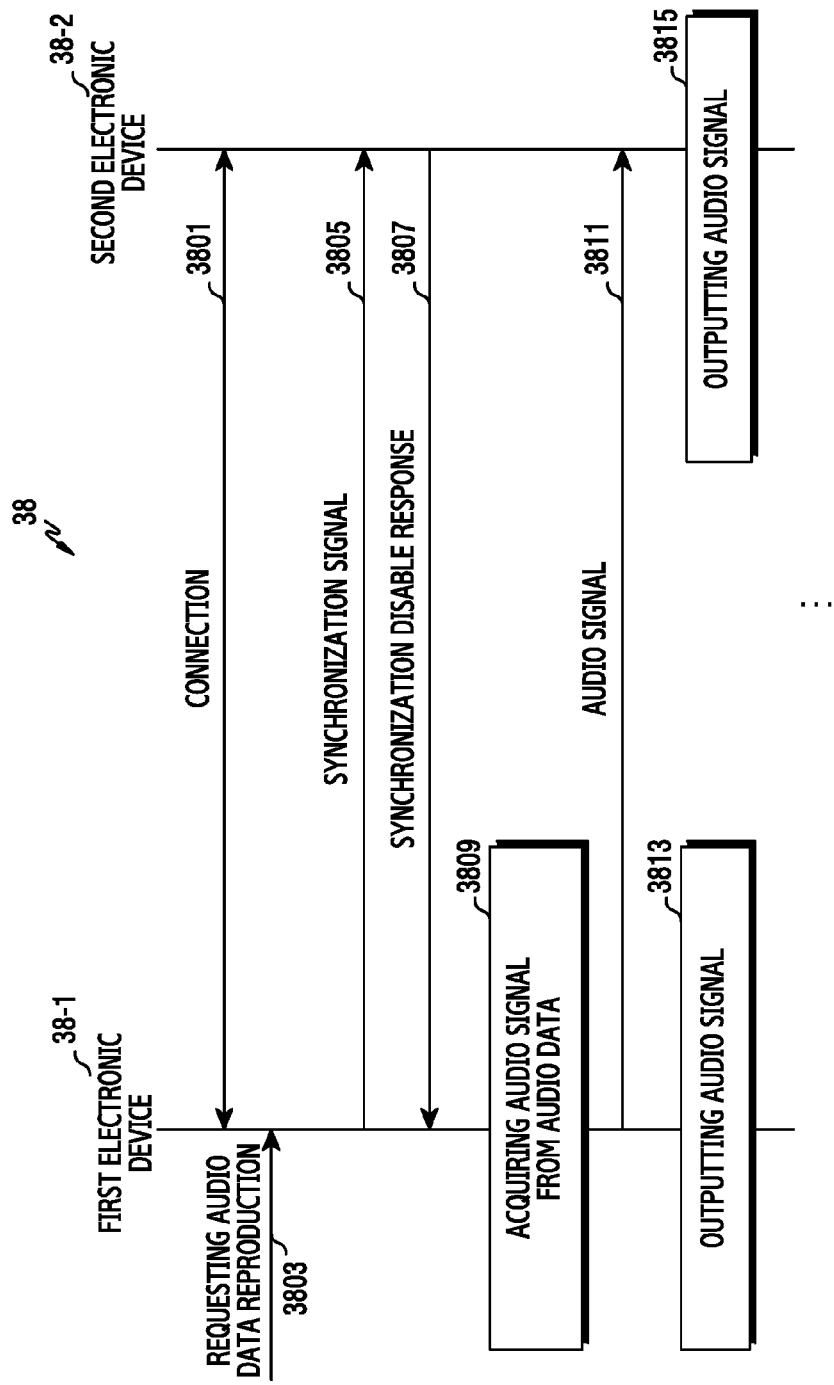
FIG. 38 is a diagram of communication flow of a system, according to an embodiment of the present disclosure.

FIG. 38 is a signaling diagram of communication flow of a system, according to an embodiment of the present disclosure. A system 38 may include a first electronic device 38-1 and a second electronic device 38-2. The first electronic device 38-1 may include all or some of the components of the first electronic device 5 of FIG. 6. The second electronic device 38-2 may include all or some of the components of the second electronic device 6 of FIG. 6.

In step 3801, the first electronic device 38-1 and the second electronic device 38-2 may be connected to each other.

In step 3803, the first electronic device 38-1 may receive a reproduction request for the audio data stored in the memory.

In step 3805, the first electronic device 38-1 may transmit a synchronization signal related to the audio data, for which the reproduction request is made, to the second electronic device 38-2.

The second electronic device 38-2 may not store the same audio data corresponding to the synchronization signal. In step 3807, the second electronic device 38-2 may transmit a synchronization disable response related to the synchronization signal to the first electronic device 38-1.

In response to the synchronization disable response from the second electronic device 38-2, in step 3809, the first electronic device 38-1 may decode the audio data, for which the reproduction request is made, to acquire an audio signal.

In step 3811, the first electronic device 38-1 may transmit at least a portion of the audio signals to the second electronic device 38-2. For example, the first electronic device 38-1 may decode the mono audio data to acquire an audio signal, and may transmit the audio signal to the second electronic device 38-2. Alternatively, the first electronic device 38-1 may decode first audio data of stereo audio data to acquire a first audio signal, and may decode second audio data of the stereo audio data to obtain a second audio signal. The first electronic device 38-1 may transmit the second audio signal to the second electronic device 38-2.

In step 3813, the first electronic device 38-1 may output, through its speaker, at least a portion of the audio signals.

In step 3815, the second electronic device 38-2 may output, through its speaker, the audio signal received from the first electronic device 38-1. For example, the second electronic device 38-2 may not reproduce the same audio data, and may output, through its speaker, the audio signal received from the first electronic device 38-1.

For example, the first electronic device 38-1 may output, through its speaker, for example, the first audio signal acquired from the stereo audio data, and the second electronic device 38-2 may output, through its speaker, the second audio signal acquired from the stereo audio data. This may provide the user with a chance to experience stereophonic sound.

The order of the steps of FIG. 38 may be changed, or some of the operations may be simultaneously executed.

Figure 39:
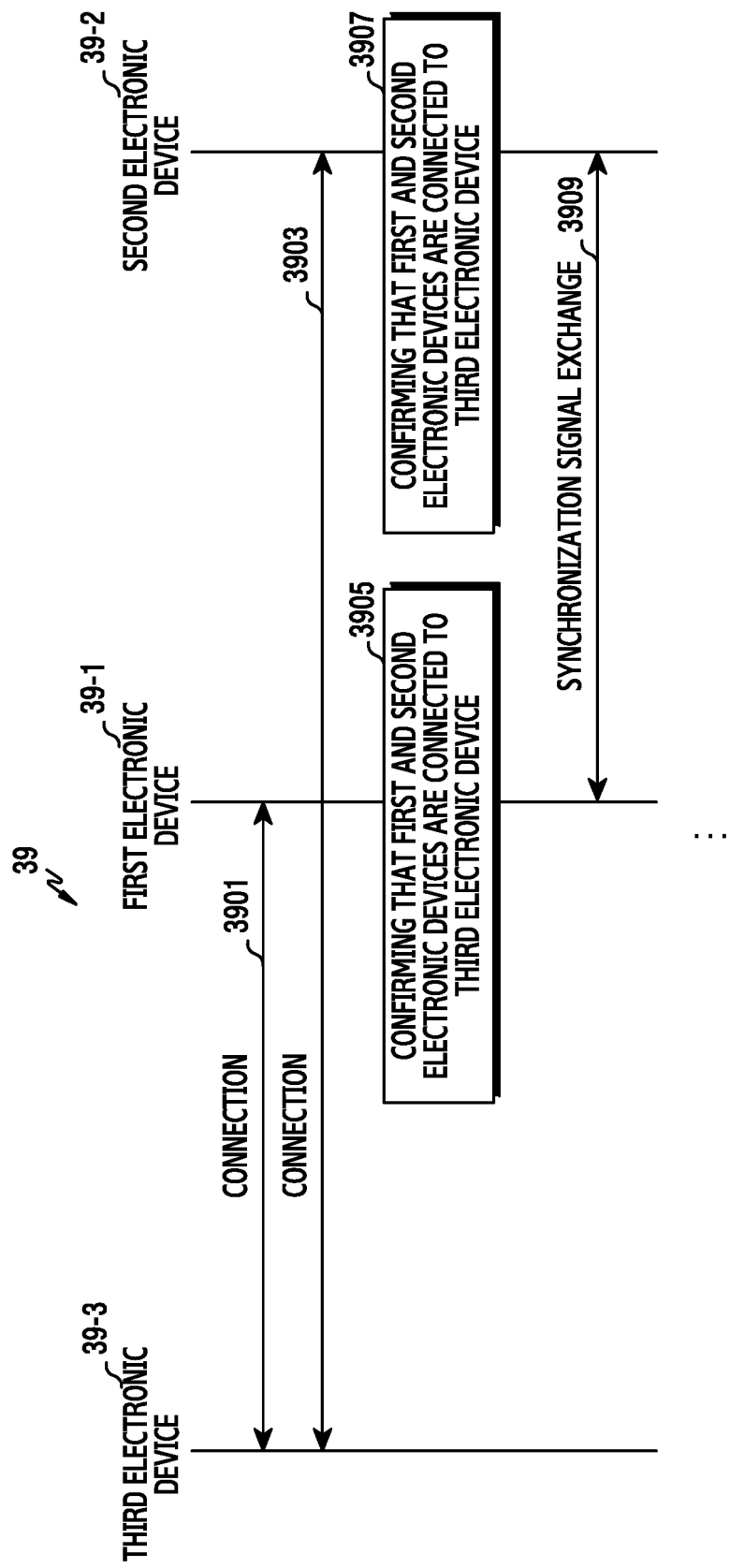
FIG. 39 is a diagram of a communication flow of systems, according to an embodiment of the present disclosure.

FIG. 39 is a diagram of communication flow of a system, according to an embodiment of the present disclosure. A system 39 may include a first electronic device 39-1, a second electronic device 39-2, and a third electronic device 39-3. The first electronic device 39-1 may include all or some of the components of the first electronic device 5 of FIG. 6. The second electronic device 39-2 may include all or some of the components of the second electronic device 6 of FIG. 6. The third electronic device 39-3 may include all or some of the components of the third electronic device 17 of FIG. 17.

In step 3901, the first electronic device 39-1 and the third electronic device 39-3 may be connected to each other.

In step 3903, the second electronic device 39-2 and the third electronic device 39-3 may be connected to each other.

In step 3905, the first electronic device 39-1 may confirm that the first electronic device 39-1 and the second electronic device 39-2 are in the state of being connected to the third electronic device 39-3.

In step 3907, the second electronic device 39-2 may confirm that the first electronic device 39-1 and the second electronic device 39-2 are in the state of being connected to the third electronic device 39-3.

In response to the confirmation in step 3905 and step 3907, the first electronic device 39-1 and the second electronic device 39-2 may exchange a synchronization signal in step 3909. For example, when the first electronic device 39-1 and the second electronic device 39-2 are mounted on the third electronic device 17 of FIG. 17, the first electronic device 39-1 and the second electronic device 39-2 exchange a synchronization signal, and may synchronize the reproduction of the audio data based on the synchronization signal.

The order of the steps of FIG. 39 may be changed, or some of the operations may be simultaneously executed.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a housing including a portion configured to be detachably mounted on one of a user's ears;
   a wireless communication circuit included in the housing;

a battery included in the housing;
a speaker included in the housing and disposed to face a user's eardrum when the portion of the housing is coupled to one of the user's ears;
at least one sensor included in the housing;
a processor included in the housing and electrically connected to the wireless communication circuit, the battery, the speaker, and the at least one sensor; and
a memory included in the housing and electrically connected to the processor, the memory being configured to store audio data, which has been previously downloaded from a connected audio data source,
wherein the memory stores instructions, which, upon being executed, cause the processor to:
request a connection from an external device configured to be detachably mounted on another one of the user's ears by using the communication circuit;
determine a portion of the audio data stored in the memory to be output based on whether a response from the external device for the request for the connection is received or at least a portion of at least one signal received from the external device by formation of the requested connection;
output the determined portion through the speaker without being connected to the audio data source; and
estimate a time of the electronic device based on a time difference between the electronic device and the external device and use the estimated time to synchronize the electronic device and the external device.

2. The electronic device of claim 1, wherein the at least one signal received from the external device includes status information of the external device, and
the instructions cause the processor to determine the portion of the audio data to be output, based on the received status information of the external device.

3. The electronic device of claim 2, wherein the instructions cause the processor to:
output the portion of the audio data through the speaker when the received status information of the external device includes a first status, and
output an entirety of the audio data through the speaker when the received status information of the external device includes a second status.

4. The electronic device of claim 3, wherein, when the received status information of the external device includes the first status, the instructions cause the processor to:
transmit a synchronization signal related to the portion of the audio data to the external device;
receive a response related to the synchronization signal from the external device; and
output the portion of the audio data through the speaker in response to the received response, and
when the received status information of the external device includes the second status, the instructions cause the processor not to transmit a synchronization signal related to the portion of the audio data to the external device.

5. The electronic device of claim 1, wherein the instructions cause the processor to:
acquire status information of the electronic device using the at least one sensor; and
transmit the acquired status information of the electronic device to the external device by using the communication circuit.

6. The electronic device of claim 1, wherein the instructions cause the processor to output the portion of the audio data entirely through the speaker when the external device does not respond to the request for the connection.

7. The electronic device of claim 2, wherein the first status includes a state where the external device is positioned close to a user, and
the second status includes a state where the external device is not positioned close to a user.

8. The electronic device of claim 1, wherein the electronic device serves as a master device and the external device serves as a slave device.

9. The electronic device of claim 1, wherein the instructions include, which, upon being executed, cause the processor to:
determine a first reproduction position of the audio data, and
transmit a command based on the determined first reproduction position to the external device.

10. The electronic device of claim 1, wherein the instructions include, which, upon being executed, cause the processor to:
receive, from the external device, a second reproduction position of the same audio data,
compare the first reproduction position with the second reproduction position, and
transmit the command based on a result of the comparison result to the external device.

11. An electronic device comprising:
a housing including a portion configured to be detachably mounted on one of a user's ears;
a wireless communication circuit included in the housing;
a battery included in the housing;
a speaker included in the housing and disposed to face a user's eardrum when the portion of the housing is coupled to one of the user's ears;
at least one sensor included in the housing;
a processor included in the housing and electrically connected to the wireless communication circuit, the battery, the speaker, and the at least one sensor;
a storage device included in the housing and electrically connected to the processor; and
a volatile memory included in the housing,
wherein the storage device stores instructions which, upon being executed, cause the processor to:
receive audio data from a connected first external device by using the communication circuit;
store the received audio data in the volatile memory;
request a connection from a second external device configured to be detachably mounted on another one of the user's ears by using the communication circuit;
determine a portion of the audio data stored in the volatile memory to be output based on whether a response of the second external device for the request for the connection is received or at least a portion of at least one signal is received from the second external device by formation of the requested connection;
output the determined portion of the audio data through the speaker, without being connected to the first external device; and
estimate a time of the electronic device based on a time difference between the electronic device and the second external device and use the estimated time to synchronize the electronic device and the second external device.

12. The electronic device of claim 11, wherein the instructions cause the processor to output the portion of audio data through the speaker entirely when the second external device does not respond to the request for the connection.

13. The electronic device of claim 11, wherein the at least one signal received from the second external device includes status information of the second external device, and
the instructions cause the processor to:
output the portion of the audio data through the speaker when the received status information of the external device includes a first status, and
output entire audio data through the speaker when the received status information of the external device includes a second status.

14. The electronic device of claim 13, wherein the first status includes a state where the second external device is positioned close to a user, and
the second status includes a state where the second external device is not positioned close to a user.

15. A method of operating an electronic device, comprising:
receiving a reproduction request for audio data stored in a memory of the electronic device, the audio having been previously downloaded from a connected audio data source;
acquiring status information of an external device connected to the electronic device;
determining a portion of the audio data stored in the memory to be output based on the acquired status information;
outputting the determined portion of the audio data through a speaker of the electronic device, without being connected to the audio data source; and
estimating a time of the electronic device based on a time difference between the electronic device and the external device and use the estimated time to synchronize the electronic device and the external device.

16. The method of claim 15, wherein the status information of the external device includes information relating to whether the external device is positioned close to a user.

17. The method of claim 16, wherein, determining the portion of the audio data to be output is based on the acquired status information,
a portion of the portion of the audio data is determined when it is confirmed that the external device is positioned close to the user, and
a portion of the entire audio data is determined when it is confirmed that the external device is not positioned close to the user.

18. The method of claim 16, further comprising:
acquiring status information of the electronic device; and
transmitting the acquired status information of the electronic device to the external device.

19. The method of claim 16, further comprising:
transmitting, to the external device, a synchronization request related to the portion of the audio data, for which the reproduction request is made.

20. The method of claim 16, further comprising:
transmitting the portion of the audio data to the external device when a synchronization disable response is received from the external device in response to a synchronization request.

* * * * *